(12) United States Patent
Hankins et al.

(10) Patent No.: US 9,953,279 B1
(45) Date of Patent: Apr. 24, 2018

(54) SYSTEM AND METHOD FOR COMPUTER-ASSISTED IMPROVEMENT OF BUSINESS INTELLIGENCE ECOSYSTEM

(71) Applicant: Motio, Inc., Dallas, TX (US)

(72) Inventors: Lance W. Hankins, Allen, TX (US); J. Lynn Moore, Jr., Lucas, TX (US); Jeremy D. Siler, Dallas, TX (US)

(73) Assignee: Motio, Inc., Plano, TX (US)

(*) Notice: Subject to any disclaimer, the term of this patent is extended or adjusted under 35 U.S.C. 154(b) by 336 days.

(21) Appl. No.: 13/657,753

(22) Filed: Oct. 22, 2012

Related U.S. Application Data

(60) Provisional application No. 61/550,358, filed on Oct. 21, 2011.

(51) Int. Cl.
  *G06Q 10/06* (2012.01)

(52) U.S. Cl.
  CPC .................................. *G06Q 10/06* (2013.01)

(58) Field of Classification Search
  CPC ..................................................... G06Q 30/06
  USPC ....................................................... 705/7.39
  See application file for complete search history.

(56) References Cited

U.S. PATENT DOCUMENTS

| | | | |
|---|---|---|---|
| 6,381,558 B1 | 4/2002 | Berry et al. | |
| 6,694,288 B2 | 2/2004 | Smocha et al. | |
| 7,464,123 B2 | 12/2008 | Croker | |
| 7,546,598 B2 | 6/2009 | Blumenthal et al. | |
| 7,885,929 B2 | 2/2011 | Moore, Jr. et al. | |
| 7,945,589 B1 | 5/2011 | Weiss et al. | |
| 8,073,863 B2 | 12/2011 | Rachmiel et al. | |
| 8,140,477 B2 | 3/2012 | Moore, Jr. et al. | |
| 8,285,678 B2 | 10/2012 | Moore, Jr. et al. | |
| 8,571,909 B2* | 10/2013 | Miller et al. | 705/7.11 |
| 8,751,464 B1 | 6/2014 | Weiss et al. | |
| 2002/0116152 A1 | 8/2002 | Tanaka | |
| 2004/0138933 A1* | 7/2004 | LaComb et al. | 705/7 |
| 2006/0010102 A1 | 1/2006 | Labossiere et al. | |
| 2006/0074920 A1 | 4/2006 | Wefers et al. | |
| 2006/0085434 A1* | 4/2006 | Mah et al. | 707/100 |
| 2006/0253471 A1 | 11/2006 | Wasserrman et al. | |
| 2006/0253472 A1 | 11/2006 | Wasserman et al. | |
| 2007/0038683 A1* | 2/2007 | Dixon et al. | 707/202 |
| 2007/0239508 A1 | 10/2007 | Fazal et al. | |
| 2007/0282805 A1* | 12/2007 | Janzen | 707/3 |
| 2008/0127083 A1 | 5/2008 | Brown et al. | |
| 2008/0189332 A1 | 8/2008 | Winter | |
| 2009/0043788 A1* | 2/2009 | Averbuch et al. | 707/100 |

(Continued)

OTHER PUBLICATIONS

IBM Corp "IBM Cognos Administration: Administration and Security Guide (Version 10.1.0)". USA, 2010, pp. 1-1016.

(Continued)

*Primary Examiner* — Kurtis Gills
(74) *Attorney, Agent, or Firm* — Ferguson Braswell Fraser Kubasta PC; Elizabeth Philip Dahm; Kelly J. Kubasta

(57) ABSTRACT

In various implementations, improvement of a business intelligence ecosystem may include analyzing component(s) of a business intelligence ecosystem, identifying candidate improvements, applying at least a portion of candidate improvements, and/or verifying effects of the candidate improvements. Candidate improvements for business intelligence artifact(s), underlying data sources, BI environment configurations, metadata models, and/or computing resources may be analyzed and identified.

19 Claims, 18 Drawing Sheets

(56) References Cited

U.S. PATENT DOCUMENTS

2009/0083717 A1    3/2009  Branson et al.
2009/0271242 A1*  10/2009  Stafford et al. ................... 705/9
2013/0097585 A1*   4/2013  Jentsch ..................... G06F 8/71
                                                              717/122

OTHER PUBLICATIONS

Motio, Inc., "MotioCI User Guide, (Version 1.4)". USA, Jan. 13, 2009, pp. 1-158.
Motio, Inc., "MotioCI User Guide, (Version 2.0)". USA, Mar. 30, 2010, pp. 1-180.

* cited by examiner

SYSTEM AND METHOD FOR COMPUTER-ASSISTED IMPROVEMENT OF BUSINESS INTELLIGENCE ECOSYSTEM

CROSS-REFERENCE TO RELATED APPLICATION

This application claims priority to U.S. Provisional Patent Application No. 61/550,358, entitled "SYSTEM AND METHOD FOR COMPUTER-ASSISTED IMPROVEMENT OF BUSINESS INTELLIGENCE ECOSYSTEM" filed on Oct. 21, 2011, which is incorporated by reference herein for all purposes.

TECHNICAL FIELD

The present disclosure generally relates to computer-assisted improvement of a business intelligence ecosystem.

BACKGROUND

Business intelligence (BI) systems have gained widespread acceptance across many industries and are intended to support better business decision-making. In modern business, increasing standards, automation, and technologies have led to vast amounts of data becoming available. BI systems make it possible to collect, identify, extract, analyze, and report business data in a User- and business-friendly manner. As a general matter, improvement of the design, configuration, efficiency, maintainability, and/or other aspects of the BI ecosystem may improve the utility of the BI system to the business. Accordingly, systems and methods for computer-assisted improvement of a BI ecosystem may improve the utility of BI systems.

SUMMARY

In various implementations, improving a business intelligence ecosystem may include analyzing various content in and components of a business intelligence ecosystem, finding candidate improvements, applying designated improvements, and/or quantitatively verifying positive effects of applied improvements.

Implementations of the present disclosure generally provide systems and methods for computer-assisted improvement of a business intelligence ecosystem, a single BI artifact residing within a BI ecosystem, one or more BI artifacts residing within a BI ecosystem, one or more underlying BI data sources associated with one or more metadata models and/or one or more BI artifacts residing within a BI ecosystem, a configuration of one or more components of the BI Environment or components of the BI ecosystem, computing resources of a BI ecosystem, and/or one or more metadata models residing within a BI ecosystem.

In various implementations, improving a business intelligence ecosystem may include receiving a selection of a business intelligence artifact, determining execution profile(s) for the selected business intelligence artifact, and determining an initial examination score for the selected business intelligence artifact. Candidate improvement(s) to the business intelligence artifact may be identified. A selection of at least one of the identified candidate improvements may be received and the selected business intelligence artifact modified with at least one of the identified candidate improvements may be executed. The selected business intelligence artifact may be executed at least partially based on one or more of the execution profiles. Examination data for the modified business intelligence artifact may be determined and qualified selected improvement(s) may be identified based on a comparison of the examination data for the modified business intelligence artifact and the initial examination score. A determination may be made whether to apply one or more of the identified qualified selected improvements to the business intelligence artifact.

Implementations may include one or more of the following features. Determining an initial examination score may include executing the selected business intelligence artifact at least partially based on at least one of the determined execution profiles and/or determining examination data based at least partially on data from monitoring the business intelligence ecosystem during the execution of the selected business intelligence artifact, and/or for a period of time prior to the execution of the selected business intelligence artifact. Identifying candidate improvement(s) may include retrieving a set of configurable rules; applying the retrieved configurable rule(s) to the selected business intelligence artifact, the initial examination score, and/or business intelligence ecosystem information related to the selected business intelligence artifact; and, determining candidate improvement(s) based at least partially on the application of the set of configurable rules. Identifying qualified selected improvement(s) may be based at least partially on: an examination of at least a part of the selected business intelligence artifact, related BI artifacts and/or other components in the BI ecosystem; and/or an initial examination score.

In some implementations, the selected candidate improvement(s) to the business intelligence artifact may be applied (e.g., by the system). Identifying qualified selected improvement(s) may include determining an examination score for aspect(s) of the business intelligence artifact(s) based on the examination data, comparing at least a portion of the examination score to at least a portion of the initial examination score to determine if the score is improved, and identifying the selected improvement(s) with improved scores as qualified selected improvements. In some implementations, a report may be generated that includes instructions associated with applying the selected candidate improvement(s) to the business intelligence artifact, and a confirmation may be received that the selected candidate improvement to the business intelligence artifact was applied at least partially based on the received instructions.

In various implementations, improving a business intelligence ecosystem may include receiving a selection of business intelligence artifact(s); determining execution profile(s) for the selected business intelligence artifact(s); determining a load test to apply to the selected business intelligence artifact(s); and executing the selected business intelligence artifact(s) according to the determined load test and the execution profile(s). An initial examination score may be determined based at least partially on the execution of the selected business intelligence artifact(s) according to the determined load test and candidate improvement(s) to at least one of the selected business intelligence artifacts may be identified. A selection of the identified candidate improvement(s) may be received and the selected business intelligence artifact(s) modified with the identified candidate improvement(s) may be executed. The selected business intelligence artifact may be executed at least partially based on the determined load test. Examination data for the executed modified business intelligence artifact(s) may be determined, and qualified selected improvement(s) may be identified, if a determination is made that the qualified selected improvement(s) improve the selected BI artifact(s)

based at least partially on a comparison of the examination data and the initial examination score. A determination may be made whether to apply the identified qualified selected improvement(s) to the selected business intelligence artifact(s).

Implementations may include one or more of the following features. In some implementations, a selection of business intelligence environment(s) may be received, and receiving the selection may include receiving a selection of business intelligence artifact(s) in the selected business intelligence environment(s). Receiving a selection of the business intelligence artifact(s) may include receiving a selection of aspect(s) of a business intelligence artifact. Determining the execution profile(s) may include receiving a selection of the execution profile and/or retrieving a definition of the execution profile. Determining a load test to apply to the business intelligence artifact may include retrieving a load test, receiving a selection of a load test, and/or receiving a load test definition. Identifying candidate improvement(s) to the selected business intelligence artifact(s) may be based at least partially on the initial examination score. In some implementations, a selection of a verification order for the one or more selected candidate improvements may be received, and executing the selected business intelligence artifact(s) modified with the identified candidate improvement(s) may include executing the modified business intelligence artifact(s) based at least partially on the received verification order.

In various implementations, improving a business intelligence ecosystem may include receiving a selection of business intelligence artifact(s), determining execution profile(s) for each of the selected business intelligence artifacts, determining a set of metadata models associated with one or more of the selected business intelligence artifacts, and identifying a set of data sources associated with the metadata models. A listing may be generated for presentation to the user based at least partially on the determined set of metadata models and/or the identified set of data sources and a selection of the metadata model(s) and/or the data source(s) from the listing may be received. An initial examination score for the selected business intelligence artifact(s) may be determined. Information may be determined related to the selected metadata model(s) and/or the identified set of data source(s). Candidate improvement(s) to the selected metadata model(s) may be identified based at least partially on the initial examination score and/or the determined information. A selection of the identified candidate improvement(s) may be received and the selected candidate improvement(s) may be applied to at least one of the metadata models. An examination test may be executed on the metadata model(s) modified by the selected candidate improvement(s) and examination data may be generated based at least partially on the examination test. Qualified selected improvement(s) may be identified based on a comparison of the examination data and the initial examination score, and a determination may be made whether to apply the identified qualified selected improvement(s) to the metadata model(s).

Implementations may include one or more of the following features. In some implementations, the selected candidate improvement(s) may be applied to at least the selected business intelligence artifact(s). The initial examination score may include execution data related to the business intelligence artifact and/or non-execution data related to the business intelligence artifact. The examination data for the executed modified business intelligence artifact may include execution data related to the selected business intelligence artifact(s) and/or non-execution data related to the selected business intelligence artifact(s). In some implementations, information related to the identified set of data sources may be determined and identifying candidate improvement(s) to the business intelligence artifact(s) may be based at least partially on the initial examination score and/or the determined information related to the identified set of data sources. In some implementations, at least a portion of the set of data sources may be examined and determining the information related to the identified set of data sources may be at least partially based on the examination of at least a portion of the set of data sources. In some implementations, a listing may be generated of the identified set of data sources for presentation to a user, and a selection of data source(s) may be received. Determining information related to the identified set of data sources may include determining information related to the selected data sources.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of the present disclosure and its features, reference is now made to the following description, taken in conjunction with the accompanying drawings, in which.

DETAILED DESCRIPTION

Figure 1A:
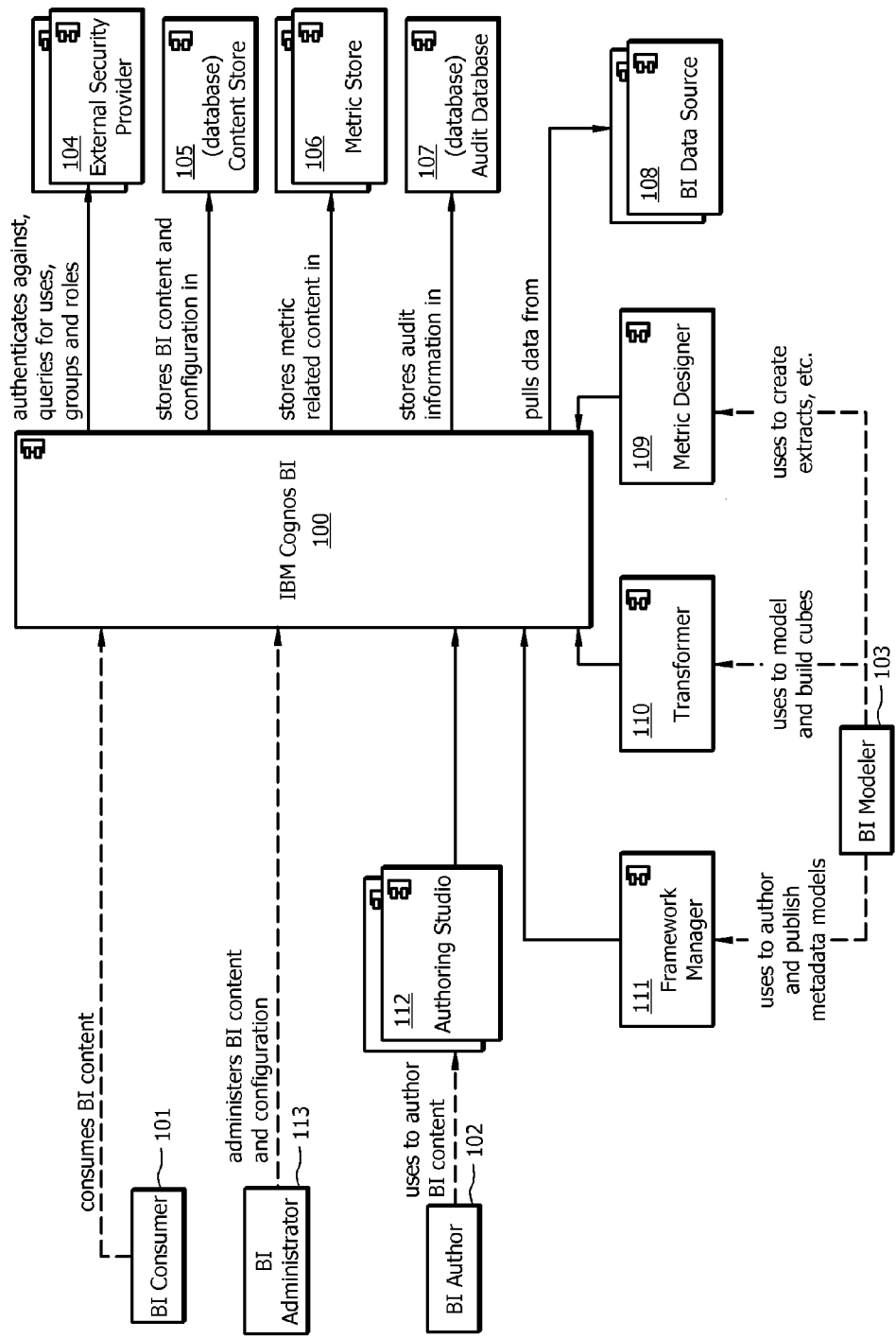
FIG. 1A depicts a simplified schematic illustration of example components of a BI environment, namely, a UML (Unified Modeling Language) Component Diagram, according to an implementation of the present disclosure.

The reader is directed to the glossary at the end of the specification for guidance on the meaning of certain terms used herein.

In various implementations, systems and processes of computer-assisted improvement of a business intelligence ecosystem may include analyzing various components of and/or content in a business intelligence ecosystem, finding candidate improvements, applying designated improvements, and/or quantitatively verifying results (e.g., scores, historical data, and/or positive effects) of applied improvements.

When implemented, a BI ecosystem may support better business decision-making by collecting, identifying, extracting, analyzing, and/or presenting business data in a convenient, usable, time-efficient and/or resource-efficient manner. However, sub-optimal design, sub-optimal implementation, sub-optimal configuration, resource bottlenecks, and/or inefficiencies may reduce the general utility of a BI ecosystem, and/or increase the cost of its ongoing maintenance and support. The ways in which a BI ecosystem may potentially be improved are virtually endless and the combination of multiple potential improvements further increases the possibilities.

In some implementations, the number of potential improvements may increase over time due to many forces. For example, one or more of the following factors may influence the BI ecosystem and may increase the potential for improvements:

BI consumers may continue to utilize the BI environment: arrange and use BI artifacts in a multitude of ways; define their own "self-service" BI artifacts, such as reports and/or dashboards; and/or execute BI artifacts to create large numbers of BI outputs (e.g., which may be stored in the BI environment);

BI authors and modelers may continue to add to and/or update the BI ecosystem, update existing BI artifacts, define new BI artifacts, add or change metadata models (e.g., which may impact many artifacts), add new data sources, and/or otherwise introduce new inefficiencies, redundancies, sub-optimal designs and/or implementations, which may increase usage of resources and/or many other issues that may adversely affect the utility of the BI ecosystem;

BI administrators may add, remove, and/or reconfigure data sources; add new extract, transform, and load ("ETL") processes; change security policies; and/or change the BI environment's configuration;

The data sources contained in the BI ecosystem may change over time. This may be a result of an accumulation of data over time (e.g., hourly or nightly ETL feeds that bring in new data), changes in upstream data sources, and/or changes in the ETL processes that pull data from these upstream data sources, transform the data, and then load the data into the BI data sources;

The software vendors that produce the BI software, databases, and the ETL processes may release new versions of software. Individual components of the BI ecosystem may be upgraded to a new software version, which may impact the performance, the proper functioning, the configuration (e.g., sometimes lost or changed between upgrades) and/or the actual BI content (e.g., an upgrade to the BI software may require upgrades to the BI artifacts defined therein); and/or The physical hardware and/or operating systems that host various components of the BI ecosystem may change over time. New hardware may be added, existing hardware may fail, a new patch or upgrade may be applied to the operating system, and/or other software may be installed or changed on the same server.

Any one or more of the above described changes and/or others changes may have a negative impact on the overall utility of the BI ecosystem. This negative impact may not be immediately and/or quantifiably apparent to the stakeholders of the BI ecosystem.

Various implementations may identify one or more aspects of the BI ecosystem that are candidates for improvement. By way of example, but not limitation, candidate improvements to a BI ecosystem may include at least the following: modification of one or more BI artifacts (e.g., reports, active reports, metadata models, analysis objects, query objects, dashboards, workspaces, transformer models, etc.) and/or their associated specifications; modification of the BI environment's configuration; modification to database schemas and/or the data contained therein; and/or modification to the configuration and/or resources of the server(s) hosting various components of the BI ecosystem (e.g., "add processing capacity", "increase RAM", and/or "improve the performance of temp directory I/O").

In some implementations, an individual BI artifact may be a candidate for improvement. The term "improvement" may include one or more software-assisted modifications that improve one or more aspects of the BI artifact. The aspects of the BI artifact may also be related to objects that are related to the BI artifact. For example, a BI output that is generated by successful execution of a BI artifact in the BI Environment would be considered a "related object"). Examples of such improvements may include, but are not limited to:

- Improving execution time of a BI artifact—for example, a report execution request for an improved report specification may take less time to complete than before the improvement (e.g., the BI software may take less time to produce the report output);
- Improving efficiency of a BI artifact—for example, a report execution request for an improved report specification may put less load on and/or consume less resources of the BI infrastructure (e.g., the servers hosting the BI environment and/or the underlying data sources);
- Reducing size and/or improvement of other characteristics of the BI output produced by execution of a BI artifact in the BI Environment—for example, executing an improved report may reduce the size of a generated PDF report output while not adversely impacting the visual appearance (e.g., in most scenarios the smaller PDF file may be an improvement due to reduced storage space required);
- Improving efficiency and/or other characteristics of the BI output produced by execution of a BI artifact in the BI environment—for example, executing an improved report may produce an HTML or MHTML output which is more efficiently rendered in a web browser, while not adversely impacting the visual appearance and/or required interaction of the HTML or MHTML output;
- Improving manageability of a BI artifact—for example, conceptual improvements may be made to a BI artifact's specification that reduce future management and/or maintenance (e.g. reduction of complex conditional logic into a simpler form, and/or removal of non-essential or unused abstractions in the specification);
- Improving consistency of a BI artifact—for example, an improved report specification may more closely adhere to a set of established standards that are associated with the BI artifact. These standards may include visual elements such as logos, fonts, colors, headers, footers, cover pages, footer pages, and/or style elements and/or may pertain to non-visual elements, such as parameter naming conventions, query naming conventions, page naming conventions, variable conventions, other element naming conventions, and/or other relevant standards; and/or
- Improving accuracy—for example, the system may cross-reference certain data elements presented in a BI output with related data elements from a BI-accessible data source and/or an upstream data source (e.g., Upstream Data source 303 depicted in FIG. 1C).

In some implementations, a plurality of BI artifacts and/or other aspects of a BI ecosystem may be candidate(s) for improvement. Examples of potential improvements include, but are not limited to:

- Refactoring and/or simplifying of a set of related BI artifacts—for example, conceptual improvements may be made to a group of BI artifacts that may improve the manageability of the BI environment. In some implementations, if an analysis is performed across a set of 100 reports and it is determined that 10 of those reports have report specifications that are very similar to one another, the system may suggest a single hybrid report specification fulfills the same requirements as the original 10 report specifications (e.g., the system may suggest collapsing 10 separate entities into a single entity). This may reduce the maintenance burden of the BI authors or BI administrators, may simplify the experience of BI consumers, and/or reduce storage space required;
- Improving a configuration of the BI environment—for example, the configuration may be modified to improve the processing of a singular or concurrent execution requests (e.g. improved response time and/or better scalability);
- Modifying a metadata model—for example, modifying a metadata model may improve efficiency, response times, correctness and/or manageability of multiple BI artifacts that are linked to the metadata model;
- Changing models used to build OLAP (Online Analytical Processing) Cubes—for example, changing the model(s) used to build OLAP Cubes may improve the BI ecosystem by generating faster cube build times, faster access times, greater efficiency of the resultant cubes, and/or smaller sizes of the resultant cubes;
- Modifying underlying database schema of a data source—for example, modifying the underlying database schema of a data source may improve the efficiency, response times, and/or manageability of multiple BI artifacts that are linked to metadata models that extract data from the data source; and/or
- Improving configuration and/or resource changes to servers—for example, with respect to servers hosting components of the BI ecosystem, the speed of temp directory I/O may be increased and/or the available RAM may be increased.

Figure 1B:
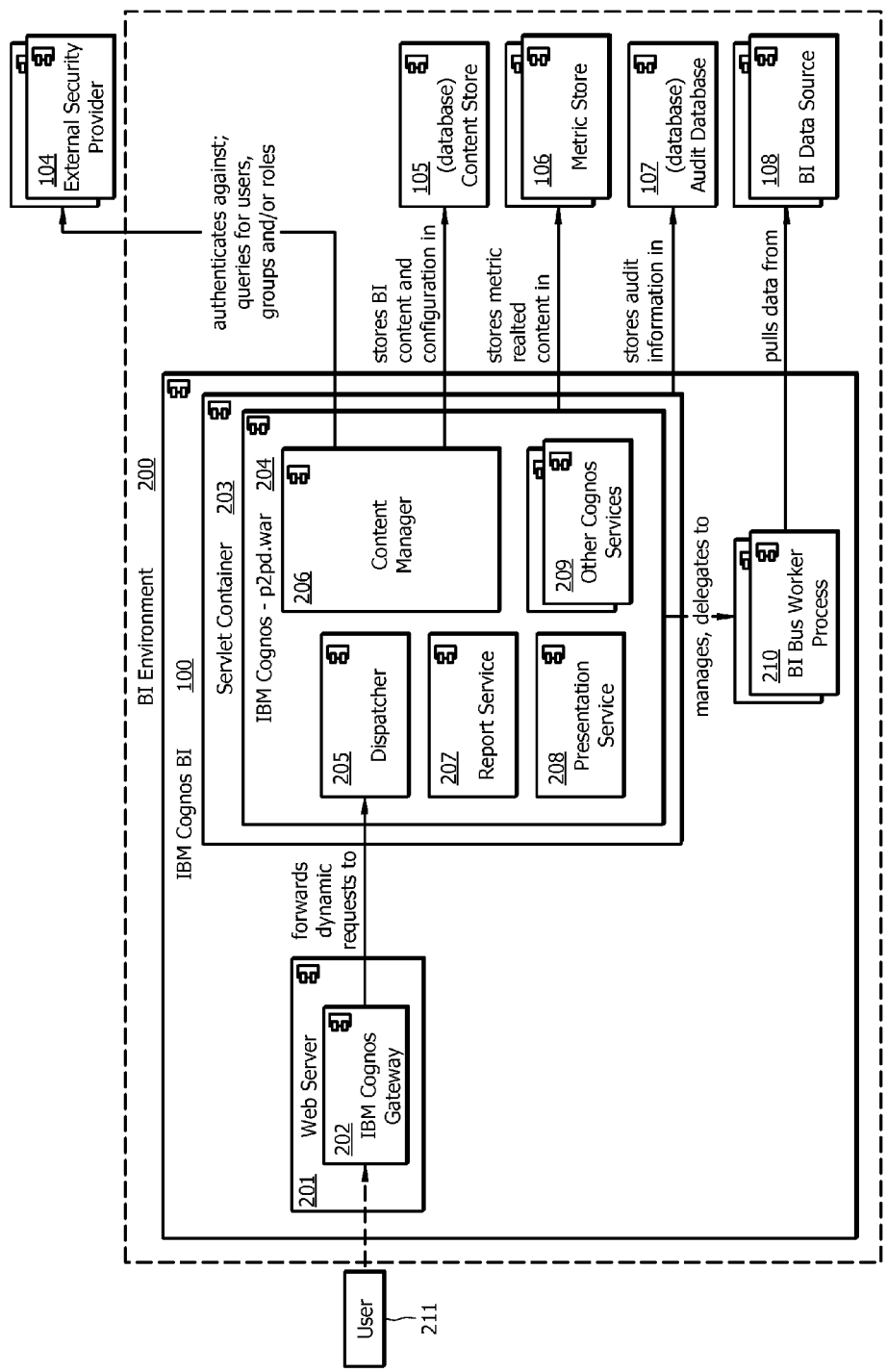
FIG. 1B depicts a schematic illustration of an expanded view of example components of a BI environment, namely, a UML Component Diagram, according to an implementation of the present disclosure.
Figure 1C:
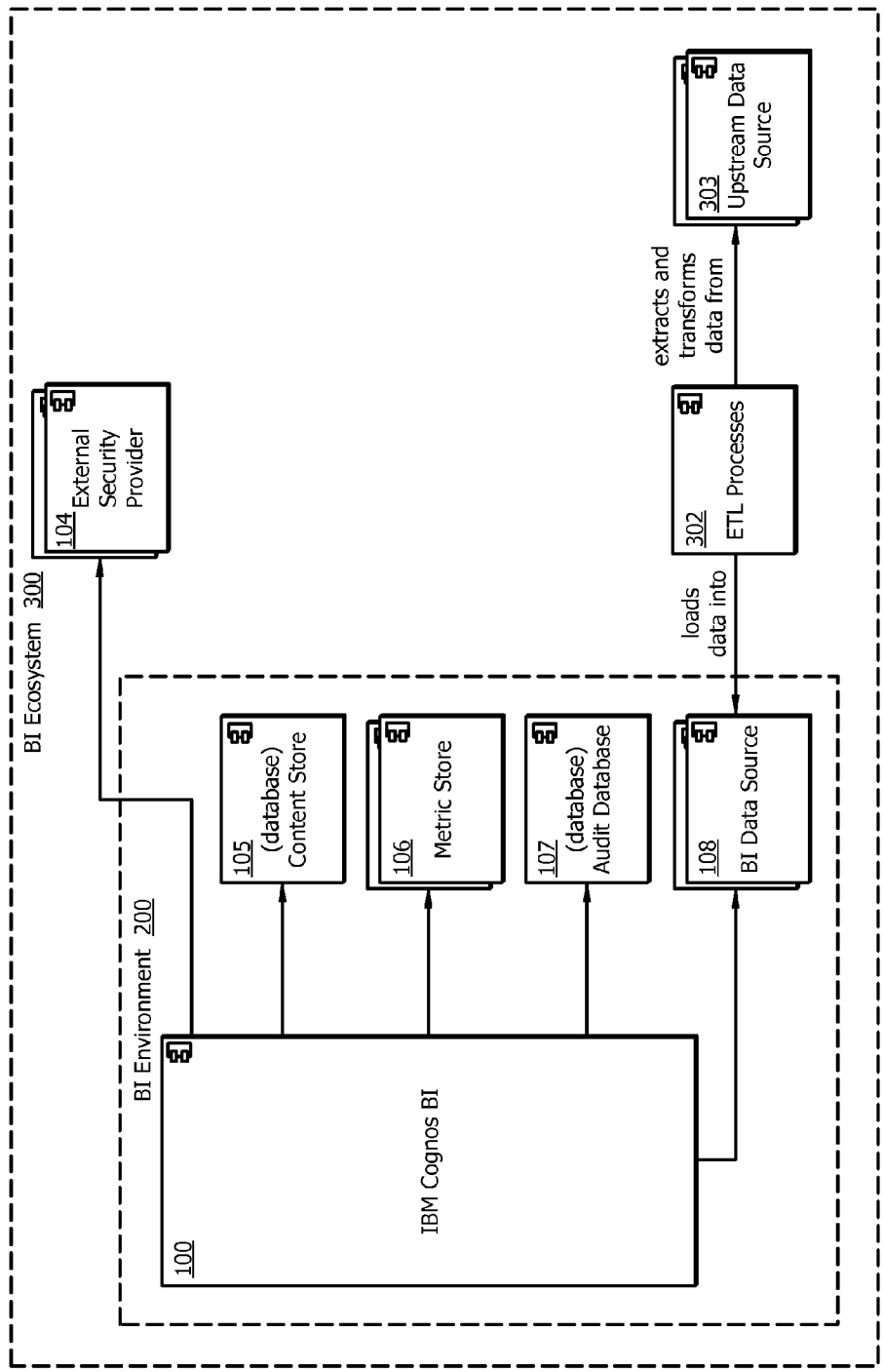
FIG. 1C depicts a schematic illustration of example components of a BI ecosystem, namely, a UML Component Diagram, according to an implementation of the present disclosure.

FIGS. 1A through 1C are schematic illustrations of an implementation of an example BI ecosystem and various components. It should be understood that BI ecosystem and its components shown in FIGS. 1A through 1C are for illustrative purposes only and that any other suitable system or subsystem may be used in conjunction with, or in lieu of, the depicted BI ecosystem according to the described systems and processes.

FIG. 1A illustrates an implementation of a UML (Unified Modeling Language) Component Diagram that depicts a high level view of selected components in an example BI environment. An IBM Cognos BI environment is illustrated in FIG. 1A, but a BI environment utilizing BI software provided by any other appropriate software vendor (or open source BI software) may be utilized. In FIG. 1A, a single instance (i.e., single UML component) 100 of the BI software is depicted for the sake of simplicity. In some implementations, however, instance 100 may comprise a plurality of collaborating software processes running on a plurality of computers (e.g., Gateways, Application Servers, and/or BI Bus Processes in an IBM Cognos® based implementation).

To develop, maintain, and/or use a BI environment, several Users may be involved. As depicted in FIG. 1A, Users may include one or more BI consumers 101, BI administrators 113, BI authors 102, and BI modelers 103. The "Users" may include a discrete individual or a group/team of individuals such that there may be a plurality of BI consumers 101, a plurality of BI administrators 113, a plurality of BI authors 102, and/or a plurality of BI modelers 103. In some implementations, a User may perform the action(s) of more than one User and/or the User may be more than one category of User.

A BI consumer 101, one example category of User, may represent a consumer of information available in and/or produced by instance 100 of the BI software. Activities of a BI consumer 101 may include, but are not limited to: executing BI artifacts to examine the BI outputs; scheduling BI artifacts, such as reports to be executed according to a selected frequency (e.g., every morning at 7:00 AM); requesting that generated report outputs be transmitted to BI consumer 101 (and/or other recipients) via a specified process of transmission (e.g., email); and/or viewing multiple BI outputs aggregated into different panes of a dashboard or workspace hosted within instance 100 of the BI software.

A BI administrator 113, an example category of User, may be responsible for administering the content and/or the configuration of instance 100 of the BI software. Activities of a BI administrator 113 may include, but are not limited to: changing tuning parameters; configuring BI data sources 108; mapping Users, groups and/or roles from an External Security Provider 104 to specific entitlements on content and/or capabilities in instance 100 of the BI software; mapping Users, groups and/or roles from an External Security Provider 104 to groups and/or roles in an internal Cognos security namespace; installing or upgrading instance 100 of the BI software; and/or otherwise administering the configuration and/or the content of instance 100 of the BI software.

BI author 102, an example category of User, may represent a BI professional and/or a "power User" who creates and/or updates BI content. The BI author 102 and/or a plurality of BI authors may be responsible for creating and/or updating new BI artifacts such as reports, queries, and/or analysis objects. BI author 102 may use vendor-supplied authoring studio(s) 112 when editing BI content. In some implementations in which IBM Cognos is used for the BI environment, different types of authoring studios 112 may be provided for different types of BI artifacts. For example, Report Studio may be used to edit reports, Analysis Studio may be used to author analyses, Business Insight Advanced may be used to author dashboards, Event Studio may be used to author events, Cognos Insight may be used to author BI artifacts and/or other suitable authoring studios may be used for additional BI artifacts.

BI modeler 103, another category of User, represents a BI professional (e.g., a power User) who creates and/or updates foundational BI content. BI modeler 103 may be generally responsible for building and/or publishing models upon which other BI artifacts are created. Examples of such models may include, but are not limited to: metadata models (e.g., both framework models and their associated packages), models used to generate OLAP cubes, metrics extracts and/or scorecards, and/or any other suitable models. In some implementations, a single individual may perform the role of both BI modeler 103 and BI author 102. In some implementations, in which IBM Cognos is used for the BI environment, different modeling tools may be provided for authoring different types of models. For example, Framework Manager 111 may be used to author framework models (e.g., offline) and/or publish slices of these models (e.g., "packages") to instance 100 of the IBM Cognos BI software. Transformer 110 may be used to author models that are used to build OLAP cubes and/or other modeling tools may be used to build additional models, as appropriate.

Instance 100 of the BI software depicted in FIG. 1A may be configured to authenticate Users against one or more External Security Providers 104. For example, External Security Providers 104 may include Microsoft Active Directory, LDAP or Netegrity SiteMinder, NTLM, and/or any other suitable external security providers. In some implementations, in addition to authenticating Users against an External Security Provider 104, an instance 100 of BI software of FIG. 1A may also discern some or all of an authenticated User's group and/or role membership from the External Security Provider 104. Instance 100 of the BI software of FIG. 1A may query an External Security Provider 104 for information such as Users, groups, roles and/or organizational hierarchies. For example, BI administrator 113 may define permissions on BI content and/or capabilities, or define group and/or role membership by mapping from an External Security Provider 104 to an internal security namespace.

Instance 100 of the BI software may store content and/or configuration data in a Content Store database 105. For example, the Content Store Database 105 may store various BI artifacts, configurations, and/or content, such as packages (e.g., metadata models or portions thereof), report specifications, report outputs (e.g., by default and/or by User selection), folder structure, dashboards, portal pages, configurations, and/or User profiles and/or preferences. In some implementations, certain configuration data may be maintained in Content Store database 105, and additional configuration data may be stored on the file system(s) of the computer(s) hosting instance 100 of the BI software (e.g., XML configuration files, property files, xsd files, xslt files, etc.).

Instance 100 of the BI software may store metric related information in one or more Metric Stores 106.

Instance 100 of the BI software may further log "audit information" to an optionally configured audit database 107. Audit information may include historical audit data including, but not limited to, information on: User sessions, User actions, which BI artifacts have been executed in the system (e.g., including information about how the BI artifacts were executed and/or by whom), and/or any other suitable historical data. Instance 100 of the BI software may be configured to log this type of audit information at various levels and to various destinations (e.g., local log files and/or an audit database).

Instance 100 of the BI software may query for data stored in one or more BI data sources 108. BI data source 108 may include any one or more of a plurality of data store types that the BI environment may utilize. For example, relational databases (e.g., Oracle 11g, Microsoft SQL Server, and/or IBM DB2), ODBC data sources, OLAP cubes, flat files, XML files, web services, and/or physical and/or virtualized data sources (e.g., Composite Information Server®).

FIG. 1B illustrates an implementation of a UML (Unified Modeling Language) Component Diagram that depicts a more detailed view of an example BI environment—more particularly, FIG. 1B illustrates BI environment 200, which is an expanded view of instance 100 of the BI software in FIG. 1A. As in FIG. 1A, an IBM Cognos BI environment is shown as an example but a BI environment utilizing the BI software provided by any other appropriate BI vendor would be equally applicable. Also as in FIG. 1A, a single instance (i.e., single UML component) 100 of the BI software is depicted in FIG. 1B for the sake of simplicity. In some implementations, however, instance 100 may comprise a plurality of collaborating software processes running on a plurality of computers.

BI environment 200 depicted in FIG. 1B may include instance 100 of the BI environment (e.g., an IBM Cognos BI environment), its associated Content Store database 105, associated metrics store databases 106, an optional audit database 107, and/or BI data sources 108.

Figure 2A:
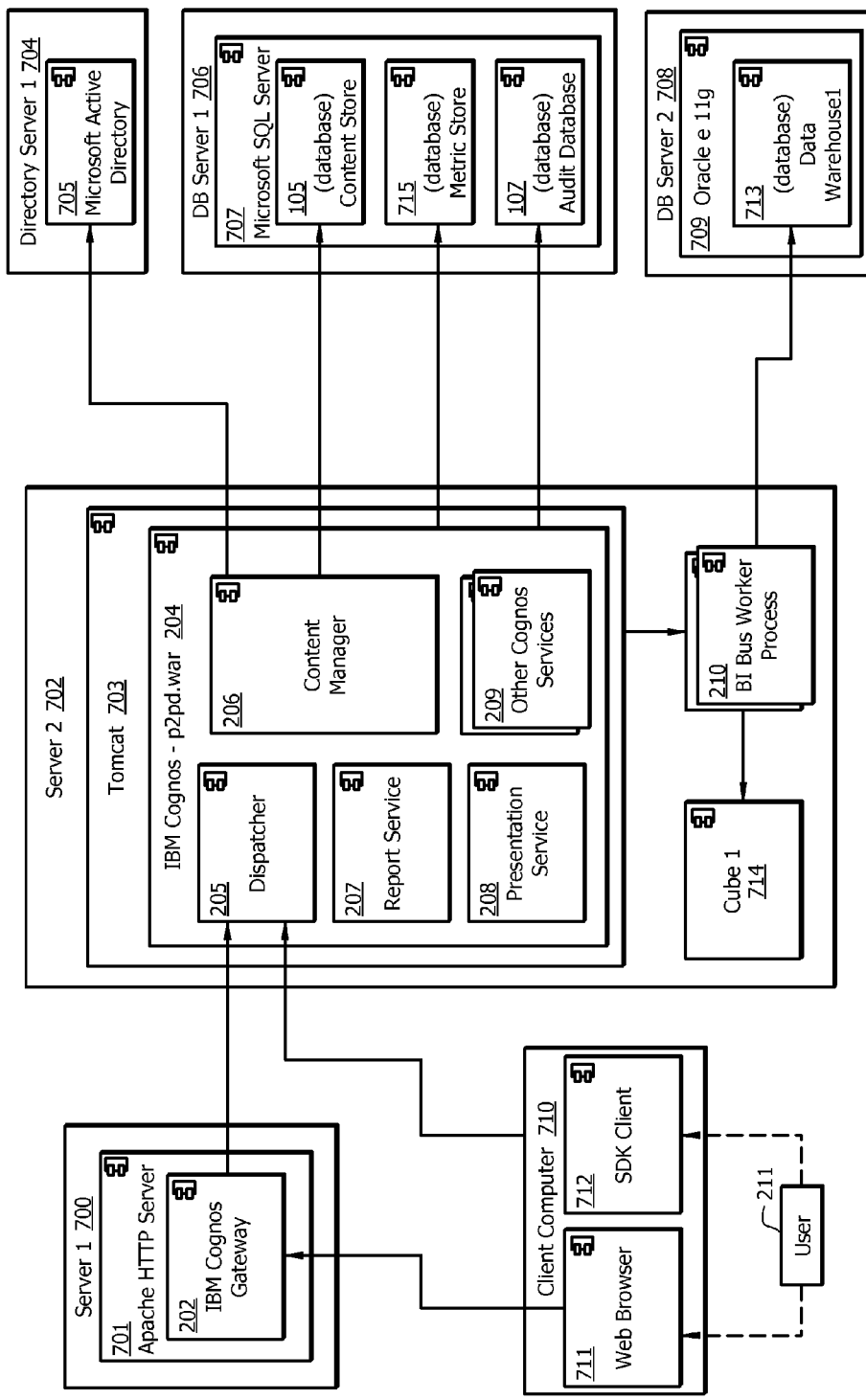
FIG. 2A depicts a schematic illustration of an example deployment of a BI environment, namely, a UML Deployment Diagram, according to an implementation of the present disclosure.

An instance of a BI environment may be configured and deployed in many variations. For example, the instance of the BI environment may be hosted on single or multiple servers, configured with single or multiple gateways, configured with single or multiple servlet containers/application servers, and/or any other suitable configurations. While FIG. 1B depicts a single set of the components and FIG. 2A depicts one way to deploy this single set of components, various implementations may use different appropriate configurations deployed in different manner(s).

In some implementations, instance 100 may be divided into two tiers the web tier and the application tier. The web tier may include a gateway 202 of the BI environment that may be hosted in a web server 201, such as Apache's HTTP Server or Microsoft's IIS, for example. The application tier may include a web application 204 and/or a BI Bus Worker Processes 210. A web application 204 is depicted as p2pd.war and may be hosted in an application server and/or servlet container 203 (e.g., IBM Websphere Application Server or Apache Tomcat). Zero or more BI Bus Worker Processes 210 may be managed by p2pd.war 204.

Webserver 201 may handle incoming HTTP requests that are generated by a web browser and/or some other HTTP based client. While the term "HTTP requests" is used herein, any suitable protocol can be utilized, including but not limited to HTTP protocol, HTTPS protocol, SPDY protocol, and/or any other suitable alternative to HTTP. Gateway 202 may be responsible for serving static web content such as, HTML, CSS, JavaScript, images of various formats, and/or any other suitable static content. This static content may constitute at least a portion of the web interfaces of the BI environment. Examples of such web interfaces may include Cognos Connection, authoring studios 112, and/or any other suitable web interfaces. Gateway 202 may be responsible for forwarding certain HTTP requests to the dispatcher 205 that is hosted inside p2pd.war 204 of the BI environment.

p2pd.war 204 may be responsible for managing and/or orchestrating much of the behavior of instance 100 of the BI software, such as, rendering dynamic content (e.g., as shown in Cognos Connection, in response to an HTTP request from a browser based client; responding to requests to execute BI artifacts, such as reports; initiating scheduled activities, such as scheduled report execution; initiating delivery of the generated report outputs; and/or any other suitable actions. p2pd.war 204 may host service(s) and/or component(s) including, but not limited to the following examples:

1. Dispatcher 205 which may be responsible for routing incoming requests to their appropriate target.

2. Report service 207 which may be responsible for servicing various artifact execution related requests. Artifact execution related requests may be delegated in whole or in part to BI Bus Worker Process 210. The BI Bus Worker Processes 210 may be responsible for performing queries, aggregating results, etc.

3. Presentation service 208 which may be responsible for rendering various visual representations used in interface screens and/or components for transforming generic XML responses from other services into an output format such as HTML or PDF.

4. Content manager 206 which may be responsible for serving as access point for objects that live in Content Store database 105. Operations may include add, query, update, delete, move and/or copy. The content manager 206 may be responsible for import and/or export of content and/or archives; and/or may serve as the conduit for authentication requests for interacting with External Security Provider(s) 104.

5. Other BI services 209 which may represent the numerous other services that are or may be deployed inside of p2pd.war 204. Services may include agent service, batch report service, data movement service, delivery service, event management service, job service, log service, metric studio service, migration service, planning job service, planning web service, planning administration console service, planning data service, system service, and/or any other suitable services.

As noted, FIG. 1B depicts an IBM Cognos BI environment as an example. As such, reference to IBM Cognos documentation such as the "IBM Cognos Business Intelligence Version 10.1.1 Architecture and Deployment Guide" (which guide, as well as Version 8.4.1, is hereby incorporated by reference to the extent that it does not conflict with the described systems and processes) may help to further describe details of the UML Component Diagram of FIG. 1B (available at "Cognos Business Intelligence Version 10.1.1 Product Documentation." IBM. N.p., n.d. Web. 22 Oct. 2012. <http://www-01.ibm.com/support/docview.wss?uid=swg27021353>; and "Cognos 8 Business Intelligence Version 8.4.1 Product Documentation." IBM. N.p., n.d. Web. 22 Oct. 2012. <http://www-01.ibm.com/support/docview.wss?uid=swg27022336>.).

Certain services in p2pd.war 204 may delegate to BI Bus Worker Process 210, which may be responsible for querying, aggregating, and/or summarizing data stored in one or more BI data sources 108.

As depicted in FIG. 1B, User 211 may be a generic classification for a User of instance 100 of the BI software. As noted with reference to FIG. 1A, User 211 may be a BI consumer 101, a BI administrator 113, a BI author 102, a BI modeler 103, and/or some other category of User of the system. In some implementations, User 211 may interact with instance 100 of the BI software via a web browser and the web browser, in turn, issues HTTP or HTTPS requests to the gateway 202. In some implementations, a User 211 may use a tool that targets requests directly at Dispatcher 205 (e.g., a tool that utilizes a Software Development Kit (SDK) from the relevant BI vendor to issue SOAP (simple object access protocol) requests or other remote requests and/or a tool that directly issues raw SOAP requests and/or other remote requests which are targeted at remotely accessible services exposed by instance 100 of the BI software).

FIG. 1C illustrates an implementation of a UML Component Diagram that depicts a high level view of selected components in an example BI ecosystem 300. As illustrated in FIGS. 1A and 1B, a single instance 100 of the BI software is depicted; however, in other implementations, instance 100 may comprise a plurality of collaborating software processes running on a plurality of computers. In some implementations, depiction of instance 100 may include more than one UML component.

The BI Ecosystem 300 may include the BI environment 200, data sources accessed by the BI environment, external security provider 104, ETL processes 302 which load the data into the BI Data sources 108, and/or Upstream Data sources 108, from which the ETL Processes pull data. BI environment 200 may include instance 100, it's associated Content Store database 105, associated metrics store databases 106, an optional audit database 107, and/or BI data sources 108 (e.g., a variety of data source types, such as relational database, OLAP cubes, flat files, XML files, web services, and/or other physical and/or virtual data sources).

In some implementations, Upstream data sources 303 may include sources of data not intended for direct use by instance 100 such as, databases that support OLTP systems, databases conceived and/or used for other purposes, databases not designed for efficient access by BI systems, data sources that contain data duplicative of other data accessible by instance 100, data sources that contain data that must be transformed to increase its usefulness when accessed by instance 100, flat files and/or data exports from other systems, and/or various other sources of data not directly accessible by instance 100 (e.g., for either technical or non-technical reasons).

ETL (extract, transform, and/or loading) processes 302 may be responsible for extracting and/or transforming data from one or more upstream data sources 303, and pushing the data into one or more BI data sources 108 (e.g., operational data sources and/or data warehouses). ETL processes 302 may be implemented using third party ETL software (e.g., Informatica Power Center, IBM InfoSphere DataStage, IBM Cognos Data Manager, Talend Open Studio and/or Microsoft SQL Server Integration Services) and/or via software programs written in a selected programming/scripting language. In some implementations, both third party ETL software and custom ETL program(s) may be used in combination.

BI ecosystem 300 may include BI environment 200, External Security Provider(s) 104, and/or a set of ETL processes 302 and/or upstream data sources 303.

Figure 2B:
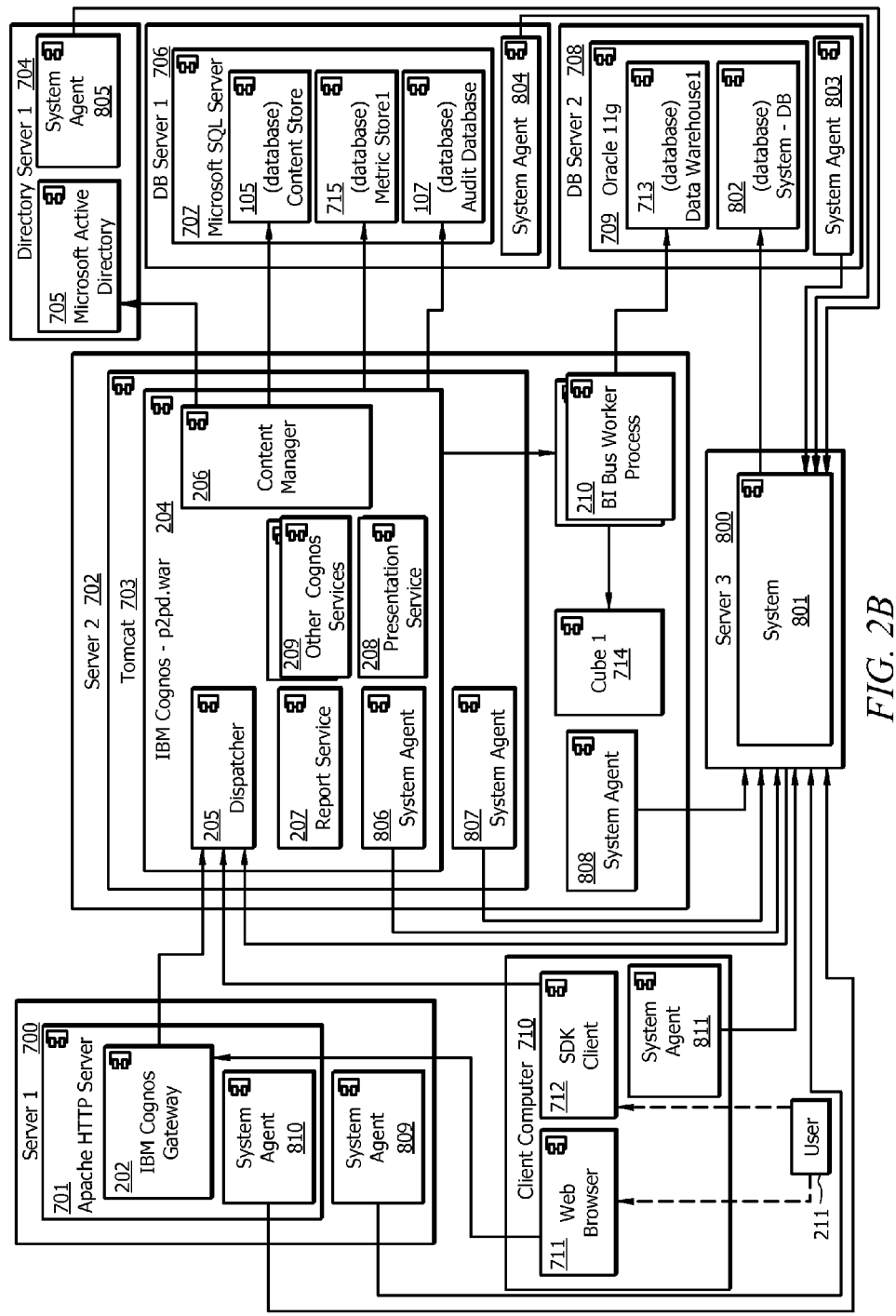
FIG. 2B depicts a schematic illustration of an example deployment of a BI environment and system, namely, a UML Deployment Diagram, according to an implementation of the present disclosure.

FIGS. 2A and 2B are schematic illustrations of an implementation of an example deployment of a BI environment and various components. It should be understood that BI ecosystem, and the deployment thereof, shown in FIGS. 2A and 2B are for illustrative purposes only and that any other suitable system or subsystem could be used in conjunction with, or in lieu of, the described BI ecosystem.

FIG. 2A illustrates an implementation of a UML Deployment Diagram that depicts a high level view of an example of how a portion of the components of the BI environment 200 may be deployed on one or more physical computers.

Addressing first the client side components depicted in FIG. 2A, User 211 may utilize client computer 710 to access instance 100 and BI environment 200. Client computer 710 may host a web browser 711 and an SDK client 712.

Web browser 711 may be directed by User 211 to issue requests (e.g., HTTP requests) to Gateway 202, which is hosted in Apache HTTP server 701, running on server 1 700. The Gateway 202 may forward the requests or at least a portion of the requests to the Dispatcher 205, in some implementations. When utilizing web browser 711 to access instance 100, various components of instance 100 may be depicted and utilized from web browser 711 including, but not limited to, authoring studios 112, BI dashboards, BI prompt screens, BI outputs, BI administration screens, and/or any other suitable information generated by or pertaining to instance 100.

SDK client 712 may be an example of any client program that issues SOAP requests and/or other remote invocation requests. These SOAP requests may be frequently targeted directly at dispatcher 205. In some implementations in which IBM Cognos is used for the BI environment, examples of SDK client 712 may include certain modeling tools provided by IBM Cognos such as framework manager 111, transformer 110, and/or metrics designer 109. In some implementations in which third party tools are used (e.g., instead of and/or in addition to those provided by IBM Cognos), examples of SDK client 712 may include third party tools that utilize SOAP requests and/or other remote invocation requests to access and/or manipulate content and/or configuration in instance 100 and/or orchestrate various activities in instance 100. Although not shown in FIG. 2A, in some implementations, SDK client 712 may issue requests to gateway 202.

Now addressing the server side components depicted in FIG. 2A, Apache HTTP server 701 may be an implementation of web server 201 depicted in FIG. 1B. Tomcat 703 may be an implementation of servlet container 203 depicted in FIG. 1B. Cube 1 714 and Data Warehouse) 713, alone or together, may be implementations of BI data sources 108 depicted in FIG. 1B.

In some implementations as illustrated in FIG. 2A, server 1 700 may run Apache HTTP server 701, which is configured with gateway 202. Gateway 202 may be configured to serve static content deployed on a file system accessible to Apache HTTP server 701 processes. Gateway 202 may recognize one or more instances of dispatcher 205. Although depicted in FIG. 2A as a single instance of dispatcher 205, a plurality of instances of dispatcher 205 may be used. In some implementations, at least a portion of the requests targeted at gateway 202 (e.g., requests for non-static content) may be forwarded to dispatcher 205 for processing.

As depicted in the implementation of FIG. 2A, Tomcat 703 (a servlet container) may be a process that can run on server 2 702. The p2pd.war 204 web application may also be deployed and run inside of Tomcat 703. In some implementations, zero or more instances of BI Bus Worker Process 210 may run on server2 702. The p2pd.war 204 may manage and/or delegate processes to BI Bus Worker Process 210. BI Bus Worker Process(es) 210 may be used to access data from data warehouse 1 713 (e.g., an Oracle Database 709) and/or Cube 1 714.

The directory server 1 704 may host Microsoft active directory 705, which is an implementation of external security provider (e.g., External Security Provider 104 depicted in FIG. 1B). Content manager 206 may interact with Microsoft active directory 705 for operations such as authentication requests, enumerating lists of Users, groups, roles and/or organizational hierarchy structures, and/or querying for Users, groups and/or roles (e.g., that match predetermined criteria).

The DB server 1 706 may be a server that hosts an instance of Microsoft SQLServer 707. The instance of Microsoft SQLServer 707 may host database(s) that are utilized by instance 100, including, but not limited to, the p2pd.war 204 component of instance 100. The databases may include the Content Store database 105, Metric Store 1 database 715, and/or audit database 107. Moreover, content manager 206 may access, store, and/or manipulate BI content and/or configuration in Content Store database 105. The p2pd.war 204, and/or components or delegates thereof, may store and/or access metric related data in Metric Store 1 database 715 and may store and/or access audit data in audit database 107. DB server 2 708 may host an instance of Oracle 11g 709 and this instance of Oracle 11g 709 may host data warehouse) database 713 (e.g., a database schema). The BI Bus Worker Process 210 may access data in the Data warehouse 1 database.

FIG. 2B illustrates an implementation of a UML Deployment Diagram that depicts a high level view of an example of how BI environment 200 may potentially change when the described system(s) and/or process(es) are implemented and/or configured.

System 801 depicts an implementation of the described system(s) and process(es). As illustrated in FIG. 2B, system 801 may be hosted on server 3 800. The system 801 may be communicably coupled (e.g., directly coupled and/or indirectly coupled through a network connection) with component(s) of the BI ecosystem and/or system agent(s). System 801 may orchestrate one or more modules, such as system agents 803 through 811. The described systems and/or processes are not limited to any particular number or type of system agents, and any suitable number and/or type of system agents may be orchestrated by system 801. System agents 803 through 811 may be utilized to collect, record (e.g., store on a memory coupled to the system), and/or transmit statistics, such as resource usage, server load, and/or network traffic on any one or more components of BI environment 200 or BI ecosystem 300. System agents 803 through 811 may also be utilized to record communication requests issued by and/or targeted to components of BI environment 200 or BI ecosystem 300. Module(s) such as the described system agent(s) may perform one or more of the operations as described in FIGS. 5A, 5B, 5C, 5D, 5E, 6A, 6B, 7A, 7B, 7C, 8A, 8B, 8C, and/or 9. Although shown in one example configuration in FIG. 2B, system agents may be deployed inside or alongside any of the components or servers in the BI Ecosystem.

In some implementations, system 801 may direct system agents 803 through 811 remotely by instructing them to perform operations such as: start recording, stop recording, transmit recorded data, respond to queries regarding recorded data or local environment, purge recorded data, update configuration, list configuration, shutdown, reset, recalibrate and/or initialize. System agents 803 through 811 may be deployed on the various computers hosting components related to BI ecosystem 300 and/or inside container components that are related to BI ecosystem 300. The locations and/or configurations of system agents depicted as 803 through 811 in FIG. 2B are illustrations of an implementation of the described systems and processes; however, and any appropriate location and/or configuration may be utilized.

As illustrated in FIG. 2B, system agents 803 through 811 include:

1. System agent 803 which may be utilized to monitor and/or record data such as resource usage, server load and network traffic on DB server 2 708.

2. System agent 804 which may be utilized to monitor and/or record data such as resource usage, server load and network traffic on DB server 1 706.

3. System agent 805 which may be utilized to monitor and/or record data such as resource usage, server load and network traffic on directory server 1 704.

4. System agent 806 which may be utilized to monitor and/or record data such as process calls (e.g., including the corresponding context and timings thereof), resource usage, and/or other suitable data residing within p2pd.war 204.

5. System agent 807 that may be utilized to monitor and/or record data relevant to hosted components, services, requests and/or other data within Tomcat 703.

6. System agent 808 which may be utilized to monitor and/or record data such as resource usage, server load and network traffic on server2 702.

7. System agent 809 which may be utilized to monitor and/or record data such as resource usage, server load and network traffic on server1 700.

8. System agent 810 which may be utilized to monitor and/or record data, such as requests and timings, residing within Apache HTTP server 701.

9. System agent 811 which may be utilized to monitor and/or record relevant data such as resource usage, machine load, and network traffic and requests on a client side computer 710 that is utilizing BI environment 200 or viewing outputs produced from BI environment 200.

System 801 may monitor and/or record persistent information such as content, configuration, history and/or statistics in system DB database 802. The data monitored and/or recorded by the system agent(s) may be delivered to and/or stored in a memory (e.g., coupled to the system and/or of the system).

In some implementations, system 801 and/or portions thereof (e.g., modules of the system) may:

1. render a User experience for the described system(s) and process(es), respond to User input for various User interactions with the described system(s) and process(es), including but not limited to the described User interactions;

2. execute and/or orchestrate examination tests and/or load tests;

3. perform and/or orchestrate analysis of selected BI content or BI configuration; and/or 4. perform other operations disclosed (e.g., operations described in FIGS. 5A-9 and/or other operations and/or combinations of operations) as part of the described system(s) and process(es).

Figure 3:
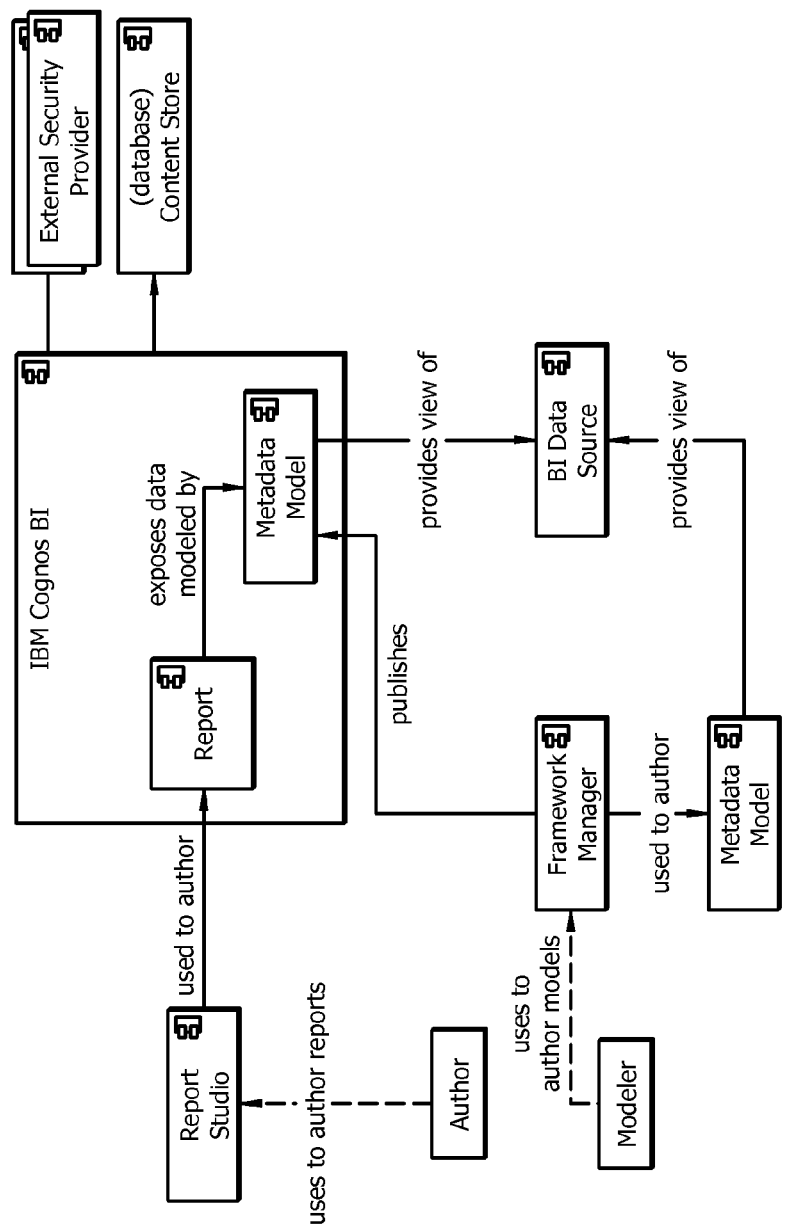
FIG. 3 depicts a schematic illustration of an example metadata model in a BI environment, namely a UML Component Diagram, according to an implementation of the present disclosure.

FIG. 3 depicts a schematic illustration of an example metadata model in a BI environment, namely a UML Component Diagram, according to an implementation of the present disclosure. A metadata model (e.g., package in Cognos) may provide a view of one or more data sources. The metadata model may provide a more business friendly and/or User-friendly "semantic" layering on top of physical data sources. This layer may be used to organize data into hierarchical dimensions, define aggregation (e.g., "rollup") rules, define row level security, internalizations, etc. A portion may be an exposed portion (e.g., slice) of a larger metadata model that is authored in the Framework Manager. For example, a User may build a metadata model and publish at least a portion as a package. The package may be stored in a database, such as IBM Cognos Content Store database.

In some implementations, BI artifacts such as reports may be associated with a metadata model. The report may expose data through the associated metadata model (or in some cases, a report may expose data directly from a BI data source, effectively bypassing the metadata modeling layer). In some implementations, the BI environment may include a Framework Manager Metadata Model. The Framework Manager Metadata Model may be offline and/or unpublished. The Framework Manager Metadata Model may be stored in a file system.

Figure 4A:
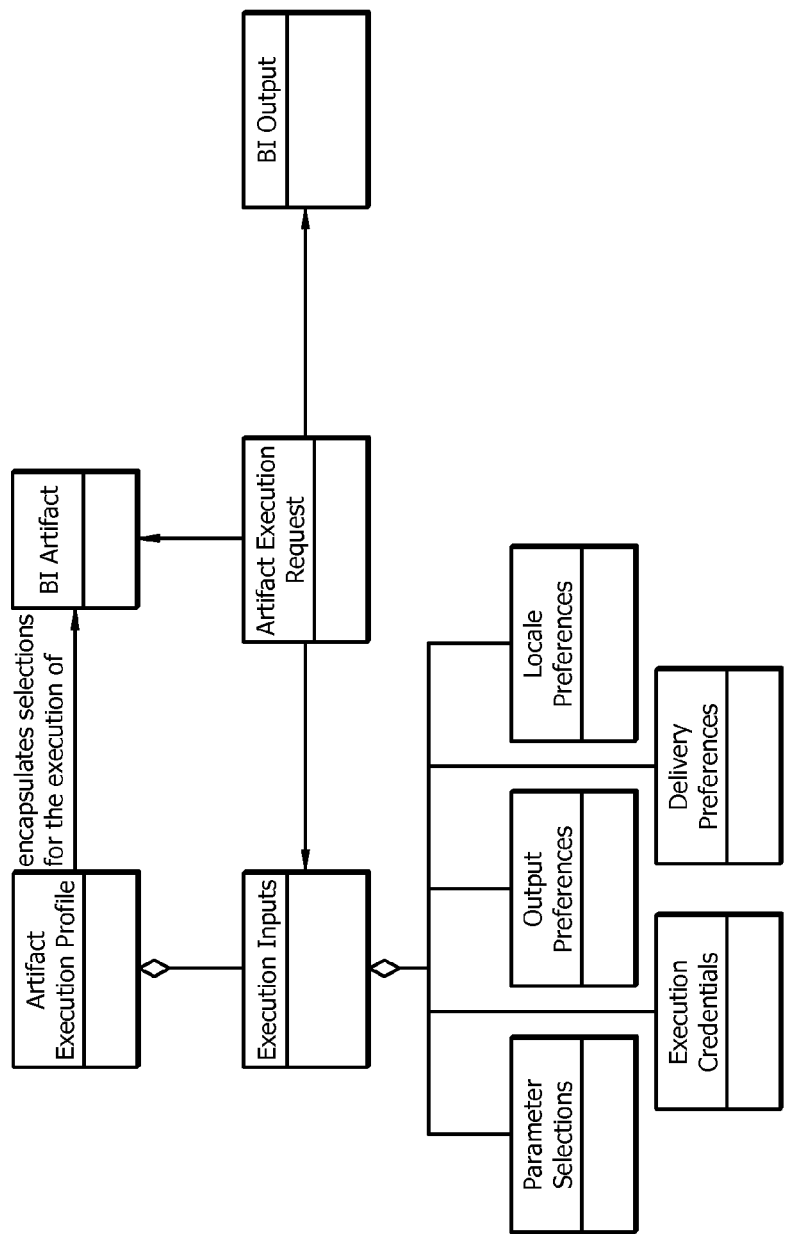
FIG. 4A depicts a schematic illustration of an example artifact execution profile, namely a UML Analysis Class Diagram, according to an implementation of the present disclosure.

FIG. 4A depicts a schematic illustration of an example artifact execution profile, namely a UML Analysis Class Diagram, according to an implementation of the present disclosure. An artifact execution profile represents one way to execute a BI artifact. An artifact execution profile aggregates and persists one set of execution input selections. It can be burdensome on Users if there are a large number of choices that must be made each time they execute a BI artifact. An artifact execution profile allows a User to save off these selections so that they can later re-execute the same BI artifact with the exact same selections. One or more BI outputs (e.g., one for each requested format) may be generated by the BI system in response to the execution of a BI artifact in the BI environment (e.g., successful execution). For example, the BI Output may be a PDF, an Excel, an HTML, and/or any associated resource and/or any other appropriate type of file. The BI output may be delivered as a file or a stream of data (in compressed or uncompressed form).

Figure 4B:
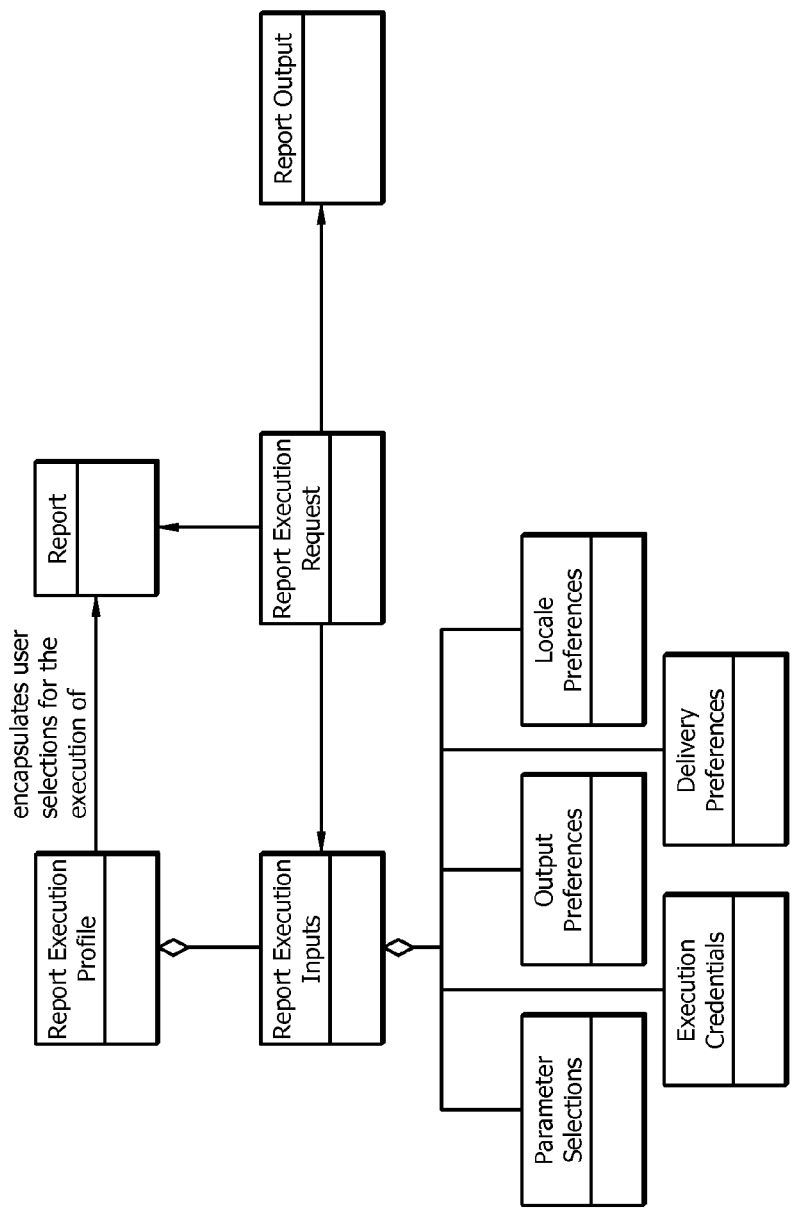
FIG. 4B depicts a schematic illustration of an example report execution profile, namely a UML Analysis Class Diagram, according to an implementation of the present disclosure.

FIG. 4B depicts a schematic illustration of an example report execution profile, namely a UML Analysis Class Diagram, according to an implementation of the present disclosure. A report execution profile represents one way to execute a report. A report execution profile aggregates and persists one set of execution input selections. It can be burdensome on Users if there are a large number of choices that must be made each time they execute a report. A report execution profile allows a User to save off these selections so that they can later re-execute the same report with the exact same selections (e.g., parameters such as Holding, All Sectors (2007); Holding All Sectors (2007-present)). One or more report outputs (e.g., one for each requested output format) may be generated by the BI System in response to an execution of a report (e.g., a successful execution). For example, the report output may include a PDF, an Excel, an HTML, an MHTML and/or any associated resource and/or any other appropriate type of file. The report output may be delivered as a file or a stream of data (in compressed or uncompressed form).

Figure 5A:
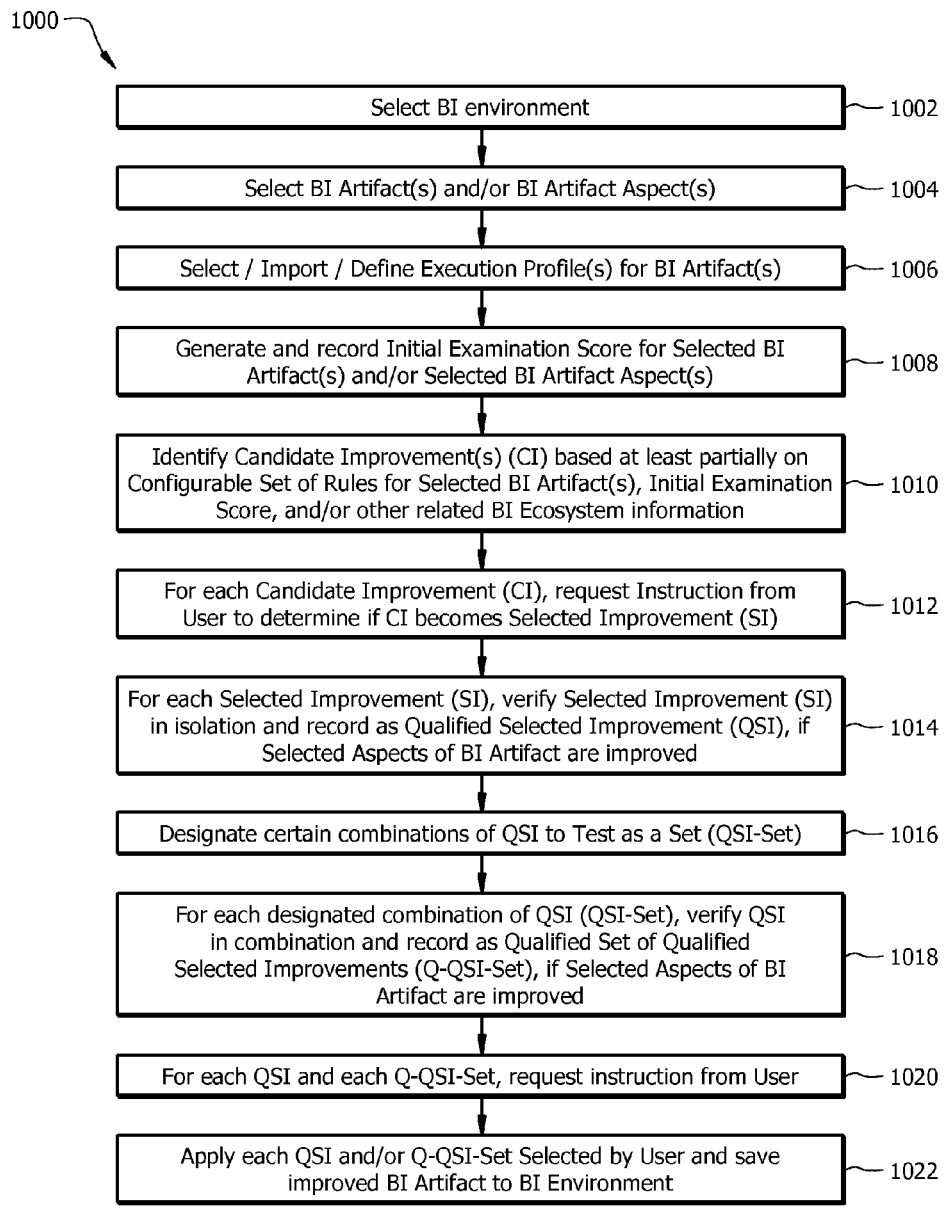
FIG. 5A is a flowchart of an implementation of an example process for attended improvement of a single BI artifact in a BI ecosystem such as that depicted in FIGS. 1 and 2.

FIG. 5A illustrates an implementation of a flowchart of an example of a process 1000 for a computer-assisted improvement of a business intelligence ecosystem wherein a single BI artifact is to be improved. In describing the process 1000 of FIG. 5A, reference may be made to any of FIGS. 1 through 4 for clarity purposes. It should be understood that the process 1000 reflected in FIG. 5A is for illustrative purposes only and that any other suitable operations may be used in conjunction with, or in lieu of, the described operations of process 1000. For example, the specific sequence of the operations depicted in the flowchart of FIG. 5A and/or any flowcharts depicting such operations in greater detail is not intended to limit the scope of the present disclosure and any suitable re-ordering of operations still falls within the scope of the described system and process.

In some implementations, prior to beginning process 1000 illustrated in FIG. 5A, a described system may have previously been installed and configured to recognize at least one BI environment. In some implementations, a User may have logged into the described system and instructed the system that improvement of a single BI artifact is desired.

A User may select a BI environment (operation 1002). For example, the User may select a desired BI environment in which resides a BI artifact to be potentially improved. The system (e.g., server 801) may receive the selection of the BI environment (e.g., from the User). In some implementations, the system may generate a listing of BI environments for presentation to the User (e.g., through a graphical User interface or GUI). The BI environment desired for improvement by the User may be selected from a group of BI environments, such as development BI environment, a QA BI environment, a production BI environment, a performance testing BI environment, a sandbox BI environment, a virtualized replica (or partial replica) of a BI environment and/or any other suitable BI environment.

The User may select for improvement one or more BI artifacts and/or one or more aspects of the BI artifacts (operation 1004). In some implementations, the system may present a listing of BI artifact(s) and/or aspect(s) for improvements (e.g., through a User interface generated by the system) and the User may select one or more of the BI artifact(s) and/or aspect(s). The system may receive the selections for improvement (e.g., the selected BI artifact(s) and/or aspect(s) of the selected BI artifact).

In some implementations, the BI artifact may be a report. In the context of IBM Cognos, examples of BI artifacts that may be selected for improvement include, but are not limited to, reports, active reports (or "interactive reports"), analyses (or "analysis objects"), queries (or "query objects"), dashboards, events, workspaces, business insight advanced objects and/or any other suitable BI artifacts. The User may select one or more aspects of the BI artifact (e.g., a portion of and/or all) to be improved. For example, the selected aspects of the BI artifact may include, but are not limited to, execution time, efficiency, generated output size, generated output efficiency, generated output accuracy, manageability, consistency, correctness, redundancy, User-defined aspects, and/or any other aspects related to the selected BI artifact or derived objects (e.g., a BI output produced by successful execution of a BI artifact in the BI environment).

The User may select, import, and/or define one or more artifact execution profiles for the selected BI artifact(s) (operation 1006). In some implementations, if the selected BI artifact is a report, one or more report execution profiles associated with that report may be selected, imported, and/or defined by the User. The system may determine the execution profile based on the selection, importation and/or definition of the execution profile by the User. For example, the User may provide a definition of the execution profile (e.g., to the system). In some implementations, the User may select the execution profile (e.g., from a listing of execution profiles) and the system may retrieve the execution profile from a memory of the BI ecosystem.

The system may generate and/or record an Initial Examination Score for the selected BI Artifact(s) and/or BI Artifact Aspect(s) (operation 1008). For example, the original version (e.g., unmodified and/or existing version) of the selected BI artifact may be executed in the selected BI Environment. The BI Ecosystem may be monitored before, during, and/or after execution through the use of system agents and/or other monitoring means. The Initial Examination Score may be based at least partially on the data from monitoring. For example, when generating an Initial Examination Score, the system may calculate and/or capture initial examination data (e.g., data and/or score) relating to relevant aspects of the selected BI artifact in its original state before any system recommended modifications are applied to the BI artifact (or any other components of the BI ecosystem). The data may be related to execution or non-execution data.

Figure 5B:
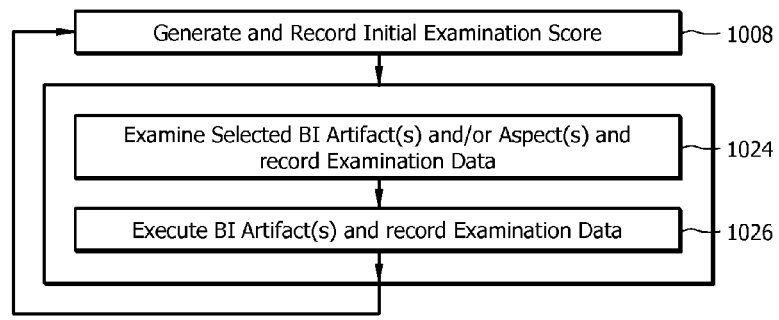
FIG. 5B is a flowchart of an implementation of an example process for the "Generate and Record Initial Examination Score" operation depicted in FIG. 5A.

FIG. 5B illustrates a flowchart of an implementation of a process for generating and/or recording an Initial Examination Score for the original version of the selected BI artifact and/or selected aspects thereof (operation 1008). As illustrated in FIG. 5B, in order to generate an Initial Examination Score (operation 1008), the system may examine the selected BI artifact(s) and may record data including calculated scores for each selected aspect (operation 1024). For example, the system may perform a detailed inspection of the selected BI artifact and/or cross-reference it with other information related to the BI artifact and/or record examination data for non-execution related aspects of the selected BI artifact. The detailed inspection may be at least partially based on a set of configurable rules. For example, the system may include a set of rules based at least partially on, historical data (e.g., past aspects improvements in the BI artifact selected and/or other BI artifacts), User specified areas, and or other information that may provide ways to identify improvements. The set of rules may include a default set of rules that may be configured based on the BI artifact and/or aspect selected and/or User-configured.

The system may then execute the BI Artifact(s) and may record the examination data (operation 1026). For example, the system may execute the selected BI artifact at least one time for each selected execution profile and/or record relevant examination data from the BI ecosystem before, during and/or after each such execution (e.g., the data may be execution data and/or non-execution data). The examination data for non-execution related aspect and the examination data recorded before, during and after each execution of a BI artifact in the BI environment may be referred to as the non-execution recorded examination data. This first examination/testing of the original version of the selected BI artifact may be referred to as the Initial Examination Score. For example, this Initial Examination Score may include and/or be at least partially based on (e.g., for each execution):

Total length of time for execution to complete;
Lengths of time spent in each phase of execution;
The resulting BI ecosystem requests that were generated by the execution;
Load metrics on the BI server(s) before, during and after the execution;
Resource usage metrics on the BI server(s) before, during and after the execution;
Load metrics on the database server(s) before, during and after the execution;
Resource usage metrics on the database server(s) before, during and after the execution;
Outputs produced by the artifact (stored for later reference and comparison);
Amount of data produced by the execution;
Native queries generated by the execution (e.g. SQL, MDX, or any other suitable programming language or syntax); and/or
Query execution plans (or other suitable information) for the native queries that were generated by the execution.

In some implementations, a more accurate Initial Examination Score may be obtained by repeating operation 1008 in FIG. 5A one or more times. For example, the system may execute the selected BI artifact more than once and/or may apply an appropriate statistical analysis to the multiple instances of recorded examination data. By repeating operation 1008, the likelihood of obtaining a statistically significant Initial Examination Score may be increased. For example, if a first execution of the selected BI artifact results in examination data that is a statistical outlier, repeating operation 1008 one or more times and applying an appropriate statistical analysis may reduce the likelihood that the statistical outlier is deemed an accurate representation of the Initial Examination Score for the selected BI artifact.

After determining the Initial Examination Score, in some implementations, the system may analyze the BI artifact and/or may identify candidate improvements (CI). As illustrated in FIG. 5A, the system may identify candidate improvements (CI) based at least partially on a configurable set of rules for selected BI Artifact(s), the Initial Examination Score, and/or other related BI ecosystem information (operation 1010). During this analysis, the system may retrieve (e.g., from a memory coupled to the system) and may utilize a configurable set of rules that are used to identify one or more potentially improvable issues in the selected BI artifact. Potentially improvable issues may include, but are not limited to: inefficiencies, errors, structural problems, anti-patterns, unnecessary complexity, deviation from associated standards, formatting or visualization directives which may incur greater processing time and/or consume greater resources during BI artifact execution and generation of resultant BI outputs (by the BI system), formatting and/or visualization directives which cause greater complexity in the resultant BI outputs (e.g., potentially causing the resultant BI outputs to be larger in size or more expensive to render in the appropriate viewer), and/or any other potentially improvable issue.

In some implementations, during operation 1010, the system may perform a detailed examination/inspection of the BI artifact. As part of the inspection, the system may cross-reference the information determined through the inspection with other related sources of information in the BI ecosystem. For example, if the BI artifact sought to be improved is a report, the related sources of information may include, for example, the associated metadata model, the underlying data sources, the actual data contained within those data sources, and/or any other suitable source of information.

Instruction may be requested from the User to determine if a Candidate Improvement (CI) becomes a Selected Improvement (SI), for each candidate improvement (operation 1012). For example, the system may present, to the User, a group of identified candidate improvements that may potentially improve scores for the selected aspects of the BI artifact (thereby improving the BI ecosystem). For each candidate improvement (CI), the User may be prompted to instruct the system what action, if any, to take with respect to such candidate improvement(s) identified by the system. The system may receive the instructions regarding the Selected Improvement(s) from the User through a GUI, for example.

Figure 5C:
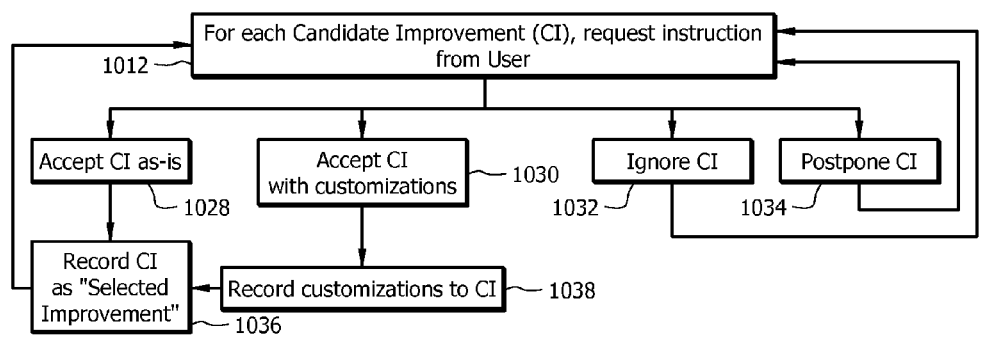
FIG. 5C is a flowchart of an implementation of an example process for the "For Each Candidate Improvement (CI), Request Instruction From User" operation depicted in FIG. 5A.

FIG. 5C illustrates a flowchart of an implementation of an example process for requesting instructions for each candidate improvement from a User (operation 1012). As illustrated in FIG. 5C, the User may provide any of a number of possible instructions for each candidate improvement identified and presented to the User by the system. For example, possible instructions from the User may include one or more of the following instructions:

Accept the candidate improvement as-is (operation 1028);
Accept the candidate improvement, but customize the candidate improvement in a manner that is manually configured by the User (operation 1030);
Ignore the candidate improvement (operation 1032); or
Postpone the candidate improvement (operation 1034).

If the candidate improvement under consideration is accepted as-is by the User (e.g., in operation 1028), then the candidate improvement may be recorded as a "selected improvement" (operation 1036) and any other candidate improvement(s) may be considered by the User (e.g., instructions may be requested from the User regarding the other candidate improvement(s). If the candidate improvement under consideration is accepted but with one or more customizations (e.g., in operation 1030), then the customization(s) may be recorded to the candidate improvement (operation 1038), the customized candidate improvement may be recorded as a "selected improvement" (operation 1036), and any other candidate improvement(s) may be considered. If the candidate improvement under consideration is ignored (e.g., in operation 1032), then the candidate improvement may be removed from the group of candidate improvements and any other candidate improvement(s) may be considered by the User. If the candidate improvement under consideration is postponed (operation 1034), then, in some implementations, the candidate improvement may be neither removed from the group of candidate improvements nor recorded as a "selected improvement." The candidate improvement under consideration may be maintained for future consideration by the User, and any other candidate improvement(s) may be considered by the User. When instructions have been received from the User for the candidate improvement(s) identified and presented by the system, the system and process may then proceed, in some implementations.

The system may methodically and/or iteratively apply each selected improvement (SI)—either as-is or with customization, according to the User's instructions to a copy of the original version of the selected BI artifact (operations 1014, 1018). For each iterative application of a selected improvement in isolation, or a combination of two or more selected improvements, the system may reapply the examination test to collect new examination data (e.g., execution data and/or non-execution data from monitoring the BI artifact or other portions of the BI ecosystem) related to the new version of the BI artifact and/or any selected aspects thereof before, during, and after execution of such new version of the BI artifact. The system may compare the new examination data related to the new version of the BI artifact and/or any selected aspects thereof to the Initial Examination Score for the unmodified version of the BI artifact and/or any selected aspects thereof (e.g., BI artifact and/or aspect(s) without the SI(s)). In this manner, the system may verify the selected improvement or combination of improvements to determine that the SI (operation 1014) or QSI (operation 1018) does improve (e.g., based at least partially on the examination data such as scores from examination) one or more of the selected aspects of the BI artifact. If such verification is successful, then the system may record the selected improvement, or combination of improvements, as a qualified selected improvement (operation 1014) or a qualified set of qualified selected improvements (operation 1018).

Figure 5D:
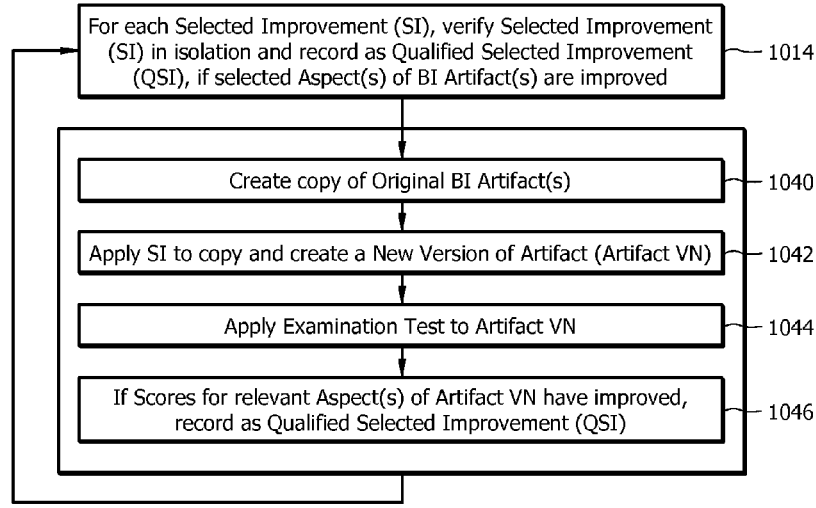
FIG. 5D is a flowchart of an implementation of an example process for the "For Each Selected Improvement (SI), Verify Selected Improvement in Isolation and Record as Qualified Selected Improvement (QSI) if Selected Aspects of BI Artifact are Improved" operation depicted in FIG. 5A.
Figure 5E:
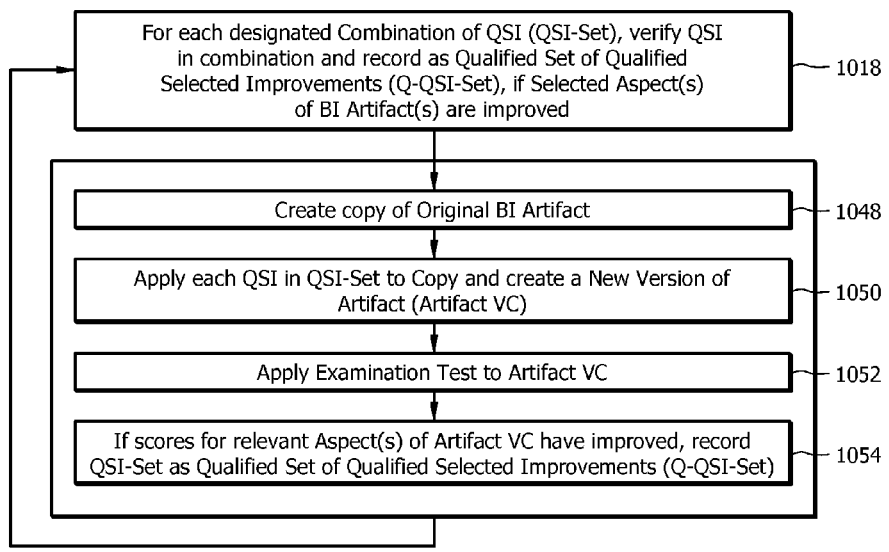
FIG. 5E is a flowchart of an implementation of an example process for the "For Each QSI-Set, Verify Designated QSI in Combination and Record as Qualified QSI-Set if Selected Aspects of BI Artifact are Improved" operation depicted in FIG. 5A.

FIGS. 5D and 5E illustrate implementations of example processes for implementing operations 1014 and 1018, regarding verifying selected improvements in isolation and verifying selected improvements in combination, respectively. In some implementations, a list of selected improvements may be presented to the User such that the User is allowed to define whether the selected improvements should be verified in isolation and/or in combination with one another. Moreover, the User may define one or more "selected improvement groups," each of which contains two or more selected improvements that will be verified together (e.g., in combination with one another).

In FIG. 5D, an implementation is illustrated for verifying whether one or more selected improvements, considered in isolation, improve the selected one or more aspects of the selected BI artifact (operation 1014). For each selected improvement, the system may first create a copy of the original BI artifact (e.g., unmodified by SI) selected for improvement (operation 1040). This may preserve the original version of the BI artifact so that, in the event no improvement is ultimately applied to the BI artifact, the original version of the BI artifact remains accessible by the system.

The system may apply the selected improvement to the copy of the BI artifact and may create a new version of the BI artifact (Artifact VN) (operation 1042). The system may apply an examination test to Artifact VN (operation 1044).

Using operation(s) approximately similar to or the same as the operations for generating an Initial Examination Score for the original version of the BI artifact, the examination test of Artifact VN (operation 1044) may include generating a collection of examination data relating to Artifact VN before, during, and after execution of such new version of the BI artifact. The system may monitor the Artifact VN and/or other portions of the BI ecosystem to generate the examination data. For example, a detailed examination/inspection of Artifact VN and recording of examination data for non-execution related aspects of Artifact VN and execution of Artifact VN (e.g., at least once) and/or recording of examination data from one or more other portions of the BI ecosystem and/or the BI ecosystem during and after each such execution. A score or other rating may then be determined for one or more aspects of Artifact VN based on this examination data.

The score and/or other rating for one or more aspects of Artifact VN may be compared to the score and/or other rating for the corresponding aspects of the original version of the BI artifact, such as the Initial Examination Score (e.g., from operation 1046). If the score and/or other rating for Artifact VN is improved relative to the score or other rating for the original version of the BI artifact, then the system may record the selected improvement (e.g., applied to create Artifact VN) as a qualified selected improvement (QSI).

In some implementations, if the score and/or other rating for Artifact VN is not improved relative to that of the original version of the BI artifact, then the system may disqualify the selected improvement and/or restrict the identification of the SI as a QSI by the system. If a selected improvement is disqualified, then the system may delete the selected improvement and/or may record the selected improvement (e.g., applied to create Artifact VN) as a disqualified candidate improvement. If the CI is recorded as a disqualified candidate improvement, the system may utilize such record in the future (e.g., as historical data) to analyze and assess the likelihood, or lack thereof, that certain types of candidate improvements may improve a BI artifact. In some implementation, the described system(s) and/or processes may maintain detailed statistics (e.g., historical data) on the outcomes of one or more of the candidate improvements (e.g., qualified and/or disqualified candidate improvements). These statistics (e.g., historical data) may then be used to determine trends over time.

In some implementations, operation 1018 may be restricted and/or skipped if the system is instructed by the User to consider only one selected improvement. For example, if one selected improvement exists, then there may be a single permutation of the selected improvement and that single permutation may be verified in isolation according to operation 1014 of FIG. 5D. If, however, the system is instructed by the User to consider more than one selected improvement, then the operations of FIG. 5E may be applied to consider whether various permutations of the more than one selected improvements may be desirable.

As illustrated in FIG. 5A, if there are multiple selected improvements under consideration, the system may designate certain combinations of the qualified selected improvements (QSI) (as determined in operation 1014) that should be tested as a set (QSI-Set) (operation 1016). In some implementations, the combinations designated by the system may encompass every possible permutation of the qualified selected improvements. In some implementations, the combinations designated by the system may encompass a subset of possible permutation of the qualified selected improvements (i.e., a non-exhaustive set of combinations).

In some implementations, the combinations designated by the system may be handled in a grouped process. For example, the combinations designated may be N qualified selected improvements at a time, where N is less than or equal to the total number of qualified selected improvements. In some implementations, the system may designate certain combinations based at least partially on factors for consideration, such as: historical statistics, time required for each examination test, and/or the number of qualified selected improvements. While operation 1016 of FIG. 5A indicates that the system automatically designate certain combinations of the qualified selected improvements that should be tested as a set, in some implementations, a User may be permitted to manually select and/or pre-configure specific combinations to be tested. For example, the system may receive User input regarding the designation of combinations of QSI and/or SI to test, in some implementations.

As illustrated in FIG. 5E, once the group of QSI-Sets has been designated, the system may verify whether each combination of designated qualified selected improvements improves the selected one or more aspects of the selected BI artifact (operation 1018). For each QSI-Set, the system may create a copy of the original BI artifact selected for improvement (operation 1048). The system may apply, to the copy of the original BI artifact, each qualified selected improvement encompassed within the QSI-Set under consideration, and may create a new version of the BI artifact (Artifact VC) (operation 1050).

The system may apply an examination test to Artifact VC (operation 1052). Similar to the operation(s) for generating an Initial Examination Score for the original version of the BI artifact and/or to the operation(s) for examining the Artifact VN (operation 1044), the examination test of Artifact VC (e.g., in operation 1052) may include monitoring the BI artifact and/or BI ecosystem to generate a collection of examination data (e.g., execution data and/or non-execution data) relating to Artifact VC before, during, and/or after execution of such new version of the BI artifact. For example, the operations may include a detailed inspection of Artifact VC and recording of examination data for non-execution related aspects of Artifact VC and execution of Artifact VC (e.g., at least once) and recording of examination data from the BI ecosystem during and after each such execution. A score and/or other rating may then be determined for one or more aspects of Artifact VC based on this recorded examination data.

The score or other rating for one or more aspects of Artifact VC may be compared to the score and/or other rating for the corresponding aspects of the original version of the BI artifact as previously determined in the Initial Examination Score. If the score and/or other rating for Artifact VC is improved relative to the score or other rating for the original version of the BI artifact, then the system may record the QSI-Set (e.g., combination of qualified selected improvements applied to create Artifact VC) as a qualified set of qualified selected improvements (Q-QSI-Set) (operation 1054).

If the score or other rating for Artifact VC is not improved relative to that of the original version of the BI artifact, then the system may disqualify the QSI-Set. If a QSI-Set is disqualified, then the system may delete the QSI-Set and/or may record the QSI-Set (applied to create Artifact VC) as a disqualified combination of candidate improvements. If recorded as a disqualified combination of candidate improvements, the system may utilize such record in the future (e.g., as historical data) to analyze and assess the likelihood, or lack thereof, that certain combinations of candidate improvements will improve a BI artifact. In some implementations, the described system(s) may maintain records (e.g., historical data) of both qualified and disqualified combinations of candidate improvements, which records can subsequently be used to determine trends.

In some implementations, verification of the candidate improvements in isolation and/or in combination may decrease the likelihood of skewed results. For example, when considering an execution time aspect of a report, it is possible that a first candidate improvement improves (i.e., speeds up) an execution time aspect by 20% while a second candidate improvement hurts (i.e., slows down) an execution time aspect by 5%, for example. The combination of these two candidate improvements may provide a net positive effect by improving (i.e., speeding up) an execution time aspect by 15%; however, in actuality, implementation of only the first candidate improvement, in isolation, would have provided a greater net positive effect by improving (i.e., speeding up) an execution time aspect by 20%. In this scenario, if the candidate improvements are not verified both in isolation and in combination, then the system may not reveal the most favorable improvement to the execution time aspect of the BI artifact. Accordingly, in some implementations, the system applies and examination tests the candidate improvements both in isolation and/or in some or all possible combinations. Although various implementations include verification of CI in isolation and in combination, in some implementations, CI(s) may be verified in isolation or in combination.

In some implementations, during operations 1012, 1014, 1016, and/or 1018 illustrated in FIG. 5A, the system may repeat operation 1008 in order to regenerate and record the Initial Examination Score of the original version of the selected BI artifact and/or aspects thereof in order to detect changes in the BI ecosystem's capacity and/or response during the various tests, thereby re-calibrating the measurements.

The system may present the User with the results of the qualified selected improvements (QSI) identified in isolation, the qualified set of qualified selected improvements (Q-QSI-Set) identified in combination, and/or one or more corresponding scores and/or other ratings corresponding to the respective QSI or Q-QSI-Set. Instruction may be requested from the User for QSI(s) and/or Q-QSI-Set(s) (operation 1020). In some implementations, the corresponding score and/or other rating may constitute an absolute value associated with the improved aspect of the BI artifact that may be compared to a score and/or rating attributed to the Initial Examination Score for the original version of the aspect of the BI artifact under consideration.

In some implementations, the corresponding score and/or other rating may constitute a relative value indicating a positive or negative correlation between the improved aspect of the BI artifact and the original version of the aspect of the BI artifact under consideration, along with an indication of the relative strength of the positive or negative correlation. In some implementations, the QSI and Q-QSI-Set results may be presented to the User in one or more formats intended to assist the User's ability to quickly and easily evaluate and compare the various results against one another. Formats for presenting the QSI and Q-QSI-Set results to the User may include numerical lists, column charts, bar charts, line charts, pie charts, XY (scatter) charts, area charts, doughnut charts, radar charts, surface charts, bubble charts, stock charts, cylinder, cone, or pyramid charts, or any other suitable format. In some implementations, the system may highlight specific versions of the new version(s) of the BI artifact that resulted in the most improved examination data relative to the original version of the BI artifact. In some implementations, the system may present to the User a visual representation of each new version of the BI artifact along with corresponding BI outputs generated by executions of that version so that the User may evaluate whether the benefits of any improved aspects are outweighed by undesirable changes to the visual appearance of the new version of the BI artifact or its corresponding BI outputs. The User is thereby given an opportunity to examine and compare the recorded examination data and/or a score or other rating corresponding to such recorded examination data and/or the visual representation of each new version of the BI artifact and its corresponding BI outputs (e.g., as modified by each QSI and Q-QSI-Set) that was passed through the examination tests of operations 1014 and 1018.

In some implementations, the User may be requested to provide instructions regarding each QSI or Q-QSI-Set based at least in part on the information presented relating to the BI artifact after application of the QSI or Q-QSI-Set, respectively, and its qualitative and/or quantitative relationship to the original version of the BI artifact. In particular, for each QSI or Q-QSI-Set, the User may instruct the system to apply and/or to not apply such QSI or Q-QSI-Set. In some implementations, the User may instruct the system to postpone application of such QSI or Q-QSI-Set, and instead choose to preserve the possibility of later applying such QSI or Q-QSI-Set, such as when the User is testing the system and is not yet ready to apply the results of the described system(s) and process(es).

The QSI(s) or Q-QSI-Set(s) selected for application by the User may be applied and the improved BI artifact may be saved to the BI environment (operation 1022). For example, the system may apply the selected QSI(s) and/or Q-QSI-Set(s). In some implementations, a User may apply at least a portion of the selected QSI(s) and/or Q-QSI-Set(s). After application thereof to the original version of the BI artifact, the system may save the resulting improved BI artifact to the BI environment selected in operation 1002.

The process(es) illustrated in FIGS. 5A, 5B, 5C, 5D, and/or 5E may be implemented by various systems, such as the systems described in FIGS. 1A, 1B, 2A, 2B, 3, 4A, and/or 4B. In addition, various operations may be added, deleted, and/or modified.

For example, analysis/testing of the SI in isolation may be restricted. In some implementations, the system and/or the User may restrict testing of the SI in isolation (e.g., based at least partially on an aspect or other information about the selected BI artifact and/or aspect, such as the execution may take longer than a given predetermined maximum time). The SI may be tested in combinations generated by the system and/or selected by the User. For example, in process 1000, instruction may be requested from the User to determine if CI(s) become SI(s), and the system may determine whether to test the SI(s) should be tested in isolation and/or combination (e.g., based on an aspect or property of the selected BI artifact(s), based on the selected BI ecosystem, and/or based on User preferences received by the system).

In some implementations, the system may record a history of each iteration of the process(es) described in FIGS. 5A through 5E to improve the original version of the BI artifact. Details that may be recorded include, but are not limited to:
Initiating User;
Date/time;
Details of the BI environment;
Details of which BI artifact was selected;
Details on which execution profiles were selected;
Initial Examination Score of the BI artifact;
Each version of the BI artifact;
Recorded examination data for each examination test;
List of each candidate improvement identified by the system;
User's answers regarding each candidate improvement identified by the system, including any customizations manually entered by the User; and/or
Results of each qualified selected improvement (QSI) and/or qualified set of qualified selected improvements (Q-QSI-Set), including the overall impact of each such improvement on the original version of the BI artifact and/or the BI ecosystem.

In some implementations when the system records a history, the historical data may be stored (e.g., in the system's persistent storage) so that it subsequently may be leveraged as part of a "feedback loop." The feedback loop may be used to potentially increase the effectiveness of future improvement cycles. For example, the system may recognize through the feedback loop that one or more classes of candidate improvements enjoy a higher average improvement for a given BI environment, certain components of a BI environment, certain metadata models, certain classes of artifacts, certain BI data sources, etc. The system may ascertain patterns in the relative impact of one or more classes of candidate improvements by performing statistical analysis on the historical data. In some implementations, the historical data recorded in the feedback loop may be utilized in more far-reaching improvement scenarios that involve more than just a single BI artifact.

In some implementations, a User may wish to evaluate an impact of certain User-provided change(s) made to a BI artifact. For example, a User may create and/or edit a BI artifact and may utilize the system to evaluate the effect of the change(s) on a BI artifact and/or aspect(s) of the BI artifact. In some implementations, the system may be utilized to determine and/or evaluate the effect of the change on other components and/or content of the BI ecosystem. The edits and/or creations may be related to, for example, but not limited to improvements; satisfying criteria, such as business rules, business guidelines, and/or government regulations; and/or providing additional information). In this implementation, the system may not identify candidate improvements (e.g., the system may be restricted from selecting the possible candidate improvements); and, a User may consider his/her own User proposed change(s) that would modify a BI artifact by, for example adding, changing, and/or deleting some portion of the artifact and/or its associated specification. A User may evaluate the impact of User proposed change(s) from directly within the system, in which case, the proposed changes are iteratively applied to a copy of the original version of the BI artifact in order to produce an alternate version of the BI artifact that contains the User proposed change(s). In some implementations, outside of the system, a User may have already manually created a copy of the BI artifact and manually applied the User proposed change(s) to this copy (e.g., using the native authoring studio in the BI environment) in order to create the alternate version of the BI artifact. In order to evaluate the impact of the User-proposed change(s), the User may utilize the described system(s) and process(es) to determine the impact (e.g., improvement) of the User proposed change(s). The User may instruct the system to: (a) generate an Initial Examination Score of the original version of the BI artifact; (b) create and/or reuse an alternate version of the BI artifact; (c) apply an examination test of the alternate version of the BI artifact; and/or (d) present to the User the result(s) of the recorded examination data relative to the Initial Examination Score. Thus, the system may provide the User with an objective comparison between the original version of the BI artifact and the alternate version of the BI artifact. If, after considering the results generated and presented by the system, the User determines to apply the User proposed change(s), the User may instruct the system to save the alternate version of the BI artifact to the desired BI environment at the same location as the original version of the BI artifact, which overwrites the original version of the BI artifact with the alternate version of the BI artifact. In some implementations, the User may direct the system to save the alternate version of the BI artifact at a different location in the BI environment. In some implementations, the User may compare the impact of the User proposed change(s) among two or more BI artifacts. The User may: generate an Initial Examination Score involving the two or more BI artifacts, create copies of the original versions of the two or more BI artifacts; apply the User proposed changes to the copies to generate alternate versions of the two or more BI artifacts (these alternate versions of the BI artifacts may be created from inside the system or they may have been created manually by a User outside the system); apply examination test(s) of the alternate versions (e.g., a single test and/or multiple tests to for example, test improvements in isolation and/or in combination); and/or present the results of the examination test(s) to the User. The User may then decide whether to apply one or more of the User proposed change(s). In some implementations, one or more similar operation(s) may be performed with various versions of a BI Artifact and/or portions thereof. Examination test(s) may be applied to various version(s) to identify whether versions are improvements based on the results of the examination test(s). As with the implementation(s) described with reference to FIG. 5A, the system may also record and store this historical data in the system's persistent storage to further assist in maintaining a "feedback loop." In some implementations, a similar system and process may be implemented to evaluate, verify, and apply User proposed changes to one or more BI artifacts, one or more underlying data source(s), configuration of one or more BI environment(s), computing resources of the BI ecosystem, one or more metadata models, and/or any other component of the BI ecosystem.

Figure 6A:
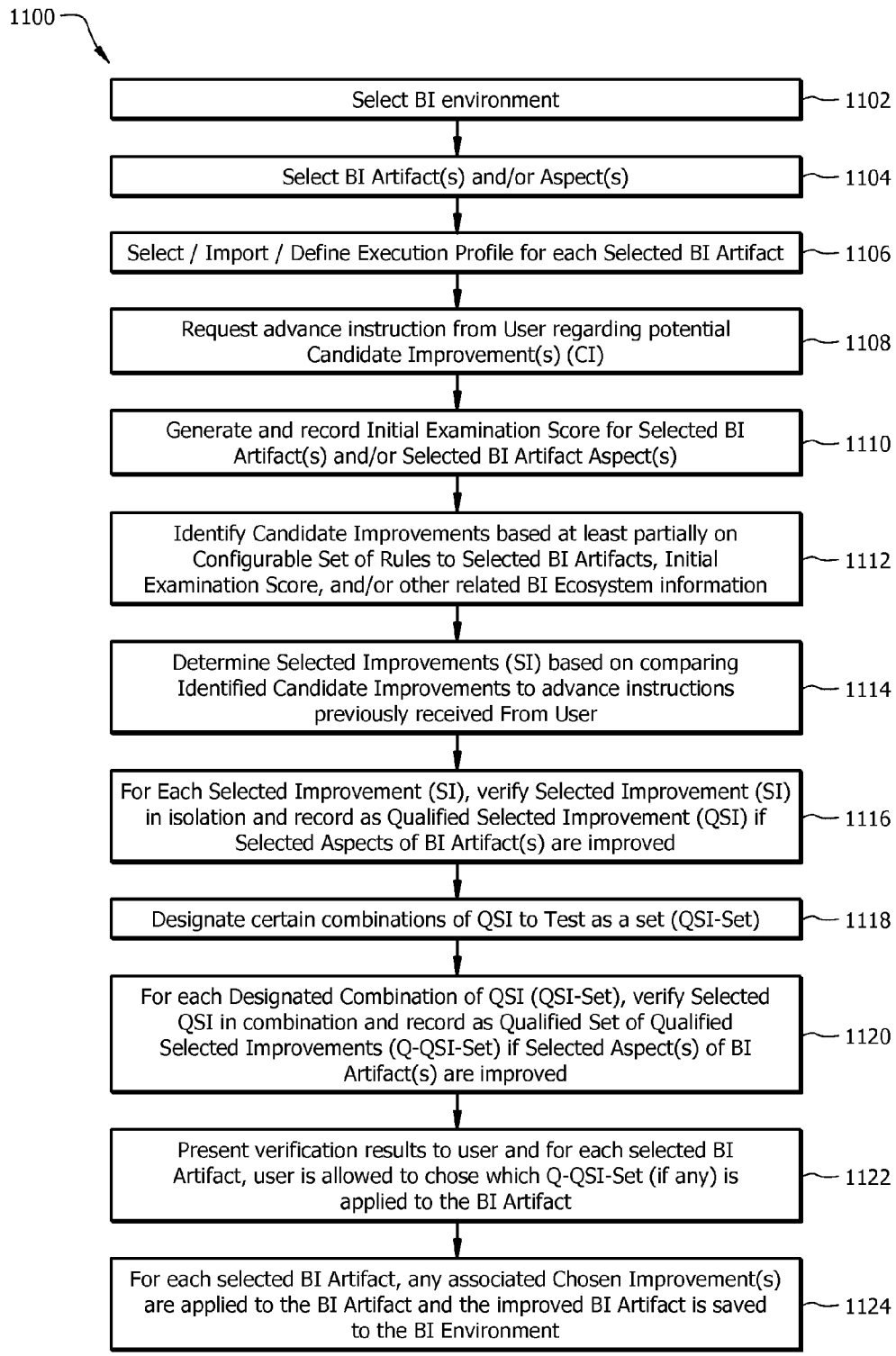
FIG. 6A is a flowchart of an implementation of an example process for unattended improvement of one or more BI artifacts in a BI ecosystem such as that depicted in FIGS. 1 and 2.

FIG. 6A illustrates a flowchart of an implementation of a process 1100 for a computer-assisted improvement of a business intelligence ecosystem wherein one or more BI artifacts can be improved without the need for User interaction at intermediate operations. The implementation of FIG. 6A is similar to that of FIG. 5A, with the primary exceptions that more than one BI artifact can be improved at a time and that the User is prompted to provide advance instructions regarding how the system should handle potential candidate improvements. The implementation of FIG. 6A allows the system to improve one or more BI artifacts with reduced interaction from the User. In describing the process 1100 of FIG. 6A, reference may be made to any of FIGS. 1 through 4 for clarity purposes. It should be understood that the process 1100 reflected in FIG. 6A is for illustrative purposes only and that any other suitable operations could be used in conjunction with, or in lieu of, the operations of process 1100 according to the present disclosure. For example, the specific sequence of operations depicted in the flowchart of FIG. 6A (and any flowcharts depicting such operations in greater detail) is not intended to limit the scope of the present disclosure and any suitable re-ordering of operations still falls within the scope of the system and process of the present disclosure.

In some implementations, as a precondition to beginning process 1100 depicted in FIG. 6A, the system of the present disclosure has previously been installed and configured to recognize at least one BI environment. Moreover, a User has logged into the system of the present disclosure and instructed the system that unattended improvement of one or more BI artifacts is desired.

The User may select a desired BI environment in which resides one or more BI artifacts that the User desires to be improved (operation 1102). The system may receive the selection of the BI environment from the User. The desired BI environment may be selected from any suitable BI environment, including but not limited to a development BI environment, a QA BI environment, a production BI environment, a performance testing BI environment, a sandbox BI environment, and/or a virtualized replica (or partial replica) of a BI environment. In some implementations, the system may present a listing of BI environment(s) from which the User may select. Note that the system and process of the present disclosure may be applicable in other BI environments, as appropriate.

The User may select for improvement one or more BI artifacts and/or one or more aspects of the selected BI artifact(s) (operation 1104). The system may receive the selection of BI artifact(s) and/or aspect(s). In some implementations, the BI artifact(s) may include report(s). Examples of other BI artifacts that may be selected for improvement include, but are not limited to analyses, dashboards, events, and/or any other suitable BI artifact in IBM Cognos or other vendors' BI software. The User may select one or more (e.g., a set of one or more or all) aspects of the selected BI artifact(s) to be improved. In some implementations, the system may present the User with a listing of aspects of the selected BI artifact(s). The system may receive the selection of the aspect(s). Selected aspects of the BI artifact(s) may include, but are not limited to execution time, efficiency, generated output size, efficiency of generated output, manageability, consistency, correctness, redundancy, User-defined aspects, and/or any other aspects related to the selected BI artifact(s). In some implementations, the system may provide the User the option to re-use a previously selected set of BI artifacts.

The User may select, import, and/or define one or more execution profiles for one or more of the selected BI artifacts (operation 1106). In some implementations, if a selected BI artifact is a report, one or more report execution profiles associated with that report may be selected, imported, and/or defined by the User. In some implementations, the system may provide the User an option to re-use one or more previously selected execution profiles. The system may retrieve the selected execution profile from a memory coupled to the system (e.g., a memory or database of the BI ecosystem and/or a memory of the server 801). For example, the system may store previously used execution profiles and thereby eases the User's ability to conduct repetitive actions (e.g., as opposed to requiring the User to repeatedly re-import and/or re-create one or more previously-used execution profiles).

The system may prompt the User to provide advance instruction regarding potential candidate improvements (CI) that may potentially improve the BI ecosystem (operation 1108). For example, the User may be allowed to select from a preexisting group of rules and/or define a customized group of rules regarding potential candidate improvements that may be applied by the system to the selected BI artifact(s). The system may store the received advance instructions (e.g., in a memory coupled to the system).

Figure 6B:
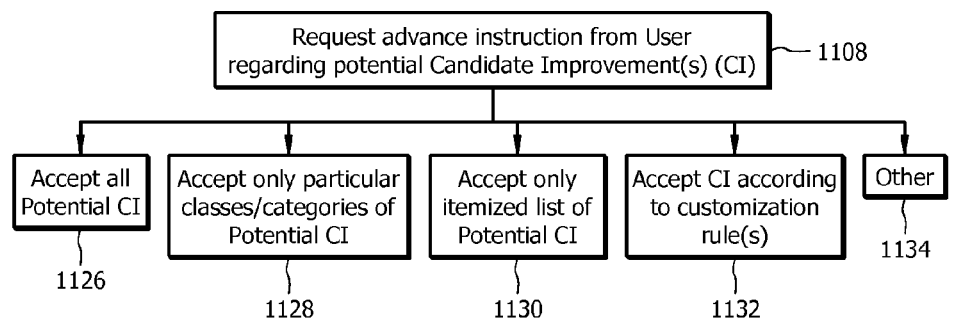
FIG. 6B is a flowchart of an implementation of an example process for the "Request Advance Instruction From User Regarding Potential Candidate Improvement(s) (CI)" operation depicted in FIG. 6A.

FIG. 6B provides a flowchart of some implementations of a process for requesting advance instruction from a User regarding potential candidate improvements (operation 1108). As illustrated, the User may be presented with option(s) (e.g., two or more) for providing advance instruction regarding potential candidate improvements (operation 1108). Options that may be presented to the User include, but are not limited to:

Accept all potential candidate improvements identified by the system (operation 1126);

Accept only particular classes and/or categories of candidate improvements identified by the system (operation 1128);

Accept only an itemized list of candidate improvements identified by the system (operation 1130);

Accept a customized rule or rules defined by the User (for example, a rule that customizes certain candidate improvements according to a predetermined routine) (operation 1132); and/or Any other suitable pre-selected rule or rules defined by the User (operation 1134). For example, the User may specify an itemized list of candidate improvements and/or an customize and/or modified set of rules from a listing presented by the system.

As illustrated in FIG. 6A, the system may apply an examination test and may generate and/or record an Initial Examination Score for the original version (e.g., unmodified) of the selected BI artifact(s) and the selected aspect(s) thereof (operation 1110). For example, the system may examine (e.g., by applying an examination test according to a set of configurable rules to one or more of the BI artifact(s) and/or aspect(s)) each selected BI artifact and/or each of the selected aspect(s).

By creating an Initial Examination Score for each BI artifact, the system may calculate and/or capture initial examination score and/or data relating to relevant aspects of the selected BI artifact(s) in the original state before any system recommended modifications are applied to the BI artifact(s) and/or any other components of the BI ecosystem. The operation of generating and recording an Initial Examination Score is depicted and described in detail by FIG. 5B in the context of improving a single BI artifact with reference to FIG. 5A. One or more of the same or similar operations depicted in FIG. 5B may be applied (e.g., repetitively and/or one time) to the one or more BI artifacts selected in the implementation of FIG. 6A to generate and record an Initial Examination Score for the original version of each of the selected BI artifacts and the selected aspects thereof. Similarly, in some implementations, a more accurate Initial Examination Score for each of the BI artifacts and aspects thereof may be obtained by repeating operation 1110, as described in more detail in the context of operation 1008 of FIG. 5A.

Referring again to FIG. 6A, Candidate Improvements (CI) may be identified at least partially based on a configurable set of rules applied to the Selected BI artifact(s), Initial Examination Score, and/or other related BI ecosystem information (operation 1112). This analysis may utilize a configurable set of rules to identify one or more potentially improvable issues in the selected BI artifact(s). Potentially improvable issues may include, but are not limited to, inefficiencies, errors, structural problems, anti-patterns, unnecessary complexity, deviation from associated standards, and/or any other potentially improvable issue.

During operation 1112, the system may perform a detailed inspection of the BI artifact(s). As part of the inspection, the system may cross-reference the information revealed through the inspection with many other related sources of information—by way of example but not limitation, if the BI artifact under consideration is a report, the related sources of information may be the associated metadata model, the underlying data sources, and/or any other suitable source of information.

The Selected Improvements (SI) may be determined based on comparing the identified Candidate Improvements to the advance instructions previously received from the User (operation 1114). The system may retrieve the advance instructions regarding potential candidate improvements previously received from the User. For each identified candidate improvement that satisfies one or more of the instructions or rules included in the advance instructions, the system may record such candidate improvement as a "selected improvement." In the event one or more of the rules previously set forth by the User includes customization of certain candidate improvements, such customization may be applied to any candidate improvements that satisfy such rule. This process may be repeated until all identified candidate improvements have been considered relative to the instructions or rules provided by the User, at which time the system and process proceeds to the next operation.

In operation 1116 and 1120, the system may methodically and iteratively apply each selected improvement (SI)—either as-is or with customization, according to the User's previous instructions—to the original version of the selected BI artifact. The operations of verifying each selected improvement in isolation to determine qualified selected improvements (operation 1116) and verifying each designated combination of qualified selected improvements to determine qualified sets of qualified selected improvements (operation 1120) are depicted and described in detail by FIGS. 5D and 5E in the context of improving a single BI artifact with reference to FIG. 5A. The same or similar operations depicted in FIGS. 5D and 5E may be applied to the one or more BI artifacts selected in the implementation of FIG. 6A to verify and record QSI and Q-QSI-Set.

As described in reference to FIG. 5A, at any point during operation 1112, 1114, 1116, 1118, and/or 1120 depicted in FIG. 6A, the system may repeat operation 1110 in order to regenerate and record the Initial Examination Score of the original version of the selected BI artifact(s) and aspects thereof in order to detect changes in the BI ecosystem's capacity and/or response during the various tests, thereby re-calibrating the measurements.

Referring again to FIG. 6A, in operation 1122, the system may apply any QSI or Q-QSI-Set verified and recorded in operation 1116 and 1118. After application thereof to the original version of the one or more BI artifacts, the system saves the resulting improved BI artifact(s) to the BI environment selected in operation 1102.

In some implementations, between operation 1120 and operation 1122 of FIG. 6A, application of any verified and recorded QSI or Q-QSI-Set may be postponed until the User provides instructions whether to proceed with application thereof (after presenting the results of each QSI or Q-QSI-Set as set forth in the context of FIG. 5A). In this manner, interaction of the User with the system may be restricted to the early operations and the final operations of the system and process of this implementation—in other words, the system and process may be unattended during the relatively time-consuming portion of the process when the system iteratively analyzes, identifies, verifies, and records various candidate improvements and combinations thereof.

The process(es) illustrated in FIGS. 6A and/or 6B may be implemented by various systems, such as the systems described in FIGS. 1A, 1B, 2A, 2B, 3, 4A, and/or 4B. In addition, various operations may be added, deleted, and/or modified. For example, one or more operations may be modified and/or restricted based on a property of the User. A User may have access to a set of BI environments and/or BI artifact(s) and the system may restrict operations based at least partially on the User properties, such as access permissions.

In some implementations, as described with reference to FIG. 5A, the system may record a history of each iteration of the process described in FIG. 6A. This historical information may be utilized in several scenarios, including but not limited to examining the statistical effectiveness of each class of candidate improvement over time (in broad or specific contexts), or otherwise leveraging this historical information to improve the overall effectiveness of the system of the present disclosure, and in particular the rules that generate candidate improvements and the algorithms which determine how individual qualified selected improvements should be combined into sets of qualified selected improvements (QSI-Sets).

Figure 7A:
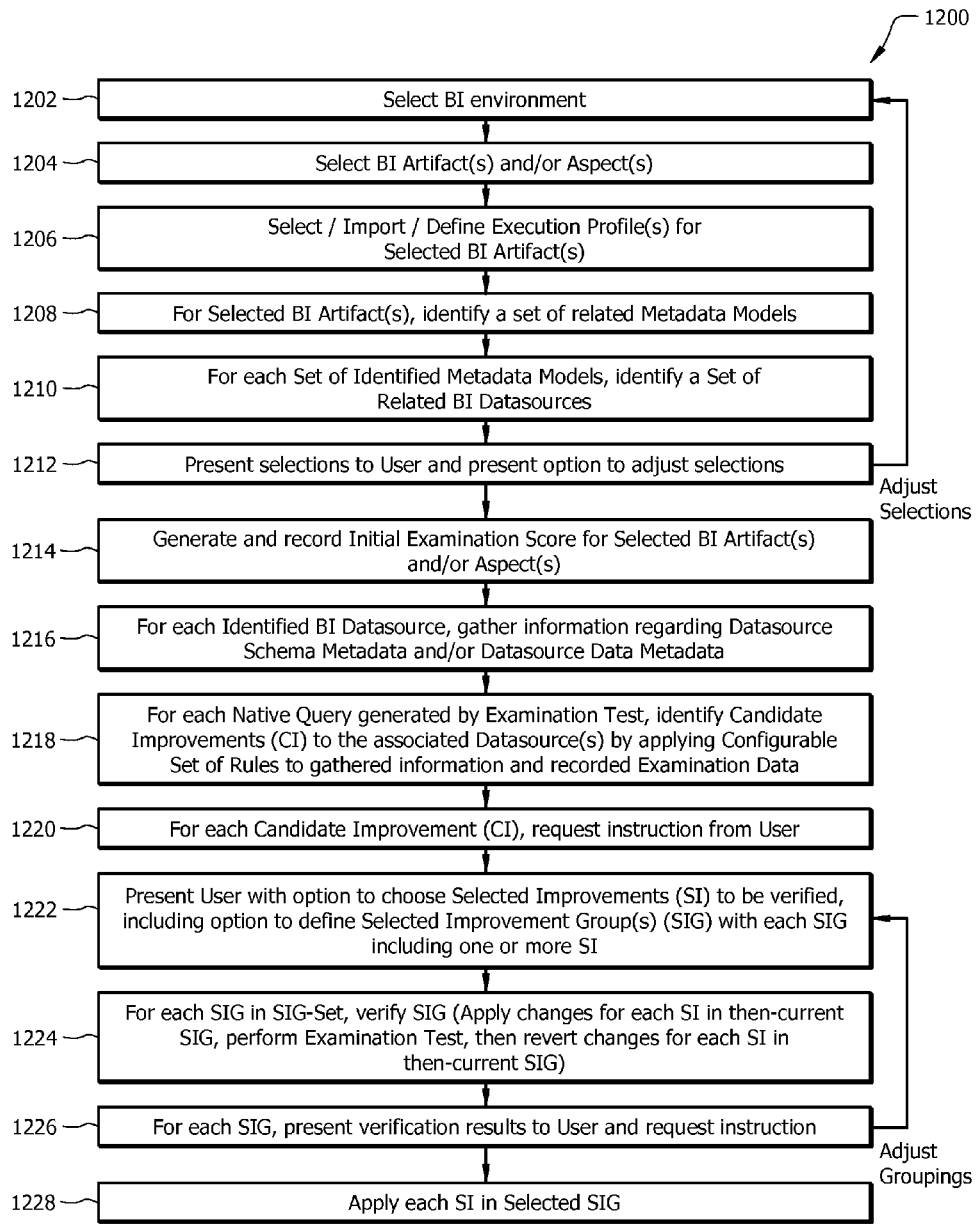
FIG. 7A is a flowchart of an implementation of an example process for improvement of one or more underlying data sources in a BI ecosystem such as that depicted in FIGS. 1 and 2.

FIG. 7A depicts a flowchart of some implementations of a process 1200 for a computer-assisted improvement of a business intelligence ecosystem wherein an underlying data source (e.g., a relational database) may be modified in such a way as to improve one or more selected aspects of a selected set of BI artifacts (for a selected set of execution profiles). In describing the process 1200 of FIG. 7A, reference may be made to any of FIGS. 1 through 4 for clarity purposes. It should be understood that the process 1200 reflected in FIG. 7A is for illustrative purposes only and that any other suitable operations could be used in conjunction with, or in lieu of, the operation of process 1200 according to the present disclosure. For example, the specific sequence of operation depicted in the flowchart of FIG. 7A (and any flowcharts depicting such operations in greater detail) is not intended to limit the scope of the present disclosure and any suitable re-ordering of operation still falls within the scope of the system and process of the present disclosure.

In some implementations, as a precondition to beginning process 1200 depicted in FIG. 7A, the system of the present disclosure has previously been installed and configured to recognize at least one BI environment. A User may have logged into the system of the present disclosure and instructed the system that improvement of one or more underlying data sources is desired.

The User may select a desired BI environment in which resides one or more BI artifacts (operation 1202). In some implementations, the User may input the BI environment to be selected and/or select the BI environment from a listing of options presented by the system. The system may receive the selection of the BI environment.

The User may select one or more BI artifact(s) and one or more aspects of the selected BI artifact(s) (e.g., that should be targeted for improvement) (operation 1204). The system may generate a listing of BI artifacts associated with the selected BI environment and present the listing to the User. For example, the system may analyze the BI environment and determine associated BI artifact(s) and/or BI aspect(s). The system may receive the selection of the BI artifact(s) and/or aspect(s).

The User may selects, imports, and/or defines execution profile(s) for the selected BI artifact(s) (operation 1206). In some implementations, the system may provide the User with an option to re-use a previously selected set of BI artifacts along with any previously associated execution profiles. The system may retrieve the selected execution profile (e.g., from a memory coupled to the system). The system may store imported and/or defined execution profile (e.g., in a memory coupled to the system), in some implementations.

The system may identify a set of metadata models that is related to the selected BI artifacts (operation 1208), and may identify a set of data sources (e.g. relational databases) that is related to the identified metadata models (operation 1210). For example, the system may determine which metadata models and/or data sources to identify based at least partially on the BI artifact selected and metadata model identified (e.g., the system may analyze the BI ecosystem and/or portions thereof to determine associated metadata models and/or data sources).

Selections (e.g., a list of identified metadata models and/or data sources) may be presented (e.g., by an interface generated by the system) to the User and the User may be presented with option(s) to adjust the selections (operation 1212). For example, the selections may include, but are not limited to:

Proceed with improvement of the identified data sources;

Adjust selections regarding previous operations (BI environment, BI artifacts, aspects targeted for improvement or execution profiles); and/or Cancel.

An Initial Examination Score may be generated and/or recorded for the selected BI artifact(s) and/or aspect(s) (operation 1214). The system may apply an examination test and examination data may be generated and/or recorded. The examination data for the original version of each of the selected BI artifacts and the selected aspects thereof may be utilized to determine the Initial Examination Score (e.g., the first application of the examination test produces a version of the recorded examination data which may be referred to as the "Initial Examination Score").

By creating an Initial Examination Score which includes measurements for each BI artifact, the system may calculate and/or may capture initial examination data (e.g., score and/or other data) relating to relevant aspects of the selected BI artifact(s) in the original state before any system recommended modifications are applied to the BI artifact(s), the underlying data source, or any other components of the BI ecosystem. The operation of generating and recording an Initial Examination Score is depicted and described in detail by FIG. 5B in the context of improving a single BI artifact with reference to FIG. 5A. The same or similar operations depicted in FIG. 5B can be repetitively applied to the one or more BI artifacts selected in the implementation of FIG. 7A to generate and record an Initial Examination Score for the original version of each of the selected BI artifacts and the selected aspects thereof. Similarly, in some implementations, a more accurate Initial Examination Score for each of the BI artifacts and aspects thereof may be obtained by repeating operation 1214, as described in more detail in the context of operation 1008 of FIG. 5A. As described in the context of obtaining an Initial Examination Score for a single artifact, the examination data for non-execution related aspects, as well as the examination data recorded before, during and after each execution of a BI artifact in the BI environment (as defined by each associated execution profile), may be referred to as the recorded examination data and this first examination of the original version of each selected BI artifact may be referred to as the Initial Examination Score. The Initial Examination Score operation may include and/or be at least partially based on (e.g., for each execution):

Total length of time for execution to complete;
Lengths of time spent in each phase of execution;
The resulting BI Ecosystem requests which were generated by the execution;
Load metrics on the BI server(s) before, during and after the execution;
Resource usage metrics on the BI server(s) before, during and after the execution;
Load metrics on the database server(s) before, during and after the execution;
Resource usage metrics on the database server(s) before, during and after the execution;
Outputs produced by the artifact (stored for later reference and comparison);
Amount of data produced by the execution;
Native queries generated by the execution (e.g. SQL, MDX, or any other suitable programming language or syntax);
Query execution plans (or other suitable information) for the native queries that were generated by the execution; and/or
Statistics regarding the execution of these native queries at runtime (e.g. the length of time required to process, the amount of data returned, etc.).

Information regarding data source schema metadata and/or data source data metadata may be gathered (e.g., by the system) for each identified BI data source (operation 1216). For example, detailed structural information and detailed information on the nature of any data contained in the data source may be gathered (e.g., monitored, retrieved, and/or recorded). In some implementations, when the underlying data source is a relational database, this information may include, but is not limited to:

Gathering database schema metadata, whereby the system may gather metadata on the database schema of the relational database, the metadata including but not limited to detailed information regarding one or more of tables definitions, columns definitions, constraints, indexes, views, materialized views, stored procedures, sequences and any other suitable metadata;
Gathering database data metadata, whereby the system may gather statistics and other information on the data contained within the underlying data source(s). Examples include data types contained in each column, row counts of tables, statistical information on column data, and other suitable statistics and information; and/or
Gathering database configuration metadata, whereby the system may gather information pertaining to the configuration of the database in the database management system or configuration of the database management system itself (e.g. transaction log configuration, security policies, memory parameters, temporary storage configuration, tablespace configuration, replication policies, etc.).

Since gathering the information according to operation 1216 may be time-intensive, in some implementations, the described systems and processes may record (e.g., periodically) such information at times other than performing process 1200 so that the information may be quickly available for future use when process 1200 is performed.

For each native query generated by the examination test, candidate improvements may be identified for the associated data sources by applying a configurable set of rules to the gathered information and/or recorded examination data (operation 1218). The system (e.g., a module of the system) may identify a set of candidate improvements for the data sources by performing a detailed analysis and applying a configurable set of rules to information accumulated by or available to the system, that information may include but is not limited to:

Information on the data source metadata (for all identified data sources);
Information on the data source data metadata (for all identified data sources);
Various types of information contained within the recorded examination data, including but not limited to: each native query that was generated during the examination test, relevant information from the recorded examination data (such as the corresponding recorded query execution plans), efficiency and performance of each native query, touch points and relative costs on the physical data source, recorded load, resource usage and network traffic on relevant components of the BI ecosystem, and/or any other suitable information relating to the recorded examination data;
The selected BI artifacts (and their targeted aspects);
The selected execution profiles;
The associated metadata models;
Historical statistics relating to the BI ecosystem and/or previous examination tests and their resultant recorded examination data; and/or
Any other relevant information on related components of the BI ecosystem.

The identified candidate improvements may include any appropriate modification to the data source schema, data, configuration and/or environment that could potentially improve one or more targeted aspects of the selected BI artifacts. Candidate improvements may include but are not limited to:

Creating an index of one or more database columns;
Changing a column data type (e.g., joining on a string column that contains nothing but numeric values);
Modifying one or more joins (e.g., an outer join where the analysis deems an inner join sufficient);
Repartitioning of data source data;
Changing configuration of the underlying database;
Reducing overuse of views versus physical tables or materialized views;
Adjustments to the configuration of the database or the database management system; and/or
Any other suitable modification of the underlying data source(s).

Instruction may be requested from the User for each Candidate Improvement (CI) (operation 1220). The system may present to the User a group of candidate improvements that may improve the identified data source(s) (and for example, the scores for relevant aspects of the selected BI artifacts that utilize the identified data source(s) during re-application of the examination test). For each candidate improvement (CI), the User may be prompted to instruct the system what action, if any, to take with respect to such candidate improvement identified by the system.

Figure 7B:
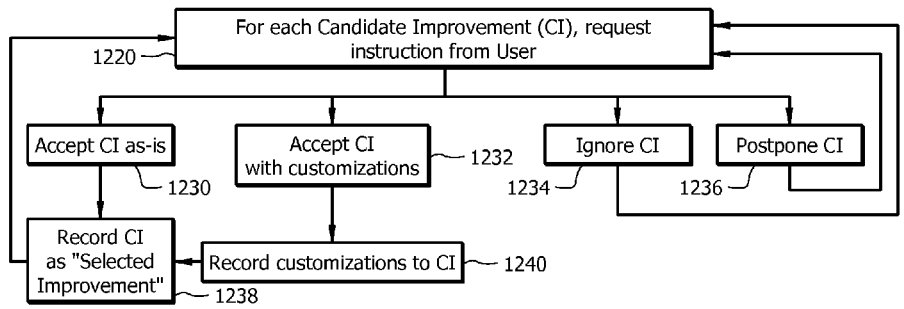
FIG. 7B is a flowchart of an implementation of an example process for the "For Each Candidate Improvement (CI), Request Instruction From User" operation depicted in FIG. 7A.

FIG. 7B depicts a flowchart of some implementations of a process for implementing operation 1220. As further depicted in FIG. 7B, the User may provide any of a number of possible instructions for candidate improvement identified and presented to the User by the system. In particular, possible instructions from the User may include one or more of the following:

Accept the candidate improvement as-is (operation 1230);

Accept the candidate improvement, but customize the candidate improvement in a manner that is manually configured by the User (operation 1232);

Ignore the candidate improvement (operation 1234); or

Postpone the candidate improvement (operation 1236).

If the candidate improvement under consideration may be accepted as-is by the User (operation 1230), and the candidate improvement may be recorded as a "selected improvement" (operation 1238). Then the next candidate improvement may be considered. If the candidate improvement under consideration is accepted but with one or more customizations (operation 1232), then the customization(s) may be recorded to the candidate improvement (operation 1240). The customized candidate improvement may be recorded as a "selected improvement," (operation 1238) and the next candidate improvement may be considered. If the candidate improvement under consideration is ignored (operation 1234), then the candidate improvement may be removed from the group of candidate improvements and the next candidate improvement may be considered. If the candidate improvement under consideration is postponed (operation 1236), then such candidate improvement may be neither removed from the group of candidate improvements nor recorded as a "selected improvement" but may be simply maintained for future consideration by the User. Then the next candidate improvement may be considered. In some implementations, when instructions have been received from the User for all of the candidate improvements identified and presented by the system, the system and process may proceed to the next operation.

With respect to the implementation described in FIG. 7A or any other implementation described herein, the system and process of the present disclosure may enable selected improvements to be applied and/or reverted ("un-applied"). Applying a selected improvement may include making the selected change(s) (in "as is" or customized form, as the case may be) to the BI ecosystem component(s) in question. Reverting (or "un-applying") a selected improvement may include reversing the change(s) that were caused by the selected improvement's application.

Verifying one or more selected improvement may include, subsequent to application of one or more selected improvements to corresponding BI ecosystem component(s), re-executing an associated examination test to produce recorded examination data, and inspecting the recorded examination data to verify that targeted aspects of selected BI artifacts have been improved. The improvement of targeted aspects of selected BI artifacts may be detected by comparing new examination data obtained post-application of selected improvements to prior examination data obtained pre-application of selected improvements. For example, the newly produced examination data may be compared to the initial examination data (e.g., score and/or other examination data) produced by previous applications of the examination test on versions of the BI ecosystem components that did not include changes effected by application of the one or more selected improvements). Verifying one or more selected improvements may also be referred to as verifying the changes effected by application of one or more selected improvements.

Verifying a selected improvement in isolation may include verifying a single improvement when applied to the original version(s) of the corresponding BI ecosystem component(s) (without the changes effected by application of any other selected improvements). Verifying selected improvements in combination may include successively applying two or more selected improvements to the original version(s) of corresponding BI ecosystem component(s) and then verifying the changes effected by the application of these selected improvements.

When verifying selected improvements in isolation and combination, it may be useful for the system to apply one or more selected improvements, perform verification of the one or more selected improvements, and then revert the one or more selected improvement(s). This may be accomplished in a number of ways, including but not limited to:

In some implementations, the system may make a copy of one or more BI ecosystem component(s) or their configurations (those which will be modified by application of the one or more selected improvements) prior to application of the selected improvements, thereby preserving the original version of the BI ecosystem component(s) or their configurations and facilitating a simplified revert operation. This approach may be practical when dealing with finer grained BI ecosystem component(s) such as BI artifacts or configuration files.

In certain instances, however, it may prove impractical to create copies of one or more BI ecosystem components (e.g. when a selected improvement requires the modification of a relational database, it may be impractical to create a copy of the entire relational database). Accordingly, in some implementations, the system and process of the present disclosure may apply changes designated by the selected improvement(s) directly to the BI ecosystem component(s) and subsequently "undo" these changes by reverting the selected improvement(s).

Referring again to FIG. 7A, in operation 1224, the system may iterate through each selected improvement group defined by the User in operation 1222. For each selected improvement in the then-current selected improvement group, the selected improvement may be applied—either as-is or with customization (e.g., according to the User's previous instructions in operation 1220)—to the corresponding underlying data source(s).

Figure 7C:
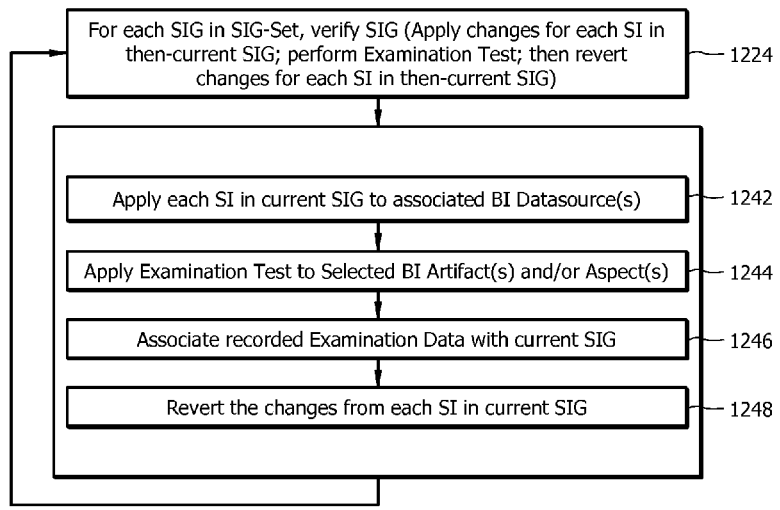
FIG. 7C is a flowchart of an implementation of an example process for the "For Each SIG in SIG-Set, Verify SIG" operation depicted in FIG. 7A.

As illustrated in greater detail by FIG. 7C, each SI in the current SIG may be applied to the associated BI data source (operation 1242). Depending on the nature of a selected improvement, application of the selected improvement may be directly and automatically implemented by the system (subject to User direction), and/or application may require the intervention of other BI ecosystem stakeholders (e.g., Users). One example of a scenario requiring intervention involves: (a) the underlying data source is a relational database; (b) a selected improvement requires that a schema change be made to the relational database; and (c) the system has been configured with an account that lacks sufficient privileges to enact the identified schema change. In this example, the schema change may be subject to the approval of another stakeholder (e.g., a database administrator who is not the User). When intervention is required to apply the identified schema change, a set of instructions describing the required schema change(s) may be generated by the system. This set of instructions may be delivered or communicated to the database administrator, and the database administrator can then review, approve, and apply the selected improvement(s). The instructions may contain textual descriptions of the required changes, literal SQL script (or other script language) that can be executed by the database administrator, or some combination thereof. Similar operations may be followed for other types of selected improvements that require intervention of other BI ecosystem stakeholders.

In some implementations, the systems and processes may proceed to the next operation after all selected improvements for the then-current selected improvement group have been applied. An examination test may be applied (e.g., by a module of the system) to the selected BI artifact(s) and/or aspect(s) (operation 1244). The examination test may collect new examination data related to the modified underlying data source(s) before, during, and/or after execution of the selected BI artifact(s) as defined by the examination test.

The recorded examination data may be associated with the current SIG (operation 1246)/The new examination data related to the modified underlying data source(s) may be compared to a prior instance of the recorded examination data related to a version of the data source(s) that did not include the modifications related to the selected improvements currently being verified (often this prior version of the recorded examination data is the Initial Examination Score for the original version of the underlying data source(s)). In this manner, the system may verify the then-current selected improvement group to determine that it does actually improve targeted aspects of the BI ecosystem. After each selected improvement group has been applied and verified, the changes effected by the application of each selected improvement in the selected improvement group are reverted (operation 1248).

As described previously in reference to other figures, the system may repeat operation 1214 in order to regenerate and record the Initial Examination Score obtained with the original version of the underlying data source(s) in order to detect changes in the BI ecosystem's capacity and/or response during the various tests, thereby re-calibrating the measurements.

As illustrated in FIG. 7A, the verification results (e.g., of operation 1224) may be presented (e.g., by a User interface generated by the system) to the User and instruction may be requested from the User. The User, in turn, may review the verification results of each selected improvement group in SIG-Set to determine which, if any, are desirable. If the User determines that none are desirable and chooses to continue the process, the User may instruct the system to adjust the groupings and return to operation 1222.

If the User determines that a particular selected improvement group is desirable, then the User may instruct the system to apply the selected improvement group. Each SI in a selected SIG may then by applied (e.g., to a data source) (operation 1228). In some implementations, the system may apply each selected improvement in the selected improvement group chosen by the User; however, the system may require additional permission or User intervention to actually apply one or more of the selected improvements.

The process(es) illustrated in FIGS. 7A, 7B, and/or 7C may be implemented by various systems, such as the systems described in FIGS. 1A, 1B, 2A, 2B, 3, 4A, and/or 4B. In addition, various operations may be added, deleted, and/or modified.

Figure 8A:
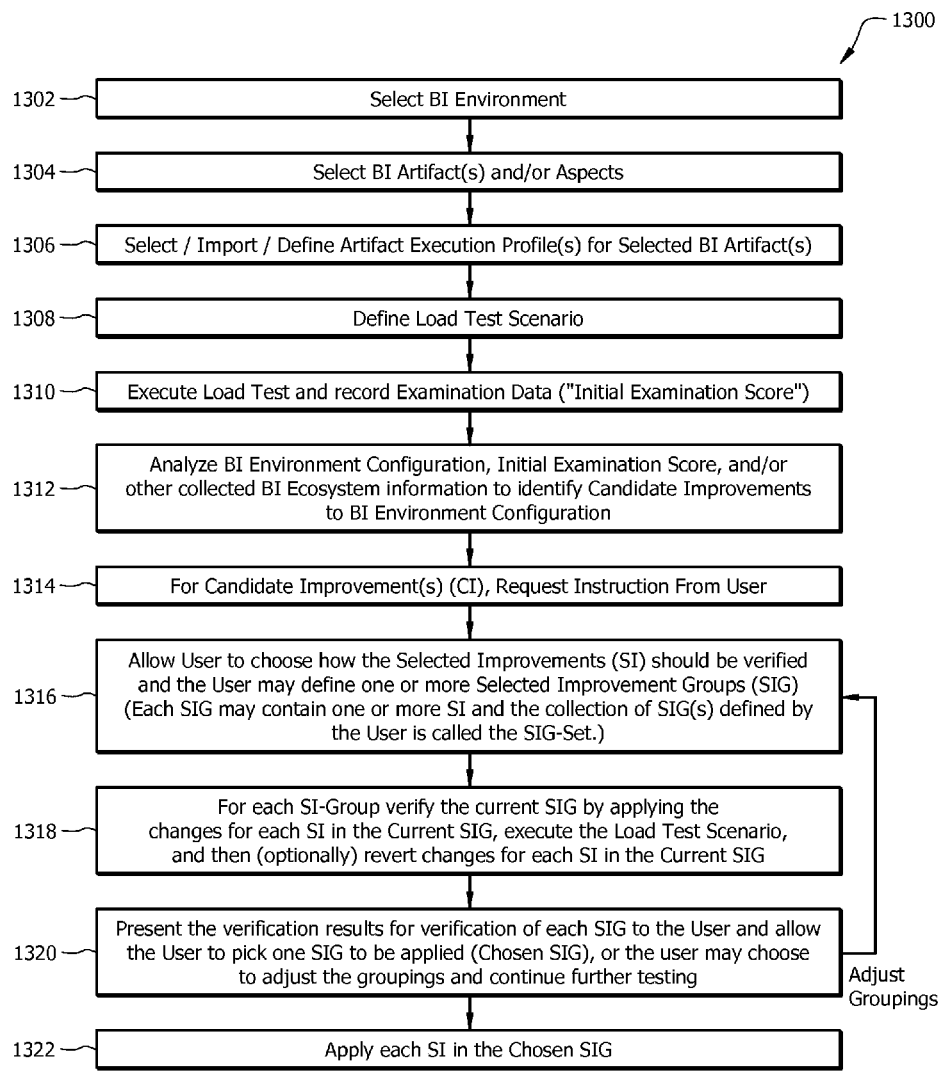
FIG. 8A is a flowchart of an implementation of an example process for attended improvement of a BI environment configuration in a BI ecosystem such as that depicted in FIGS. 1 and 2.
Figure 8B:
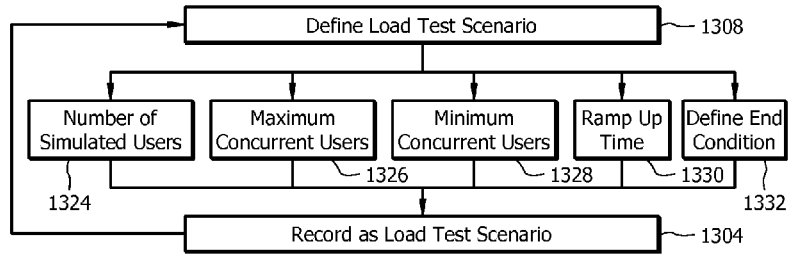
FIG. 8B is a flowchart of an implementation of an example process for the "Define Load Test Scenario" operation depicted in FIG. 8A.
Figure 8C:
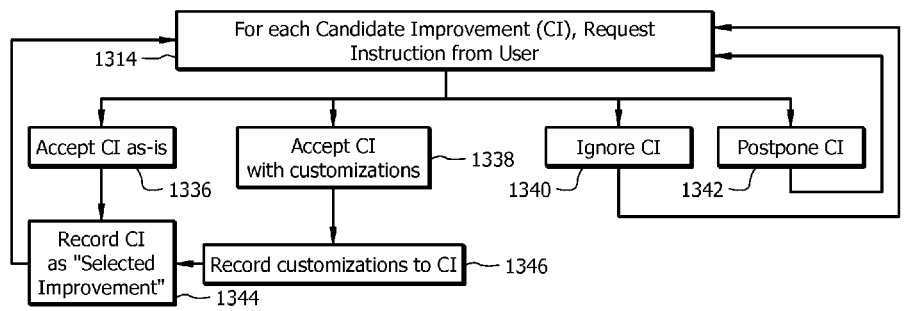
FIG. 8C is a flowchart of an implementation of an example process for the "For Each Candidate Improvement (CI), Request Instruction From User" operation depicted in FIG. 8A.

FIGS. 8A, 8B, and 8C illustrate flowcharts describing a process 1300 for a computer-assisted improvement of a business intelligence ecosystem where a configuration of a BI environment (including various components which make up the BI environment) may be modified in such a way as to improve one or more selected aspects of a selected set of BI artifacts (for a selected set of execution profiles). In describing the process 1300 of FIGS. 8A, 8B, and 8C, reference may be made to any of FIGS. 1 through 4 for clarity purposes. It should be understood that the process 1300 reflected in FIGS. 8A, 8B, and 8C is for illustrative purposes only and that any other suitable operations could be used in conjunction with, or in lieu of, the operations of process 1300 according to the present disclosure. For example, the specific sequence of operations depicted in the flowchart of FIGS. 8A, 8B, and 8C is not intended to limit the scope of the present disclosure and any suitable re-ordering of operations still falls within the scope of the system and process of the present disclosure.

In some implementations, prior to beginning process 1300 illustrated in FIG. 8A, a described system may have been installed and configured to recognize at least one BI environment. A User may have logged into the described system and instructed the system that improvement of the BI environment configuration is desired.

The User may select a desired BI environment in which resides one or more BI artifacts (operation 1302). The User may select one or more BI artifact(s) and/or one or more aspects of the selected BI artifact(s) that should be targeted for improvement (operation 1304). For example, selection of one or more aspects targeted for improvement may be performed on an individual artifact basis, or for all selected artifacts as a whole, and/or according to some combination thereof. The User may select, import, and/or define an execution profile for each selected BI artifact (operation 1306). In some implementations, the system may provide the User with an option to re-use a previously selected set of BI artifacts along with any previously associated execution profiles.

Although not illustrated in FIG. 8A, based on the set of BI artifacts selected in operation 1304, the system may identify a set of metadata models that is associated with the selected BI artifacts and/or a set of data sources (e.g. relational databases) that are associated with the identified metadata models and/or the identified BI artifacts. In some implementations, after identifying the set of metadata models and/or their associated BI data sources, the system may present the identified information to the User and present the User with a listing of choices. For example, the listing of choices may include, but is not limited to:

Proceeding with improvement of the identified data sources and allow the system to proceed to operation 1308;

Adjusting selections regarding previous operations (e.g., BI environment, BI artifacts, aspects targeted for improvement and/or execution profiles) and allow the system to return to operation 1304 and/or 1306, as appropriate; and/or Canceling and allow the system to be restricted from further operations in process 1300.

In some implementations, the system may be permitted to access to the underlying data source(s), such as a data source that is a relational database. The system may be configured with database connection information, e.g., JDBC Driver configuration, a JDBC URL, a UserID, a password, and/or a schema name. The database connection information may be provided during the operation of identifying the set of one or more data sources, and the database connection information may have been previously stored in the system, and/or the database connection information may be obtained by the system in any other suitable manner.

As illustrated in FIG. 8A, the system may prompt the User to define a load test scenario (operation 1308). In some implementations, the system may prompt the User to select and re-use a previously used load test scenario and/or to import a load test scenario. A load test scenario may be utilized to simulate load generated by multiple concurrent clients of the BI environment, with each executing the selected one or more BI artifacts as directed by the selected artifact execution profiles.

An implementation of defining a load test scenario (operation 1308) is illustrated in FIG. 8B. As part of defining a load test scenario (operation 1308), the User may define, re-use, and/or import) various characteristics of the load test scenario, including but not limited to:

end condition for test, such as length of time (operation 1332), number of accumulated errors, number of artifact execution requests, total max Users (operation 1326), etc.;

initial number of simulated Users (operation 1324);

ramp up characteristics for the number of simulated Users (operation 1330);

maximum number of simulated Users (operation 1328);

ramp down characteristics for the number of simulated Users;

User "think time" (e.g., pauses between requests generated by the Users);

optional set(s) of "warm up" instructions that are executed against the BI environment before the actual load test begins (e.g., if the BI instance is restarted after a configuration change, it may be helpful to run a few requests through the system before commencing the load test, which may reduce any system lag which is a result of one time initialization costs); and/or any other suitable load test configuration parameters.

The system may record the defined characteristics as the load test scenario (operation 1334). In some implementations, the system may allow the User to save the load test scenario for later use so that the load test scenario may be executed at a selected time (e.g., immediately, after a period of time, after receiving a signal from a User). In some implementations, the system may allow the User to cancel process 1300; to adjust the defined characteristics of the load test scenario by returning to a previous operation; and/or to adjust selections regarding previous operations, such as BI environment, BI artifacts, and/or aspects targeted for improvement or execution profiles, in which case the system returns to operation 1304 and/or 1306, as appropriate.

As illustrated in FIG. 8A, if the User chooses to execute the load test scenario (e.g., immediately or at another selected time), then the load test scenario may be executed at the selected time and according to the characteristics defined in the load test scenario (operation 1310). In some implementations, execution of the load test scenario (operation 1310) may be similar to the examination test previously disclosed in reference to other implementations. In association therewith, the system may record examination data during execution of the load test scenario to produce recorded load test data. In some implementations, executing a load test scenario (operation 1310) to produce recorded load test data may be analogous to the operation of performing an execution test to produce recorded examination data (e.g., described in detail in the context of other implementations disclosed herein). The instance of recorded load test data generated by executing the load test on the original configuration of the BI environment may be referred to as the Initial Examination Score.

The system may execute the Load Test Scenario on the selected BI Artifacts in a manner specified by the selected execution profiles, in a concurrent fashion and for a length of time, as described by the Load Test Scenario. During execution of a Load Test Scenario, the system may repeatedly execute the certain execution profiles over time until the Load Test Scenario's end condition is satisfied and/or the User stops the system's execution Load Test. Relevant data, measurements, requests and/or traffic in the BI ecosystem and/or system may be recorded as the "Initial Examination Score" (e.g., an instance of recorded load test data).

In some implementations, for one or more of the identified BI data sources, the system may gather information regarding the data source schema metadata, the data source data metadata or the database configuration metadata. As previously described, the data source schema metadata pertains to metadata on the structure of the data source (e.g. for a relational database, metadata on the tables, columns, constraints, indexes, sequences, stored procedures, functions, tablespaces, views and/or materialized views), the data source data metadata pertains to statistical information on the actual data contained in the data source, and the database configuration metadata pertains to the configuration of the database in the database management system or configuration of the database management system itself (e.g. transaction log configuration, security policies, memory parameters, temporary storage configuration, tablespace configuration, replication policies, etc.).

The candidate improvements to the BI environment configuration may be identified (operation 1312). Utilizing the information in the Initial Examination Score, the gathered information on each data source (e.g., data source schema metadata, data source data metadata and/or data source configuration metadata), and/or other collected, accessible and/or historical information on components of the BI Ecosystem (e.g., prior improvement attempts), the system may apply a configurable set of rules to identify candidate improvements to the configuration of the BI environment. These improvements may be targeted at improving identified aspects of the selected BI Artifacts, when the Load Test Scenario is later re-executed. For example, in the BI Environment Configuration that includes IBM Cognos, options may include changes: to configuration parameters on various Cognos services that live in and/or are coordinated by p2pd.war (e.g., a report service's number of high affinity connections, number of low affinity connections, number of worker processes, and/or max queue time); in logging levels; to configuration files on the BI server (e.g. cqecon-fig.xml, system.xml files, cognstartup.xml, various other property files, xlst files, xsl files, xsd files, and/or xml files which affect the configuration of the BI software); to the default fonts used; and/or to connections from the BI processes to other BI Ecosystem components (e.g. connection information for an external security provider, mail server, metric store, and/or content store).

For each identified candidate improvement, the User may be prompted for instruction (operation 1314). For example, as illustrated in FIG. 8C, a User may select to accept the improvement as is (operation 1336), accept the improvement with customizations (operation 1338), ignore the improvement (operation 1340), and/or postpone the improvement (operation 1342). For example, if a candidate improvement is accepted (operation 1336), the candidate improvement may become a "Selected Improvement" and may be recorded (operation 1344). If a Candidate Improvement is "accepted with customizations" (operation 1338), then the system may prompt the User for the customizations (e.g., the User may input customizations and the input customizations may be transmitted to the system), and then the candidate improvement may be recorded as a "Selected Improvement" (e.g., along with the User customizations)

(operation 1346). In some implementations, if an improvement is ignored (1340), it may be discarded (e.g., it may not be saved). If a User selects that an improvement is postponed (operation 1342), the system may record it for later reference. When the User selects to ignore a candidate improvement and/or postpone a candidate improvement, the system may request instruction from the User (operation 1314) and/or the process may be restarted (operation 1302).

A User may be allowed to select how the selected candidate improvements may be verified (operation 1316). For example, the User may select to verify each Selected Improvement in isolation, all the Selected Improvements at once (e.g., applied concurrently and/or in succession), and/or the User might choose to break the Selected Improvements up into different groups to be verified together, etc. To facilitate this flexibility, the system may allow the User to create one or more Selected Improvement Groups ("SIG"). A SIG is a grouping of one or more Selected Improvements. In some implementations, a single Selected Improvement may be a member of more than one Selected Improvement Group. The User may be allowed to create one or more SIG, and the User may be allowed to define which Selected Improvements should be a member of a specific SIG. The set of Selected Improvement Groups defined by the User shall be referred to as the "Selected Improvement Group Set" ("SIG-Set").

In some implementations, the system may allow the User to choose the order in which the SIGs will be verified. The system may then proceed to verify one or more SIG from the SIG-Set (e.g., each SIG and/or at least a portion of the SIGs) in the order chosen by the User. In some implementations, verifying SIG may include applying each selected improvement in the SIG(s) for verification; re-executing the Load Test Scenario, and/or reverting the SIG(s) for verification such that the selected improvement is not applied to the SIG(s) for verification. The system may apply each Selected Improvement in the current SIG (e.g., successively) to the associated portion of the BI Environment Configuration. In some implementations, the system may be restricted from automatically applying one or more changes in the selected improvement (e.g., the system may lack the permissions or access required to actually apply the changes). For example, if the system is recommending the addition of an entry in a configuration file on the BI server, the system may lack the permissions to apply the change. In this case, the system may provide a set of instructions (e.g., that identifies and lists the changes that should be made by a User to apply a selected improvement), and a human may apply the changes (e.g. a User, such as a system administrator). The User may be responsible for communicating to the system once the selected improvement has been applied via human intervention (e.g., the system may wait to receive an input from the User as part of verifying a SIG). In some implementations, the system may re-execute the Load Test Scenario (e.g., as previously described), and may associate the generated Recorded Load Test Data with the current SIG. In some implementations, the system may revert the SIG to the version of the SIG prior to the changes from each Selected Improvement in the SIG to be verified (e.g., successively, for example in the reverse order in which they were originally applied). In some implementations, a User may choose to skip reverting the changes for certain Selected Improvements (e.g., this may prove more practical if the application of an improvement required human intervention and/or if the system determines that the User will accept the selected improvement to the SIG as is).

The system may present the verification results to the User for one or more of the SIGs in the SIG-Set (operation 1320). For example, the system may present the verification results for all or at least a portion of the SIG(s) in the SIG-Set. Presenting the verification results may include displaying each SIG and/or information regarding the level of improvements the selected improvement achieved (e.g., in terms of the originally selected aspects of the selected BI Artifacts). The system generate a User interface that allows a User to easily browse the Recorded Load Test Data for each SIG, compare BI outputs generated by each examination test, etc.

The User may be prompted for how to proceed. For example, the User may choose one of the SIGs to be permanently applied (e.g., applied without being reverted). This "chosen SIG" may also be referred to as the "selected SIG". The User may choose to reconfigure the choices made (e.g., go back to earlier operations where the SIG(s) were configured, define which BI Artifacts are to be included in the improvement, define the Load Test Scenario, etc.). If a User chooses to reconfigure the choices made, the system may perform one or more of the operations of the process again (e.g., the system may return to an earlier operation in the process). In some implementations, the User may choose to cancel the process (e.g., not apply the selected improvement to the SIG(s)). The User may choose to postpone application of the selected improvement (e.g., in which case, the state of the current workflow is preserved for later resumption) and/or the SIG(s) may or may not be reverted.

If the User chooses to apply a SIG (picked a "chosen SIG"), then system may apply each Selected Improvement in the chosen SIG (e.g., successively) to the associated portion of the BI Environment Configuration (operation 1322).

The process(es) illustrated in FIGS. 8A, 8B, and/or 8C may be implemented by various systems, such as the systems described in FIGS. 1A, 1B, 2A, 2B, 3, 4A, and/or 4B. In addition, various operations may be added, deleted, and/or modified.

Figure 9:
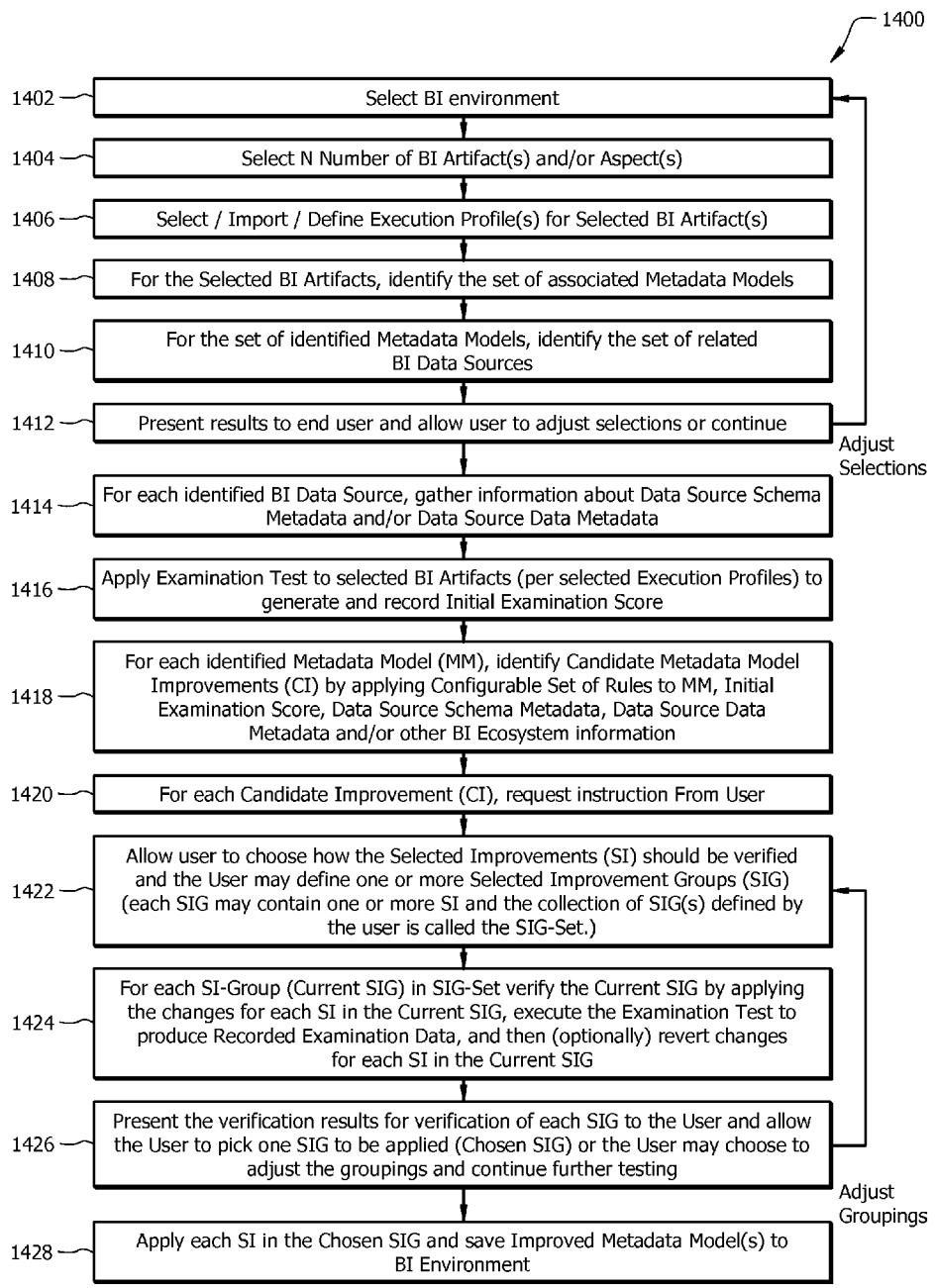
FIG. 9 is a flowchart of an implementation of an example process for attended improvement of a metadata model in a BI ecosystem such as that depicted in FIGS. 1 and 2.

FIG. 9 depicts a flowchart describing a process 1400 for a computer-assisted improvement of a business intelligence ecosystem wherein a metadata model may be modified to improve one or more selected aspects of a selected set of BI artifacts for a selected set of execution profiles. In describing the process 1400 of FIG. 9, reference may be made to any of FIGS. 1 through 4 for clarity purposes. It should be understood that the process 1400 reflected in FIG. 9 is for illustrative purposes only and that any other suitable process operations could be used in conjunction with, or in lieu of, the operations of process 1400 according to the present disclosure. For example, the specific sequence of operations depicted in the flowchart of FIG. 9 is not intended to limit the scope of the present disclosure and any suitable re-ordering of operations still falls within the scope of the system and process of the present disclosure.

With reference to FIG. 9, some implementations of the system and process of the present disclosure may identify and verify improvements to one or more Metadata Models in the BI Environment (e.g. one or more Cognos packages).

A BI environment may be selected (operation 1402). For example, the system receives a selection of a BI environment from a User. The User may be logged onto the BI environment in some implementations. N BI Artifacts may be selected (operation 1404). The system may receive a selection of BI Artifacts and/or aspects of the BI Artifacts for proposed improvement. For example, one or more aspects of the BI Artifacts may be selected which may be targeted for improvement (e.g., on an individual artifact basis for a group of selected artifacts, for all the selected artifacts, and/or via some other combination). In some implementations, one or more Artifact Execution Profiles ("Execution Profiles") may be identified for each of the selected BI Artifact(s).

Based on the selected set of BI Artifacts, the set of related Metadata Models may be identified (operation 1408). For example, the system may determine the set of associated Metadata Models for each BI Artifact and/or for a set of BI Artifacts.

The set of BI Data sources for the identified set of Meta Models may be identified (operation 1410). The system may present the User with the set of associated Metadata Models and their corresponding BI Data sources (operation 1412). The User may choose to reconfigure User selections (e.g., return to operation 1402 or 1404, as appropriate), to proceed, or to cancel the operations.

In some implementations, for each identified BI Data source, the system may have access to the underlying BI Data sources (e.g. for a BI Data Source which is a Relational Database, the system might be configured with database connection information such as JDBC driver configuration, a JDBC URL, a UserID, password and schema name). The database connection information may be provided as part of this operation, or the system may have previously stored connection information for the database.

For identified BI Data source, the system may retrieve information regarding the Data source Schema Metadata, the Data source Data Metadata, or the Data source configuration metadata (operation 1414). As more fully described elsewhere in this disclosure, Data source Schema Metadata pertains to metadata on the structure of the Data source (e.g. for a relational database, metadata on the tables, columns, constraints, indexes, sequences, stored procedures, functions, tablespaces, views and/or materialized views, etc.), the Data source Data Metadata pertains to statistical information on the actual data contained in the Data source, and the Data source configuration metadata pertains to the configuration of the Data source (in the case of a relational database, the configuration of the database in the database management system or configuration of the database management system itself—e.g. transaction log configuration, security policies, memory parameters, temporary storage configuration, tablespace configuration, replication policies, etc.).

The system performs the Examination Test on the selected BI Artifacts in a manner specified by the selected Execution Profiles (operation 1416). All relevant data, measurements, requests and traffic in the BI Ecosystem (as well as the System) are recorded as the "Initial Examination Score" (an instance of Recorded Examination Data). The Examination Test is described in detail in other areas of this disclosure.

Utilizing the information in the Initial Examination Score (e.g. native queries generated, query execution plan for native queries, generated requests, request timings and/or load and/or resource statistics on involved BI Ecosystem component), gathered information on each Data source (e.g., Data source Schema Metadata and/or Data source Data Metadata and/or Data source Configuration Metadata), and/or other collected, accessible and/or historical information on other components of the BI Ecosystem (or prior improvement attempts), the system may apply a configurable set of rules to identify Candidate Improvements to the identified Metadata Models (operation 1418). These improvements may be targeted at improving identified aspects of the selected BI Artifacts, when the Examination Test is later re-executed.

In some implementations, some changes to a Metadata Model may also require changes to a BI Artifact that depends on the Metadata Model (e.g., in order for that BI Artifact to continue to function properly). For example, a Candidate Improvement may affect changes in both the Metadata Model, any affected BI Artifact and/or potentially even a copy of the BI Artifact that can be substituted into the Examination test). When reverting the Candidate Improvement, the changes may be reverted in the Metadata Model and any associated BI Artifacts that had been modified by the application of the Candidate Improvement.

The User may be prompted for instruction for identified Candidate Improvement(s) (operation 1420). For example, the User may accept the improvement as is, accept the improvement with customizations, ignore the improvement, and/or postpone the improvement. If a Candidate Improvement is accepted, the Candidate Improvement may become a "Selected Improvement". If a Candidate Improvement is "accepted with customizations", then the system may prompt the User for customizations to the Candidate Improvement, and then record the Candidate Improvement as a "Selected Improvement" (e.g., along with the User customizations). If Candidate Improvement is ignored, it may not be stored and/or applied. If an improvement is postponed, the system may record the Candidate Improvement for later reference.

The User may select how the Selected Improvements may be verified (operation 1422). For example, the system may allow the User to define how the Selected Improvements may be verified. For example, the User may choose to verify each Selected Improvement in isolation, all at once (e.g., applied in succession), and/or the User may choose to break the Selected Improvements up into different groups to be verified together. To facilitate this flexibility, the system may allow the User to create one or more Selected Improvement Groups ("SIG"). A Selected Improvement Group may be a grouping of one or more Selected Improvements. In some implementations, a single Selected Improvement may be a member of more than one Selected Improvement Group. The User may be allowed to create one or more Selected Improvement Group, and the User may be allowed to define which Selected Improvements should be a member of each Selected Improvement Group created. The set of Selected Improvement Groups defined by the User may be the "Selected Improvement Group Set" ("SIG-Set").

In some implementations, the system may allow the User to choose the order in which the Selected Improvement Groups will be verified. The system may then verify each SIG from the SIG-Set in the order chosen by the User.

A SIG may be verified by applying each Selected Improvement in the current SIG to the associated Metadata Model(s), re-execute the Examination Test, and/or revert the Selected Improvement changes (operation 1424). For example, the system may apply each Selected Improvement in the current SIG (e.g., successively) to the associated Metadata Model(s) and/or to associated BI Artifacts. The system may re-execute the Examination Test and associate the generated Recorded Examination Data with the current SIG. The system may revert the changes from each Selected Improvement in the current SIG (e.g., successively, such as in the reverse order in which they were originally applied).

The system may present the verification results to the User for all SIGs in the SIG-Set (operation 1426). For example, the system may display each SIG and/or information regarding the level of improvements the Candidate Improvement achieved (e.g., in terms of the originally selected aspects of the selected BI Artifacts). The system may facilitate browsing the Recorded Examination Data for each SIG, comparing BI outputs generated by each examination test, etc.

In some implementations, the User may be prompted for instructions in how to proceed. The User may choose one of the SIGs to be permanently applied (e.g., applied without being reverted). The "chosen SIG" may also be referred to as the "selected SIG". The User may choose to reconfigure the selected choices in the process and rerun previous operations based on the reconfigured choices (e.g., configuring the SIGs, and/or defining which BI Artifacts were to be included in the improvement). In some implementations, The User may choose to cancel the Candidate Improvements. The User may choose to postpone the application of the Candidate Improvements and, the state of the current workflow may be preserved for later resumption.

If the User selects to apply a SIG ("chosen SIG"), then system may apply each Selected Improvement in the chosen SIG (e.g., successively) to the associated BI Metadata Models and/or in any appropriate BI Artifacts (e.g., BI Artifacts that depend on those models) (operation 1428).

The process(es) illustrated in FIG. 9 may be implemented by various systems, such as the systems described in FIGS. 1A, 1B, 2A, 2B, 3, 4A, and/or 4B. In addition, various operations may be added, deleted, and/or modified.

For example, in some implementations, depending on configuration, the system may modify a metadata model and/or any of its associated BI Artifacts in a variety of ways. For example, the system may apply changes to a copy of the originals and may publish the copy(ies) to the BI Instance). In some implementations, the system may apply these changes directly to the live version of objects. In some implementations, the system may store the original object(s) so as to preserve their original versions, place modified copies into the BI instance (e.g., for the purpose of examination testing), and/or then restore the originals when the modifications need to be reverted. In some implementations, using either approach, the system will restore any modified Metadata Models and/or any modified associated BI artifacts to their original state (e.g., their state prior to the application of the Selected Improvement) when the selected improvement is reverted.

In some implementations, the described system(s) and process(es) may be used for computer-assisted improvement of a business intelligence ecosystem wherein the computing resources of the BI ecosystem may be modified in such a way as to improve one or more selected aspects of a selected set of BI artifacts (for a selected set of execution profiles). In describing the following process, reference may be made to any of FIGS. 1 through 4 for clarity purposes. It should be understood that the following process is for illustrative purposes only and that any other suitable operations could be used in conjunction with, or in lieu of, the operations of the following process according to the present disclosure. For example, the specific sequence of operations described below is not intended to limit the scope of the present disclosure and any suitable re-ordering of operations still falls within the scope of the system and process of the present disclosure.

In some implementations, the described system and process may identify and verify improvements to computing resources and/or a host operating system/server/platform configuration in the BI Ecosystem utilizing systems and/or processes similar to those previously described, but involving improving changes to computing resources or server/ operating system changes. For example, changes to the computing resources or server and/or operating system may include changes to: the amount of available processing power on the server(s) hosting components of the BI Ecosystem; the amount of available RAM on the server(s) hosting components of the BI Ecosystem; the speed of disk and/or network I/O on the server(s) hosting components of the BI Ecosystem; and/or changes to an operating system (OS) and/or operating system configuration option hosting components of the BI Ecosystem.

In some implementations, a similar Load Test Scenario may be re-applied by the system to verify changes that may not be suggested by the system (e.g. perhaps the stakeholders wish to evaluate the impact of proposed changes to one or more components of the BI Ecosystem, e.g. an OS upgrade or an upgrade to the Database Software).

In some implementations, the described system(s) and process(es) may not directly apply selected improvements. For example, application of some candidate improvements may require human intervention (e.g., a User may be required to take actions to apply a candidate improvement). The described system(s) and process(es) may, however, identify issues, such as bottlenecks, and may suggest improvements that may be implemented by a User, and then quantitatively verify the impact of the suggested improvements.

For example, a BI environment and/or one or more BI Artifacts may be selected. One or more aspects of the BI Artifacts may be selected that may be targeted for improvement (e.g., this may be done on an individual artifact basis, or for all selected artifacts as a whole, or via some other combination).

For each selected BI Artifact, one or more Artifact Execution Profiles ("Execution Profiles") may be identified and/or defined. The system may determine a set of associated Metadata Models at least partially based on the selected set of BI Artifacts.

The system may determine a set of BI Data sources based at least partially on the set of Metadata Models. The system may generate and/or presents the User with the set of associated Metadata Models and/or their corresponding BI Data sources. The User may select to reconfigure previous selections (e.g., go back to selecting a BI environment and/or BI Artifacts), to proceed, and/or to cancel.

In some implementations, for at least one of the identified BI Data source(s), the system may have access to the underlying BI Data sources (e.g. for a BI Data Source which is a Relational Database, the system might be configured with connection information such as a JDBC driver configuration, a JDBC URL, a UserId, password and schema name). The database connection information may be provided as part of this operation and/or the system may have previously stored connection information for the database, in some implementations.

The system may prompt the User to define a Load Test Scenario and/or select a previously defined Load Test Scenario for re-use. A Load Test Scenario may be utilized to simulate load generated by multiple concurrent clients of the BI Environment (e.g., each executing the selected BI Artifacts, as directed by the selected Execution Profiles). During this phase, the User may be allowed to define various characteristics of the Load Test Scenario. For example, characteristics of the Load Test Scenario may include, but are not limitation to: end condition for test (e.g. length of time, number of accumulated errors, number of artifact execution requests, and/or total max Users); initial number of simulated Users; ramp up characteristics for the number of simulated Users; maximum number of simulated Users; ramp down characteristics for the number of simulated Users; User "think time" (e.g., pauses between requests generated by the Users); a set of "warm up" instructions that are executed against the BI Environment before the actual Load Test begins (e.g., if the BI instance is restarted after a configuration change, it may be helpful to run a few requests through the system before commencing the load test, to reduce any system lag that is a result of one time initialization costs); and/or other example load test configuration parameters.

The system may allow the User to save the Load Test Scenario for later use, to execute it at a predetermined time (which could be "now"), cancel, and/or return to an earlier operation.

If the User selects to execute the Load Test Scenario (e.g., "now" or at a predetermined time), then the system will execute the Load Test Scenario at the designated time and in the designated manner (e.g., according to User selections). The Load Test Scenario functions in a very similar way to the Examination Test process that is previously described. Recording the examination data during the execution of the Load Test Scenario may produce Recorded Load Test Data (e.g., which may be similar to the information stored in Recorded Examination Data).

In some implementations, the system may utilize a Load Test Scenario to record Load Test Data in a similar manner the system may utilize an Examination Test to record Examination Data.

The system may execute the Load Test Scenario on the selected BI Artifacts in a manner specified by the selected Execution Profiles (e.g., in a concurrent fashion and/or for a length of time as described by the Load Test Scenario). During execution of a Load Test Scenario, the system may repeatedly execute the certain execution profiles over time until the Load Test Scenario's end condition is satisfied and/or the User stops the system's execution Load Test. Relevant data, measurements, requests and/or traffic in the BI Ecosystem and/or the system may be recorded as the "Initial Examination Score" (e.g., an instance of Recorded Load Test Data).

In some implementations, for each identified BI Data source, the system may gather information regarding the Data source Schema Metadata and/or the Data source Data Metadata and/or Data source Configuration MetaData. As more previously described, the Data source Schema Metadata may pertain to metadata on the structure of the Data source (e.g. for a relational database, metadata on the tables, columns, constraints, indexes, sequences, stored procedures, functions, tablespaces, views and/or materialized views), the Data source Data Metadata may pertain to statistical information on the actual data contained in the Data source, and the Data source Configuration Metadata refers to the configuration of the Data source (e.g. in a relational database, the configuration of the database in the database management system or configuration of the database management system itself e.g. transaction log configuration, security policies, memory parameters, temporary storage configuration, tablespace configuration, replication policies, etc.).

Utilizing the information in the Initial Examination Score, gathered information on each Data source (e.g., Data source Schema Metadata and/or Data source Data Metadata and/or Data source Configuration Metadata), and/or other collected, accessible and/or historical information on components of the BI Ecosystem and/or prior improvement attempts, the system may apply a configurable set of rules to identify Candidate Improvements to the Computing Resources of BI Ecosystem Components. These improvements may be targeted at improving identified aspects of the selected BI Artifacts, when the Load Test Scenario is later re-executed. Examples of Candidate Improvements to the Computing Resources of BI Ecosystem Components may include, but are not limited to:

a. Increasing the amount of available processing power on the server(s) hosting components of the BI Ecosystem (e.g. the servers hosting a BI Data source, server(s) hosting an instance of the BI software, server(s) hosting a Content Store Database, server(s) hosting an External Security Provider, etc.);

b. Increasing the amount of available RAM on the server(s) hosting components of the BI Ecosystem;

c. Increasing the disk and/or network I/O performance on the server(s) hosting components of the BI Ecosystem;

d. Changes to an operating system (OS) and/or operating system configuration option hosting components of the BI Ecosystem;

e. Changes to permissions on a file system; and/or f. Increasing file system or temporary directory performance and/or space on server(s) hosting components of the BI software.

14. For each identified Candidate Improvement, the User may be prompted for instruction. For example, the User may accept the improvement as is, accept the improvement with customizations, ignore the improvement or postpone the improvement. If a Candidate Improvement is accepted, it becomes a "Selected Improvement". If a Candidate Improvement is "accepted with customizations", then the system may prompt the User for the customizations, and then records the Candidate Improvement as a "Selected Improvement" (e.g., along with the User customizations). If an improvement is ignored, it may be discarded (e.g., not stored for later retrieval). If an improvement is postponed, the system may record it for later reference and/or retrieval.

The system may allow the User to define how the Selected Improvements may be verified. For example, the User may choose to verify each Selected Improvement in isolation, all the Selected Improvements at once (e.g., applied in succession), and/or to break the Selected Improvements up into different groups to be verified together. To facilitate this flexibility, the system may allow the User to create one or more Selected Improvement Groups ("SIG"). A Selected Improvement Group is a grouping of one or more Selected Improvements. A single Selected Improvement may be a member of more than one SIG, in some implementations. The User may be allowed to create one or more Selected Improvement Group, and then the User may define which Selected Improvement(s) are member(s) of the SIG. The set of Selected Improvement Groups defined by the User may be identified as the "Selected Improvement Group Set" ("SIG-Set").

The system may allow the User to select and/or define the order in which the Selected Improvement Groups will be verified and the system may verify each SIG from the SIG-Set (e.g., in the order selected by the User). Verifying each SIG may include applying Selected Improvement(s) in the current SIG, re-execute the Load Test Scenario; and/or revert the changes the Selected Improvement made to the current SIG.

The system may apply each Selected Improvement in the current SIG (e.g., successively) to the associated BI Ecosystem Computing Resource. In some implementations, the system may lack the permissions and/or access required to actually apply the changes (e.g. if the system is recommending the addition of additional RAM on a BI server). In this case, the system may provide a set of instructions regarding which changes should be made, and a User apply the changes (e.g. a system administrator). The User may communicate with the system once the selected improvement has been applied via human intervention.

The system may re-execute the Load Test Scenario (e.g., as previously described), and associate the generated Recorded Load Test Data with the current SIG.

The system may revert the changes from each Selected Improvement in the current SIG (e.g., successively, such as in the reverse order in which they were originally applied). In some implementations, a User may choose to skip reverting the changes for certain Selected Improvements (e.g., this may prove more practical if the application of an improvement required human intervention and/or if the quantitative score of the Selected Improvement is within a predetermined range, it may indicate that the Selected Improvement is likely to be accepted by the User and thus, the system may not automatically revert the changes). If the system requires human intervention for the application of a specific Selected Improvement, then human intervention may also be required for reverting the Selected Improvement.

The system may present the verification results to the User for one or more of the SIGs in the SIG-Set. For example, the system may display each SIG and/or information regarding the level of improvements achieved (e.g., in terms of the originally selected aspects of the selected BI Artifacts). The system makes facilitate browsing the Recorded Load Test Data for each SIG, comparing BI outputs generated by each examination test, etc.

The User may be prompted to provide instructions in how to proceed. For example, a User may select one of the SIGs to be permanently applied (e.g., applied without being reverted). This "chosen SIG" may also be referred to as the "selected SIG". The User may choose to reconfigure the previously made choices (e.g., go back to earlier operations involving configuring the SIGs, and/or defining which BI Artifacts were to be included in the improvement, defining the Load Test Scenario). If a User chooses to do reconfigure previous selections, the process may restart at an previously performed operation, as appropriate. In some implementations, the User may choose to cancel and/or to postpone the application of the Candidate Improvement (e.g., in which case, the state of the current workflow may be preserved for later resumption).

If the User chooses to apply a SIG (e.g., a "chosen SIG"), then system may apply each Selected Improvement in the chosen SIG (e.g., successively) to the Computing Resources of BI Ecosystem Components.

The processes described in FIGS. 5A-E, 6A, 6B, 7A-C, 8A-C and/or 9 and/or operations thereof may be implemented by various systems, such as the systems described in FIGS. 1A-D, 2A, 2B, 3, 4A, and/or 4B. In addition, various operations may be added, deleted, and/or modified. In some implementations, operation(s) of the described processes may be performed in combination with other processes. For example, various implementations may include one or more of the described following features and/or other described features, as appropriate.

In various implementations, improving a business intelligence ecosystem may include receiving a selection of a business intelligence artifact, determining execution profile(s) for the selected business intelligence artifact, and determining an initial examination score for a selected business intelligence artifact. Candidate improvement(s) to the business intelligence artifact may be identified. A selection of at least one of the identified candidate improvements may be received and the selected business intelligence artifact modified with at least one of the identified candidate improvements may be executed. The selected business intelligence artifact may be executed at least partially based on one or more of the execution profiles. Examination data for the modified business intelligence artifact may be determined and qualified selected improvement(s) may be identified based on a comparison of the examination data for the modified business intelligence artifact and the initial examination score. A determination may be made whether to apply one or more of the identified qualified selected improvements to the business intelligence artifact.

Implementations may include one or more of the following features. Determining an initial examination score may include executing the selected business intelligence artifact at least partially based on at least one of the determined execution profiles and/or determining examination data based at least partially on data from monitoring the selected business during the execution of the selected business artifact, business intelligence artifact, a period of time prior to the execution of the selected business intelligence artifact, and/or a period of time prior to the execution of the selected business intelligence artifact. Identifying candidate improvement(s) may include retrieving a set of configurable rules; applying the retrieved configurable rule(s) to the selected business intelligence artifact, the initial examination score, and/or business intelligence ecosystem information related to the selected business intelligence artifact; and, determining candidate improvement(s) based at least partially on the application of the set of configurable rules. In some implementations, the selected candidate improvement to the business intelligence artifact may be applied (e.g., by the system). Identifying qualified selected improvement(s) may include determining an examination score for aspect(s) of business intelligence artifact(s) based on the examination data, comparing at least a portion of the examination score to at least a portion of the initial examination score to determine if the score is improved, and identifying the selected improvement(s) with improved scores as qualified selected improvements. In some implementations, a report may be generated that includes instructions associated with applying the selected candidate improvement(s) to the business intelligence artifact, and a confirmation may be received that the selected candidate improvement to the business intelligence artifact was applied at least partially based on the received instructions. A selection of a business intelligence environment may be received. A selection of a business intelligence artifact may include receiving a selection of one or more aspects of the business intelligence artifact. Determining the execution profile may include receiving a selection of the execution profile and/or retrieving a definition of the execution profile. The generated initial examination score may be stored. Receiving a selection of at least one of the candidate improvements may include receiving an instruction related to customizing the identified candidate improvement. In some implementations, instructions associated with applying at least one of the selected candidate improvements to the business intelligence artifact may be received and the selected candidate improvement may be applied to the business intelligence artifact at least partially based on the received instructions. In some implementations, at least one of the selected identified qualified selected improvements may be applied to the business intelligence artifact. In some implementations, a listing of the one or more identified candidate improvements for presentation to a user may be generated and a selection may be received of at least one of the identified candidate improvements from the listing presented to the user. In some implementations, the determined examination data for the executed modified business intelligence artifact may be stored. Receiving a selection of a business intelligence artifact may include receiving a selection of one or more aspects of the business intelligence artifact; and identifying one or more candidate improvements may include identifying candidate improvements for at least one of the selected aspects of the business intelligence artifact. A report may be generated at least partially based on one or more of the qualified candidate improvements and the examination data for presentation to a user. Various operations may be performed automatically. For example, identifying one or more candidate improvements to the business intelligence artifact may be automatic and/or applying selected candidate improvements to a business intelligence artifact may be automatic. In some implementations, identifying candidate improvements to the business intelligence artifact may be based at least partially on an examination of at least a part of the selected business intelligence artifact and/or an initial examination score. Identifying candidate improvement(s) to the business intelligence artifact may include inspecting/ examining BI artifact and/or other components and/or contents of the BI ecosystem.

In various implementations, improving a business intelligence ecosystem may include receiving a selection of business intelligence artifact(s); determining execution profile(s) for the selected business intelligence artifact(s); determining a load test to apply to the selected business intelligence artifact(s); and executing the selected business intelligence artifact(s) according to the determined load test and the execution profile(s). An initial examination score may be determined based at least partially on the execution of the selected business intelligence artifact(s) according to the determined load test and candidate improvement(s) to at least one of the selected business intelligence artifact may be identified. A selection of the identified candidate improvement(s) may be received and the selected business intelligence artifact(s) modified with the identified candidate improvement(s) may be executed. The selected business intelligence artifact may be executed at least partially based on the determined load test. Examination data for the executed modified business intelligence artifact(s) may be determined, and qualified selected improvement(s) may be identified, if a determination is made that the qualified selected improvement(s) improve the selected BI artifact(s) based at least partially on a comparison of the examination data and the initial examination score. A determination may be made whether to apply the identified qualified selected improvement(s) to the selected business intelligence artifact(s).

Implementations may include one or more of the following features. In some implementations, a selection of business intelligence environment(s) may be received, and receiving the selection may include receiving a selection of business intelligence artifact(s) in the selected business intelligence environment(s). Receiving a selection of the business intelligence artifact(s) may include receiving a selection of aspect(s) of a business intelligence artifact. Determining the execution profile(s) may include receiving a selection of the execution profile and/or retrieving a definition of the execution profile. Determining a load test to apply to the business intelligence artifact may include retrieving a load test, receiving a selection of a load test, and/or receiving a load test definition. Identifying candidate improvement(s) to the selected business intelligence artifact(s) may be based at least partially on the initial examination score. In some implementations, a selection of a verification order for the one or more selected candidate improvements may be received, and executing the selected business intelligence artifact(s) modified with the identified candidate improvement(s) may include executing the modified business intelligence artifact(s) based at least partially on the received verification order. A selection may be received for two or more business intelligence artifacts and executing at least one of the selected business intelligence artifacts may include at least two of the of the selected business intelligence artifacts sequentially. A selection may be received for two or more business intelligence artifacts and executing at least one of the selected business intelligence artifacts may include executing more than one of the selected business intelligence artifacts concurrently. Executing at least one of the modified selected business artifacts may include re-executing at least one of the modified selected business artifacts according to the load test. A load test may be applied to each of the selected business intelligence artifacts. In some implementations, the same or different load tests may be applied to each of the selected BI artifacts. In some implementations, various operations may be performed to a portion of the BI artifact such as an aspect of the BI artifact. In some implementations, each of the selected BI artifacts may be executed sequentially and/or concurrently. In some implementations, no qualified SI(s) and/or CI(s) may be identified (e.g., based on examination test, rules, and/or other factors). The score may include more than one score. For example, a score may include scores for a set of CI(s) and/or SI(s), in some implementations. Information about selected BI artifact may be determined at least partially based on examination of the BI artifact, and candidate improvement(s) may be identified at least partially based on the determined information and/or the initial examination score.

In various implementations, improving a business intelligence ecosystem may include receiving a selection of business intelligence artifact(s), determining execution profile(s) for each of the selected business intelligence artifacts, determining a set of metadata models associated with one or more of the selected business intelligence artifact, and identifying a set of data sources associated with the metadata models. A listing may be generated for presentation to the user based at least partially on the determined set of metadata models and/or the identified set of data sources and a selection of the metadata model(s) and/or the data source(s) from the listing may be received. An initial examination score for the selected business intelligence artifact(s) may be determined. Information may be determined related to the selected metadata model(s) and/or the identified set of data source(s). Candidate improvement(s) to the selected metadata model(s) may be identified based at least partially on the initial examination score and/or the determined information. A selection of the identified candidate improvement(s) may be received and the selected candidate improvement(s) may be applied to at least one of the metadata models. An examination test may be executed on the metadata model(s) modified by the selected candidate improvement(s) and examination data may be generated based at least partially on the examination test. Qualified selected improvement(s) may be identified based on a comparison of the examination data and the initial examination score, and a determination may be made whether to apply the identified qualified selected improvement(s) to the metadata model(s).

Implementations may include one or more of the following features. In some implementations, the selected candidate improvement(s) may be applied to at least the selected business intelligence artifact(s). The initial examination score may include execution data related the business intelligence artifact and/or non-execution data related to the business intelligence artifact. The examination data for the executed modified business intelligence artifact may include execution data related the selected business intelligence artifact(s) and/or non-execution data related to the selected business intelligence artifact(s). In some implementations, information related to the identified set of data sources may be determined and identifying candidate improvement(s) to the business intelligence artifact(s) may be based at least partially on the initial examination score and/or the determined information related to the identified set of data sources. In some implementations, at least a portion of the set of data sources may be examined and determining the information related to the identified set of data sources may be at least partially based on the examination of at least a portion of the set of data sources. In some implementations, a listing may be generated of the identified set of data sources for presentation to a user, and a selection of data source(s) may be received. Determining information related to the identified set of data sources may include determining information related to the selected data sources.

In various implementations, improving a business intelligence ecosystem may include receiving a selection of a business intelligence artifact; determining execution profile(s) for the selected business intelligence artifact; determining an initial examination score for the selected business intelligence artifact; receiving a selection of group(s) of rules associated with application of candidate improvement(s) to the selected business intelligence artifact(s). Candidate improvement(s) to apply the business intelligence artifact may be identified and selected candidate improvements to apply to the business intelligence artifact may be identified based at least partially on the identified candidate improvement(s) and the selected groups of rule(s). The business intelligence artifact modified with the identified candidate improvement(s) may be executed, and the selected business intelligence artifact may be executed at least partially based on the execution profile(s). Examination data may be determined for the executed modified business intelligence artifact and qualified selected improvement(s) may be determined based on a comparison of the examination data for the executed modified business intelligence artifact and the initial examination score. A determination may be made whether to apply the identified qualified selected improvement(s) to the business intelligence artifact.

Implementations may include one or more of the following features. A listing may be generated of preexisting groups of rules and/or customized groups of rules associated with candidate improvements of a business intelligence artifact for presentation to the user, and wherein receiving a selection of group(s) of rules may include receiving a selection from the listing presented to the user. In some implementations, qualified selected improvement set(s) may be determined at least partially based on historical information, and the qualified selected improvement set(s) may include the identified qualified selected improvement(s). Determining whether to apply the identified qualified selected improvement(s) may include determining whether to apply the qualified selected improvement set(s) to the business intelligence artifact. In some implementations, execution profile(s) may be determined for at least one of the selected BI artifacts. In some implementations, a set of metadata models may include one or more metadata models and/or a set of data sources may include one or more data sources. A listing for presentation may include a listing of determined set of metadata models, and/or data sources, and/or selected BI artifacts. The examination test may be similar and/or the same as the examination test utilized to generate the initial examination score. The examination test may be executed on the modified BI artifact(s), metadata model(s), and/or data sources and examination data may be determined based on the examination test. The examination data may be recorded. Qualified selected improvement(s) may be identified, if a determination is made that a modified BI artifact(s), metadata model(s), and/or data sources is improved based on a comparison of the examination data and the initial examination score. In some implementations, no qualified selected improvements may be identified based on the comparison.

In various implementations, improving a business intelligence ecosystem may include receiving a selection of a business intelligence artifact; determining execution profile(s) for the business intelligence artifact; determining a set of metadata models associated with the selected business intelligence artifact; and identifying a set of data sources associated with the metadata models. An initial examination score may be determined for a selected business intelligence artifact and information related to the identified set of data source may be determined. Candidate improvement(s) to the business intelligence artifact may be identified based at least partially on the initial examination score and/or determined information related to the identified set of data sources. A selection of at least one of the identified candidate improvements may be received and the business intelligence artifact modified with the identified candidate improvement(s) may be executed. The selected business intelligence artifact may be executed at least partially based on the execution profile(s). Examination data for the executed modified business intelligence artifact may be determined and qualified selected improvement(s) may be determined based on a comparison of the examination data for the executed modified business intelligence artifact and the initial examination score. A determination may be made whether to apply one or more of the identified qualified selected improvements to the business intelligence artifact.

In various implementations, specific BI ecosystem(s), BI environment(s), BI artifact(s), BI artifact aspect(s), BI outputs, etc. have been described. However, the described system(s) and process(es) may be utilized with a variety of BI ecosystem(s), BI environment(s), BI artifact(s), BI artifact aspect(s), and/or BI outputs. For example, although a report output is described in various implementations as an example of a BI output, other types of BI outputs may be utilized in the described systems and processes. As another example, an IBM Cognos BI environment and/or various components of the IBM Cognos BI have been described in various implementations as examples; however, other types of BI environments and/or components of other types of BI environments may be utilized in the described systems and processes.

Although Users have been described as a human, a User may be a person, a group of people, a person or persons interacting with one or more computers, and/or a computer system.

Systems that include computers, such as server 801, have been described in various implementations. The computer may include a processor that executes instructions and manipulates data to perform operations of the computer. The processor may include a programmable logic device, a microprocessor, or any other appropriate device for manipulating information in a logical manner and memory may include any appropriate form(s) of volatile and/or nonvolatile memory, such as RAM and/or Flash memory.

The memory may include data, such as lists of components of a BI ecosystem, execution profile(s), examination test(s), load test scenario(s), configurable set(s) of rule(s), candidate improvement(s), criteria to facilitate identification of candidate improvement(s), historical data, and/or any other appropriate information. In addition, various software may be stored on the memory. For example, instructions, such as operating systems and/or other types of software (e.g., module(s), such as system agent(s)) may be stored on the memory. The module may perform various operations, such as the operations in the described systems and processes (e.g., operations described in FIGS. 5A-9). For example, the module (e.g., system agents) may generate interfaces to facilitate interaction with Users; generate lists for presentation to Users; receive selections; retrieve data (e.g., execution profiles, historical information, and/or data used in various analysis); identify candidate improvements; generate scores based on monitoring and/or examination; request instructions from Users; and/or apply candidate improvements.

In some implementations, system agent(s) and/or other modules may be combined as a single module or may be distinct modules. Modules may include various modules and/or sub-modules.

A communication interface may allow the computer to communicate with other components of the BI ecosystem, other repositories, and/or other computer systems. The communication interface may transmit data from the computer and/or receive data from other components, other repositories, and/or other computer systems via network protocols (e.g., TCP/IP, Bluetooth, and/or Wi-Fi) and/or a bus (e.g., serial, parallel, USB, and/or FireWire). Operations of the described system stored in the memory may be updated and/or altered through the communication via network protocols (e.g., remotely through a firmware update and/or by a device directly coupled to the computer).

The computer may include a presentation interface to present data to a User, such as though a monitor and speakers. The presentation interface may facilitate receipt of selections from Users.

Although examples computers that may be used with the disclosure have been described, the described systems and processes may be implemented through various computers such as servers, as well as a server pool. For example, server 801 may include a general-purpose personal computer (PC) a Macintosh, a workstation, a UNIX-based computer, a server computer, or any other suitable device. The computer may be adapted to execute any operating system including UNIX, Linux, Windows, or any other suitable operating system. The computer may include software and/or hardware in any combination suitable to provide access to data and/or translate data to an appropriate compatible format.

Although a single processor has been described, multiple processors may be used according to particular needs, and reference to processor is meant to include multiple processors where appropriate.

A memory of the computer may include any appropriate memory including a variety of repositories, such as, SQL databases, relational databases, object oriented databases, distributed databases, XML databases, and/or web server repositories. Furthermore, memory may include one or more forms of memory such as volatile memory (e.g., RAM) or nonvolatile memory, such as read-only memory (ROM), optical memory (e.g., CD, DVD, or LD), magnetic memory (e.g., hard disk drives, floppy disk drives), NAND flash memory, NOR flash memory, electrically-erasable, programmable read-only memory (EEPROM), Ferroelectric random-access memory (FeRAM), magnetoresistive random-access memory (MRAM), non-volatile random-access memory (NVRAM), non-volatile static random-access memory (nvSRAM), and/orphase-change memory (PRAM).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a User, the systems and techniques described here can be implemented on a computer having a display device (e.g., a CRT (cathode ray tube) or LCD (liquid crystal display) monitor) for displaying information to the User and a keyboard and a pointing device (e.g., a mouse or a trackpad) by which the User can provide input to the computer. Other kinds of devices can be used to provide for interaction with a User as well; for example, feedback provided to the User by an output device can be any form of sensory feedback (e.g., visual feedback, auditory feedback, or tactile feedback); and input from the User can be received in any form, including acoustic, speech, or tactile input.

A graphical User interface (GUI) of the interface(s) generated by the system may be displayed on a presentation interface of the User device, such as a monitor or screen. GUI may be operable to allow the User of a User device to interact with repositories and/or various interface(s). Generally, GUI provides a User with an efficient and User-friendly presentation of data provided by the system. GUI includes a plurality of displays having interactive fields, such as image icons, pull-down lists, fillable fields, and editable text operated by the User. And in one example, GUI presents an explore-type interface and receives commands from the User. It should be understood that the term graphical User interface may be used in the singular or in the plural to describe one or more graphical User interfaces in each of the displays of a particular graphical User interface. Further, GUI contemplates any graphical User interface, such as a generic web browser, that processes information in the system and/or User device and efficiently presents the information to the User. In some implementations, GUI may present a web page embedding content. The server can accept data from a User device(s) via the web browser (e.g., Microsoft Internet Explorer or Netscape Navigator) and return the appropriate Hyper Text Markup Language (HTML) or eXtensible Markup Language (XML) responses.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a candidate improvement" includes a combination of two or more candidate improvements and reference to "a BI Artifact" includes different types and/or combinations of BI Artifacts. Reference to "an execution profile" may include a combination of execution profiles. As another example, "coupling" includes direct and/or indirect coupling of members. Although various operations have been described occurring "for each" object (e.g., for each Artifact, for each CI, for each SI, for each SIG-set), various implementations may include performing the operation for one or more objects, for more than one object concurrently for more than one object sequentially, and/or for sequentially for various groupings (e.g., may be different and/or similar in contents and/or size) of objects, for example. For example, an examination of BI artifact(s) may be performed for each BI artifact individually, for a set of BI artifacts concurrently or sequentially, and/or for various groupings of BI artifacts concurrently and/or sequentially.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular implementations of the process, machine, manufacture, composition of matter, means, methods and operations described in the specification. As one of ordinary skill in the art will readily appreciate from the disclosure, processes, machines, manufacture, compositions of matter, means, methods, or operations, presently existing or later to be developed that perform substantially the same function or achieve substantially the same result as the corresponding implementations described herein may be utilized according to the present disclosure. Accordingly, the appended claims are intended to include within their scope such processes, machines, manufacture, compositions of matter, means, methods, or operations.

Glossary of Selected Terms

While dictionary meanings are also implied by certain terms used herein, the following exemplary utilizations of certain terms may be useful.

"Business Intelligence", which is also known by the acronym "BI", generally refers to computer-based techniques used in identifying, extracting, and/or analyzing business data. BI is a set of methodologies, processes, architectures, and/or technologies that transform raw data into meaningful and useful information used to enable more effective strategic, tactical, and operational insights and decision-making. BI technologies may provide historical, current, and/or predictive views of business operations. Common functions of BI technologies include online analytical processing, analytics, data mining, process mining, complex event processing, business performance management, benchmarking, text mining, predictive analytics, and reporting. While BI and competitive intelligence both support decision making, BI may use technologies, processes, and applications to analyze mostly internal, structured data and business processes while competitive intelligence gathers, analyzes and disseminates information with a topical focus on company competitors. Accordingly, BI can be broadly understood to include competitive intelligence as a subset thereof.

"Business Intelligence software" means software that provides BI functionality. Commercially available BI software includes: IBM Cognos® available from IBM Corporation Armonk, N.Y.); SAP Business Objects® available form SAP AG (Walldorf, Germany); MicroStrategy® available from MicroStrategy (Tysons Corner, Virginia); QlikView® available from QlikTech (Radnor, Pennsylvannia), and others.

"Business Intelligence environment" means a single instance of the BI software, installed on one or more computers. The instance may include process(es) that may coordinate together in some fashion to provide BI functionality to User(s). The instance may host content such as BI artifacts, and may provide insight into one or more data sources (generally abstracted by one or more BI metadata layers). An organization may include multiple BI environments that are targeted toward different purposes. In some implementations, for example, the BI environment may include:

Development—A BI environment where BI developers create or update BI content (e.g. BI artifacts) which is meant to eventually be consumed by end Users. The BI content in this type of environment is often not yet published to end Users.

QA—A BI environment where quality assurance ("QA") professionals (also known as testers) verify the proper functioning of BI artifacts. Developers usually build out new versions of BI content in the development environment and then, at periodic checkpoints, promote that BI content from the development BI environment into the QA BI environment so that it can be tested.

Production—A "live" BI environment where end Users are reviewing, analyzing, and using the BI content. Tested BI content may be promoted from the QA BI environment into the production environment once it has passed through the organization's quality assurance processes. While many end Users may simply consume BI content which was promoted from the Development environment through the QA environment into the Production environment, other end Users may create their own BI content in the live Production BI environment (this is often termed "self-service" BI).

Organizations may configure various other types of BI Environments directed towards different goals. For example, a performance testing BI environment may be a separate environment configured for the purpose of performance testing, load testing or stress testing. A sandbox BI environment may be used to evaluate the impact of a new version of the BI software or a new version of the database software. BI environments may be virtual, in which case multiple copies of the same virtual environment might be instantiated.

"Business Intelligence ecosystem" means the entirety of the BI system, including the BI environment, the BI artifacts, metadata models, and configuration details contained within the BI environment or authored for the purpose of being deployed in the BI environment, the BI-accessible data sources utilized by the BI environment, the ETL (extract, transform, load) processes that push data into BI-accessible data sources, the upstream data sources from which the ETL processes pull data, and/or the computer(s) that host all of these components.

"Business Intelligence artifact" is a generic categorization for a authored BI object that resides in a BI environment and may be accessed by Users either directly or indirectly (e.g., by utilizing the BI artifact to expose BI data from one or more BI data sources). Examples of BI artifacts in the context of IBM Cognos® include reports, metadata models (framework models and packages), transformer models, metrics models, query objects, active reports, events, analysis objects, dashboards, and/or business insight advanced objects, among others. Certain properties may be common to many types of BI artifacts, including, but not limited to: name; description; policy set (security policies); specification and/or screentip, in some implementations.

"Aspects of a BI artifact" (or "relevant aspects of a BI artifact") is a generic term for certain characteristics of a BI artifact (or related objects) that may be measured (and later improved) by the systems and processes of the present disclosure. Examples of aspects of a BI artifact may include, but are not limited to:

Execution time—how fast the BI environment can successfully execute the BI artifact (to produce one or more BI outputs) for a given set of artifact execution inputs;

Efficiency—a measure of the amount of load and/or resources consumed in the BI Environment by execution of the BI artifact for a given set of artifact execution inputs;

Properties of generated output—for example, the size of, the rendering complexity of, or the accuracy of data in a BI output generated by successful execution of the BI artifact in the BI Environment for a given set of artifact execution inputs. The rendering complexity of a generated BI output refers to the amount of resources consumed by viewing the BI output (e.g. a more complex BI output may cause greater system load when being rendered for viewing in a PDF viewer, a web browser, Microsoft Excel or other types of BI output viewers, whereas a simpler or more efficient BI output may convey the same or similar visual information with far less load when rendered in the same viewer);

Manageability—a measure regarding the succinctness, cleanliness and/or elegance of the BI artifact's specification (e.g., remove unnecessary complexity, remove redundancy, remove unused or left-over queries, and/or simplify logic). This aspect may be measured without executing the BI artifact;

Consistency—how closely the BI artifact adheres to an associated set of standards. This aspect may be measured without executing the BI artifact;

Correctness—the system may cross-reference certain data elements presented in a BI Output with related data elements from a BI-accessible data source and/or an upstream data source; and Redundancy—when considering multiple BI artifacts, how redundant is the BI artifact (e.g., a report that is substantially similar to several other considered BI artifacts would have a high redundancy score). This aspect may be measured without executing the BI artifact.

"BI Artifact Specification" is one property of a BI Artifact. A BI Artifact Specification may have a variety of purposes depending on the type of BI Artifact, for example. As an example, the BI Artifact specification may describe to the BI software how one or more data sources should be queried; how intermediate data (e.g., such as intermediate reports) should be summarized, post-processed, and potentially merged with other datasets; and/or how the resultant datasets should be rendered visually. BI Artifact specifications may be authored within an editing tool provided by the vendor of the BI software (or by some other means such as a text editor). A BI Artifact specification may encode most, if not all, of the information necessary for a BI system to service a BI artifact execution request. In some implementations, other properties, such as the associated metadata model or security policies, may be recorded as other properties on the BI Artifact itself. Concrete examples of BI artifact specifications include report specifications, analysis object specifications, query object specifications, interactive report specifications, etc.

"BI Output" means output produced by the successful execution of BI artifact(s) in the BI environment. End Users may execute a BI Artifact in the BI Environment to produce one or more BI outputs. In some implementations, an output may include, but is not limited to, a variety of information presented (e.g., on a presentation device, on paper, etc.) in a variety of forms, such as electronic file(s) and/or streams of data. The BI Output may be generated in a format (e.g., PDF, HTML, MHTML, CSV, Excel, Flash, Javascript, XML and/or other suitable formats) designated by the User and/or the system (e.g., the system may retrieve the format). In the case of web oriented BI Outputs (e.g. HTML, XHTML, MHTML and/or other suitable formats), the BI output file may contain references to other external resources (e.g. css files, Javascript files, static images, dynamic images for charts and/or other visualizations, and/or vector graphics). Examples of BI Outputs may include a report output, metrics output, query object output, active report output, event output, analysis object output, dashboard output, and/or business insight advanced object output. Certain properties may be common to many types of BI artifacts, including, but not limited to: name; description; policy set (security policies); specification and/or screentip, in some implementations. As a non-limiting example, in IBM Cognos®, an analysis object is a type of BI artifact. Analysis objects may be authored in Analysis Studio by a User of the BI Environment (their specification is created/edited in Analysis Studio). A User may then execute the analysis object in the BI Environment (an example of an artifact execution request) with a given set of inputs (the artifact execution inputs) to produce a BI output (e.g. a PDF or HTML file which provides a rendering of data from one or more BI data sources which are exposed by the analysis object, often times through a metadata model). A non-limiting exemplary representation of these relationships is depicted graphically in FIGS. 4A and 4B. Although a specific report output has been described, the described system(s) and process(es) may be utilized with a variety of different types of report outputs.

"Candidate improvement" means a suggested change that, although not yet applied, has the potential to improve the BI ecosystem that is identified by the described system(s) and/or process(es).

"Metadata model" means a BI abstraction layer that sits on top of one or more physical or virtualized data sources (a virtualized data source is achieved using software that makes multiple physical data sources appear as a single data source). The metadata model may provide a relatively User- and/or business-friendly view of the underlying data sources, and may also record various properties and categorizations for individual or derived data elements. Examples of what can be defined in a metadata model may include, but are not limited to: (a) certain data elements may be categorized into dimensional hierarchies (for example, a geographic hierarchy, a product hierarchy, and/or a time based hierarchy (year>month>day>hour>second), among others); (b) aggregation rules or "roll up" behavior may be defined for facts or measures; (c) row level security strategies may be implemented; and/or (d) internationalization strategies for the data may be implemented. Many BI artifacts in a system are dependent upon a metadata model—in other words, such BI artifacts are may be written in terms of an associated metadata model, and when executed in a BI environment, the combination of supplied execution inputs, the security identity, the BI artifact and/or the associated metadata model are utilized by the BI software to query, summarize, post-process and render visualizations of data in the underlying data sources. Other BI artifacts may be authored directly against the underlying data sources (bypassing a metadata model).

"Report" is a type of BI artifact. The successful execution of a report in the BI environment will produce one or more "report outputs". A report may have many properties, including: name; description; policy set (e.g., security policies); screentip; specification (also known as report specification); associated metadata model; and/or others. A report may be generally linked with a specific metadata model and this linkage may be specified as a property on the report and/or in the report specification. Some reports may bypass a metadata model and directly access a BI data source.

"Report specification" is one property of a report. The Report specification may describe to the BI software how one or more data sources should be queried (most often through references to abstractions defined in the metadata model, although sometimes directly against underlying data sources); how intermediate result sets should be summarized, post-processed, and potentially merged with other datasets; and/or how the resultant datasets should be rendered visually. Report specifications may be authored within an editing tool provided by the vendor of the BI software (e.g., in IBM Cognos®, report specifications are edited in Report Studio). A report specification may encode most, if not all, of the information necessary for a BI system to service a report execution request. In some implementations, other properties, such as the associated metadata model or security policies, may be recorded as other properties on the report itself. Other types of BI artifacts also have specification properties ("BI artifact specifications"), which serve a similar purpose.

"Report output" means an output produced by the execution (e.g., successful execution) of a report or a report specification in the BI environment. A report output may include one or more electronic files (or streams of data) in a format designated by a User (e.g., PDF, HTML, MHTML, CSV, Excel, Flash, Javascript, XML and/or other suitable formats). In the case of web oriented report outputs (e.g. HTML, XHTML, MHTML and/or other suitable formats), the report output file may contain references to other external resources (e.g. css files, Javascript files, static images, dynamic images for charts and/or other visualizations, and/or vector graphics). A report output is a concrete example of the more generic term "BI output". In general BI Artifacts may be authored and have an artifact specification property ("BI artifact specification"). End Users may execute a BI Artifact in the BI Environment to produce one or more BI outputs.

"Report execution inputs" means a variable set of inputs that can be passed to the BI software when executing a report or a report specification. As a non-limiting example, report execution inputs may include, but are not limited to, one or more of the following:

A set of parameter values that are passed during execution, e.g., StartDate=2005-01-01, EndDate=2005-01-31, Sectors={Financial, Telecommunications, Semiconductor}. These may be entered by a User in response to queries generated by the BI system and further constrain the results.

A set of desired output formats (e.g., PDF, HTML, CSV, and/or Excel, among others).

Delivery preferences (e.g., "the generated PDF report output should be emailed to the following 3 email addresses," "the CSV report output should be FTP'ed to the following server," etc.).

Directives regarding security identity on whose behalf the report should be executed.

Requested locale (e.g., run this report in French)

"Report execution profile" represents one way to run a report. A report execution profile may have a descriptive name and may contain a "report execution inputs" property that records selections for the variable set of inputs that will be passed to the BI software when executing a report via this particular report execution profile. A report execution profile may be saved so that it can be repeatedly used in the future. In IBM Cognos®, a Report View is one example of a report execution profile.

"Report execution request", which is also known by the acronym "RER", is a request for the BI system to execute a report. The RER may target a single report and include a "report execution inputs" object that specifies the desired preferences for this particular execution of the report (e.g., input parameters, output preferences, delivery preferences, locale, and/or other preferences). The successful processing of an RER by the BI system may generate one or more report outputs (e.g., one for each requested output format).

"Examination test" means the act of inspecting, executing, and/or measuring various aspects of one or more BI artifacts. As an example in the context of a single version of a report, an "examination test" may include, but is not limited to: the act of inspecting the report to determine measurements for non-execution related aspects of the report (e.g., manageability and consistency); the act of iterating through each designated report execution profile, executing the report according to the instructions specified within each report execution profile, recording various measurements related to the executions and their corresponding effect on relevant components of the BI ecosystem, and/or recording the report output(s) generated by the successful execution of the report, along with measurements related to properties of report outputs (e.g., size, output complexity, and data accuracy). The results, and any relevant context, of the examination test data are stored as "recorded examination data."

"Recorded examination data" means a collection of measurements taken during an examination test, including all data of interest accumulated before, during, and after inspecting, executing, and measuring various aspects of a BI artifact. As an example, in the context of a single version of a report, "recorded examination data" means all data of interest accumulated before, during, and/or after execution of each report execution profile for a given version of a report, and/or data related to non-execution aspects of the given version of the report (e.g., manageability and/or consistency measurements).

"Initial Examination Score" means the initial recorded examination data for a given BI artifact.

"Query execution plan" means an ordered set of steps used by the underlying database management system to execute a query, which is computed by a relational database engine when the database engine is provided with an SQL statement and/or statement in another suitable programming language or syntax). A query execution plan can be used for troubleshooting performance issues in a relational database.

"Selected improvement" means one or more candidate improvements that have been chosen by a User to be verified by the system. A selected improvement may be chosen either manually by the User or automatically by the system according to advance instructions previously provided by the User. The selected improvements may include a subset of the candidate improvements or may include all of the candidate improvements, depending on the User's preference.

"Selected improvement group" means one or more selected improvements that have been chosen by a User to be grouped when being verified by the system. A selected improvement group may include any appropriate permutation of one or more of the selected improvements.

The invention claimed is:

1. A computer implemented method for improving a business intelligence ecosystem, the method comprising:
   receiving, from a user device, a selection of a business intelligence artifact;
   determining one or more execution profiles for the selected business intelligence artifact;
   determining an initial examination score for the selected business intelligence artifact;
   identifying, via one or more improvement modules on a server, one or more candidate improvements to the business intelligence ecosystem based on a configurable set of rules;
   applying, via the one or more improvement modules on a server, one or more of the identified candidate improvements to modify the business intelligence ecosystem in which one or more of the candidate improvements was identified;
   executing the selected business intelligence artifact in the modified business intelligence ecosystem, wherein the selected business intelligence artifact is executed at least partially based on one or more of the execution profiles;
   determining examination data for the business intelligence artifact executed in the modified business intelligence ecosystem;
   reverting, via the one or more improvement modules, modifications to the modified business intelligence ecosystem by reverting the applied one or more candidate improvements; and
   identifying, via the one or more improvement modules, one or more qualified selected improvements based on a comparison of the examination data and the initial examination score, wherein at least one of the qualified selected improvements comprises at least one of the identified candidate improvements.

2. The method of claim 1 further comprising determining whether to apply one or more of the qualified selected improvements to the business intelligence ecosystem.

3. The method of claim 1 further comprising applying the qualified selected improvements to the business intelligence ecosystem.

4. The method of claim 1 further comprising determining one or more business intelligence ecosystem dependencies of the selected business intelligence artifact.

5. The method of claim 1 wherein modifying the business intelligence ecosystem by allowing the one or more improvement modules to applying one or more of the identified candidate improvements comprises applying one or more of the identified candidate improvements to at least one of:
   the selected business intelligence artifact;
   an associated metadata model;
   one or more underlying data sources;
   one or more business intelligence ecosystem components; or
   a configuration of one or more of the business intelligence ecosystem components.

6. The method of claim 1 further comprising storing at least one of the identified qualified selected improvements.

7. The method of claim 1 wherein determining the initial examination score comprises:
   executing the selected business intelligence artifact at least partially based on at least one of the determined execution profiles; and
   determining examination data based at least partially on data from monitoring the business intelligence ecosystem during at least one of:
   the execution of the selected business intelligence artifact;
   a period of time prior to the execution of the selected business intelligence artifact; or
   a period of time after the execution of the selected business intelligence artifact.

8. The method of claim 1 wherein identifying one or more candidate improvements comprises:
   retrieving a set of configurable rules;
   applying one or more of the configurable rules of the retrieved set of configurable rules to at least one of:
   the selected business intelligence artifact,
   the initial examination score,
   an associated metadata model,
   one or more underlying data sources, or
   one or more business intelligence ecosystem components; and
   determining at least one of the candidate improvements based at least partially on the application of one or more of the configurable rules.

9. The method of claim 1 wherein identifying one or more qualified selected improvements is based at least partially on at least one of:
   an initial examination score; or
   an examination test of at least one of:
   at least a part of the selected business intelligence artifact,
   at least a part of related business intelligence artifacts, or
   at least a part of other components in the business intelligence ecosystem.

10. The method of claim 1 further comprising:
    generating a set of instructions associated with applying at least one of the qualified selected improvements to the business intelligence ecosystem; and
    receiving a confirmation that at least one of the qualified selected improvements to the business intelligence ecosystem was applied at least partially based on the generated instructions.

11. A computer implemented method for improving a business intelligence ecosystem, the method comprising:
    receiving, from a user device, a selection of one or more business intelligence artifacts;
    determining one or more execution profiles for each of the selected business intelligence artifacts;

determining a set of metadata models associated with one or more of the selected business intelligence artifact;

identifying a set of data sources associated with the set of metadata models;

determining an initial examination score for at least one of the selected business intelligence artifacts;

determining information related to one or more associated data sources of the set of data sources associated with the set of metadata models;

identifying, via one or more improvement modules on a server, one or more candidate improvements to the business intelligence ecosystem based at least partially on the initial examination score the determined information, and a configurable set of rules;

modifying the business intelligence ecosystem by applying, via the one or more improvement modules, one or more of the identified candidate improvements to at least one of:

one or more of the metadata models;

one or more of the associated data sources; or one or more of the business intelligence ecosystem components;

executing one or more of the selected business intelligence artifacts in the modified business intelligence ecosystem, wherein one or more of the selected business intelligence artifacts are executed at least partially based on one or more of the determined execution profiles;

applying an examination test on one or more of the selected business intelligence artifacts executed in the modified business intelligence ecosystem;

determining examination data based at least partially on the examination test; and identifying, via the one or more improvement modules, one or more qualified selected improvements based on a comparison of the examination data and the initial examination score, wherein at least one of the qualified selected improvements comprises at least one of the identified candidate improvements.

12. The method of claim 11 further comprising reverting the modifications to the modified business intelligence ecosystem, via the one or more improvement modules, by reverting the applied one or more candidate improvements.

13. The method of claim 11 further comprising:

generating a listing for presentation to the user based at least partially on one or more of the metadata models; and receiving a selection of at least one of the metadata models from the listing;

wherein modifying the business intelligence ecosystem comprises modifying at least one of the selected metadata models by applying one or more of the identified candidate improvements to at least one of the selected metadata models.

14. The method of claim 11 further comprising:

determining whether to apply one or more of the identified qualified selected improvements to at least one of the metadata models or the associated data sources; and applying one or more of the identified qualified selected improvements to at least one of the metadata models or the associated data sources if a determination is made to apply one or more of the qualified selected improvements.

15. The method of claim 11 wherein the initial examination score comprises at least one of:

execution data related to at least one of the selected business intelligence artifacts; or non-execution data related to at least one of the selected business intelligence artifacts.

16. The method of claim 11 wherein the examination data comprises at least one of:

execution data related to at least one of the selected business intelligence artifacts; or non-execution data related to at least one of the selected business intelligence artifacts.

17. The method of claim 11 further comprising determining information related to the identified set of data sources; wherein identifying one or more candidate improvements to at least one of the selected business intelligence artifacts is based at least partially on the initial examination score and determined information related to the identified set of data sources.

18. The method of claim 11 further comprising applying an examination test to at least a portion of the set of data sources; wherein determining the information related to the identified set of data sources is at least partially based on the examination test of at least a portion of the set of data sources.

19. The method of claim 11 further comprising determining information related to at least one of: one or more metadata models of the set of metadata models; or one or more business intelligence ecosystem components, and wherein identifying one or more candidate improvements to the business intelligence ecosystem based at least partially on the determined information further comprises identifying one or more candidate improvements to the business intelligence ecosystem based at least partially on determined information related to at least one of one or more of the metadata models of the set of metadata models or one or more of the business intelligence ecosystem components.

* * * * *